United States Patent
Goto et al.

(10) Patent No.: US 10,065,262 B2
(45) Date of Patent: Sep. 4, 2018

(54) WELDING METHOD AND WELDING DEVICE

(75) Inventors: Akira Goto, Utsunomiya (JP); Shinichi Miyasaka, Utsunomiya (JP); Tatsuro Ikeda, Utsunomiya (JP); Yushi Aoki, Utsunomiya (JP); Mitsutaka Igaue, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 357 days.

(21) Appl. No.: 13/820,623

(22) PCT Filed: Sep. 5, 2011

(86) PCT No.: PCT/JP2011/070134
§ 371 (c)(1),
(2), (4) Date: Mar. 4, 2013

(87) PCT Pub. No.: WO2012/033040
PCT Pub. Date: Mar. 15, 2012

(65) Prior Publication Data
US 2013/0153544 A1  Jun. 20, 2013

(30) Foreign Application Priority Data

Sep. 6, 2010 (JP) .................. 2010-198504
Sep. 6, 2010 (JP) .................. 2010-198505
Sep. 24, 2010 (JP) .................. 2010-213681

(51) Int. Cl.
*B23K 11/00* (2006.01)
*B23K 11/11* (2006.01)
(Continued)

(52) U.S. Cl.
CPC ........... *B23K 11/115* (2013.01); *B23K 11/314* (2013.01); *B23K 11/36* (2013.01);
(Continued)

(58) Field of Classification Search
CPC ..... B23K 11/11; B23K 11/115; B23K 11/314; B23K 11/00; B23K 11/36; B23K 37/0435; B23K 2201/18; B23K 2203/04
(Continued)

(56) References Cited

U.S. PATENT DOCUMENTS 1,259,271 A * 3/1918 Murray ................. 219/91.2
3,415,973 A * 12/1968 Verbeck ............. B23K 11/20
219/118
(Continued)

FOREIGN PATENT DOCUMENTS

DE   3711771   * 10/1988
DE   4323148   *  1/1995
(Continued)

OTHER PUBLICATIONS

Tranlation FR2878175.*
(Continued)

*Primary Examiner* — David Angwin
*Assistant Examiner* — Frederick Calvetti
(74) *Attorney, Agent, or Firm* — Rankin, Hill & Clark LLP

(57) ABSTRACT

A resistance welding device is provided with a lower tip and an upper tip that serve as welding tips, and pressing rods that serve as pressing members. The upper tip and the pressing rods press a stacked body, which is to be welded, from the metallic plate side, which is the outermost member of the stacked body. The lower tip presses the stacked body from the lowermost metallic plate side. In this state, and electric current is conducted from the upper tip to the lower tip.

6 Claims, 56 Drawing Sheets

(51) Int. Cl.
*B23K 11/31* (2006.01)
*B23K 11/36* (2006.01)
*B23K 37/04* (2006.01)
B23K 101/18 (2006.01)
B23K 103/04 (2006.01)

(52) U.S. Cl.
CPC ...... *B23K 37/0435* (2013.01); *B23K 2201/18* (2013.01); *B23K 2203/04* (2013.01)

(58) Field of Classification Search
USPC .................................. 219/86.22, 91.2, 117.1
See application file for complete search history.

(56) References Cited

U.S. PATENT DOCUMENTS

| | | | | |
|---|---|---|---|---|
| 3,823,468 | A * | 7/1974 | Hascoe | B23K 1/0004 |
| | | | | 174/564 |
| 3,946,190 | A * | 3/1976 | Hascoe | H01L 21/50 |
| | | | | 219/85.15 |
| 4,009,362 | A * | 2/1977 | Becker | B23K 11/163 |
| | | | | 219/92 |
| 4,963,712 | A * | 10/1990 | Etoh | B23K 11/312 |
| | | | | 219/86.7 |
| 5,387,774 | A * | 2/1995 | Boyer | B23K 11/3018 |
| | | | | 219/117.1 |
| 6,515,250 | B2 * | 2/2003 | Miyasaka | B21D 37/20 |
| | | | | 219/117.1 |
| 8,253,056 | B2 * | 8/2012 | Goto | B23K 11/0026 |
| | | | | 219/117.1 |
| 2005/0087359 | A1 * | 4/2005 | Tachibana | B23K 11/0033 |
| | | | | 174/94 R |
| 2006/0163321 | A1 * | 7/2006 | Hasegawa | B23K 11/0033 |
| | | | | 228/101 |
| 2008/0041828 | A1 * | 2/2008 | Lang | B23K 11/312 |
| | | | | 219/119 |
| 2009/0302010 | A1 * | 12/2009 | Goto | B23K 11/115 |
| | | | | 219/117.1 |
| 2010/0243616 | A1 * | 9/2010 | Goto | B23K 11/0026 |
| | | | | 219/117.1 |
| 2012/0055910 | A1 | 3/2012 | Sakai et al. | |

FOREIGN PATENT DOCUMENTS

| | | | |
|---|---|---|---|
| FR | 2878175 | * | 5/2006 |
| JP | 59193773 | * | 11/1984 |
| JP | 63-183781 | | 7/1988 |
| JP | 06-055279 | | 3/1994 |
| JP | 2001259854 | * | 9/2001 |
| JP | 2003211271 | * | 7/2003 |
| JP | 2003-251469 | | 9/2003 |
| JP | 2005088069 | * | 4/2005 |
| JP | 2005-262259 | | 9/2005 |
| JP | 2005262259 | * | 9/2005 |
| JP | 2006-272345 | | 10/2006 |
| JP | 3894545 | | 3/2007 |
| JP | 2008023554 | * | 7/2008 |
| JP | 2009262159 | * | 11/2009 |
| JP | 2010172946 | * | 8/2010 |
| JP | 2010253551 | * | 11/2010 |
| JP | 2012-055924 | | 3/2012 |
| WO | WO2010140605 | * | 12/2010 |

OTHER PUBLICATIONS

Translation JP2010172946.*
Translation JP 2008246538.*
European Search Report dated Jun. 3, 2014.
Japanese Office Action with partial English translation dated Feb. 3, 2015, 5 pages.

* cited by examiner

WELDING METHOD AND WELDING DEVICE

TECHNICAL FIELD

The present invention relates to a welding method and a welding device for carrying out resistance welding (spot welding) with respect to a stacked body, which is formed by stacking a plurality of workpieces.

BACKGROUND ART

As one method for joining and bonding together a plurality of metallic plates, resistance welding has been known conventionally, by which a stacked body is formed by stacking the metallic plates, and after the stacked body is pressed and sandwiched between a pair of welding tips, an electric current is conducted between the pair of welding tips, whereby regions in the vicinity of contact surfaces on the metallic plates are melted and fused together. Under certain circumstances, three or more metallic plates are joined by resistance welding. Resistance welding may also be referred to as "spot welding".

FIG. 53 is a front view of essential features in which there is shown schematically a case in which workpieces 1, 2, which are made from high tensile strength steel having a large thickness and thus exhibit a large electrical resistance, are joined together by spot welding. In this case, after a stacked body 3 has been formed by stacking the two high resistance workpieces 1, 2, the stacked body 3 is sandwiched and pressed between a first welding tip 4 and a second welding tip 5. Furthermore, an electrical current is conducted between the first welding tip 4 and the second welding tip 5, whereupon a region in the vicinity of a contact surface between the high resistance workpieces 1, 2 is heated to thereby create a melted portion 6. Thereafter, the melted portion 6 is solidified into a solid phase referred to as a nugget.

Since the electrical resistance of the high resistance workpieces 1, 2 is high, upon conduction of current therethrough, Joule heating in the vicinity of the contact surface is large. Owing thereto, as shown in FIG. 54, the melted portion 6 grows to a large size in a comparatively short time, and as a result, it is easy for the melted portion 6 to become scattered (spatter occurs easily). Accordingly, in the case that the high resistance workpieces 1, 2 are joined by spot welding, it is necessary for the welding current to be controlled with high precision in order to avoid the occurrence of spatter. However, such a control is not easy to perform. Such a problem also occurs in the case of small thickness high tensile strength steel.

Further, in the case of joining three or more workpieces, without any limitation being placed on the workpieces being made of the same materials and having the same thickness, for example, as shown in FIG. 55, a case also is known in which the thickness of the workpiece (low resistance workpiece 7) at the outermost position is the smallest. The stacked body 8 in FIG. 55 is formed by further stacking on the high resistance workpieces 1, 2 shown in FIGS. 53 and 54 a low resistance workpiece 7 having low electrical resistance and which is made from mild steel.

When spot welding is carried out on the stacked body 8, Joule heating generated in the vicinity of the contact surface between the high resistance workpieces 1, 2 is greater than Joule heating generated in the vicinity of the contact surface between the low resistance workpiece 7 and the high resistance workpiece 2. This is because contact resistance is larger in the vicinity of the contact surface between the high resistance workpieces 1, 2.

Accordingly, in the stacked body 8, at first, a melted portion 9 is formed at the contact surface between the high resistance workpieces 1, 2. In certain cases, as shown in FIG. 56, the melted portion 9 grows significantly before a melted portion is formed at the contact surface between the low resistance workpiece 7 and the high resistance workpiece 2. In such a situation, if current continues to be conducted for forming a melted portion at the contact surface between the low resistance workpiece 7 and the high resistance workpiece 2, melted material becomes scattered from the contact surface between the high resistance workpieces 1, 2, leading to the concern that so-called spatter may occur.

However, if the electrical current is stopped, a sufficient melted portion, and hence a nugget, will not be formed at the contact surface between the low resistance workpiece 7 and the high resistance workpiece 2, and therefore, it is difficult to ensure adequate bonding strength between the low resistance workpiece 7 and the high resistance workpiece 2.

In order that the nugget can be grown sufficiently large in the vicinity of the contact region between the low resistance workpiece 7 and the high resistance workpiece 2, it has been contemplated to increase the current value, whereby Joule heating generated in the low resistance workpiece 7 is increased. However, in this case, the large current also flows in the thick high resistance workpieces 1, 2, and as a result, it is easy for spatter to be induced from the contact surface between the high resistance workpieces 1, 2.

Apart therefrom, it can be considered to lengthen the time at which current is conducted. However, in this case as well, it is not a simple matter to generate a sufficient amount of Joule heating in the low resistance workpiece 7. Further, since the welding time increases, welding efficiency is lowered.

From these viewpoints, according to Japanese Laid-Open Patent Publication No. 2005-262259, when resistance welding is carried out on a stacked body made up from a stack of plural metallic plates on which a thinnest workpiece is arranged on the outermost side thereof, it has been proposed to carry out welding in two stages comprising a first stage, in which the pressure on the stacked body is small whereas a large welding current is applied for a short time period, and a second stage, in which the pressure on the stacked body is set to be greater than that during the first stage, and the current value is set to be lower than the current value of the first stage, and the energization time in which application of current is carried out is set to be longer than that of the first stage.

According to the disclosure of Japanese Laid-Open Patent Publication No. 2005-262259, unnecessary steps are not added, and a spot welded coupling can easily be manufactured having a nugget of adequate size and in which generation of spatter is eliminated.

Further, in Japanese Patent No. 3894545, the present applicants have proposed to set the pressing force of the first welding tip that abuts against a low resistance workpiece to be smaller in comparison with a pressing force of a second welding tip, when spot welding is carried out with respect to a stacked body. In this case, the contact pressure applied from the low resistance workpiece to a high resistance workpiece is small, and as a result, the contact resistance of the contact surface between the low resistance workpiece and the high resistance workpiece increases. Consequently, a sufficient amount of Joule heating is generated at the contact surface. Accordingly, it is possible for a nugget to be grown between the low resistance workpiece and the high resistance workpiece, which has a size substantially the same as that of a nugget formed between two high resistance workpieces, and a stacked body with superior joint strength can be obtained.

SUMMARY OF INVENTION

A general object of the present invention is to provide a resistance welding method in which control is simplified in comparison with the aforementioned conventional techniques, and in which the welding or joint strength between workpieces can be further improved.

A principal object of the present invention is to provide a resistance welding method in which nuggets can be grown sufficiently in the vicinity of contact surfaces between workpieces in a stacked body.

Another object of the present invention is to provide a resistance welding method in which concerns over generation of spatter can be dispensed with.

Yet another object of the present invention is to provide a resistance welding device for carrying out the aforementioned resistance welding method.

According to one embodiment of the present invention, there is provided a resistance welding method for carrying out resistance welding with respect to a stacked body formed by stacking a plurality of workpieces, comprising the steps of:

sandwiching the stacked body between a first welding tip and a second welding tip, while bringing a pressing member into abutment against an outermost workpiece, which is positioned on an outermost portion of the stacked body and against which the first welding tip is in abutment, the stacked body being pressed from a side of the outermost workpiece by the pressing member; and conducting an electric current between the first welding tip and the second welding tip while maintaining a pressure by the pressing member.

In this case, since the total pressing force of the pressing member and the first welding tip is in equilibrium with the pressing force of the second welding tip, the pressing force of the first welding tip is small in comparison with that of the second welding tip. Accordingly, between sides of the first welding tip and the second welding tip, which is disposed substantially in confronting relation to the first welding tip, the active range of the pressing force becomes distributed wider from the side of the first welding tip toward the second welding tip. Owing thereto, the force acting on the contact surface between the outermost workpiece, against which the first welding tip is held in abutment, and the workpiece adjacent thereto is small in comparison to the force that acts on the contact surface between the remaining workpieces.

As a result of such a distribution, the contact area between the outermost workpiece and the workpiece adjacent thereto is smaller in comparison to the contact area between the remaining workpieces. Accordingly, the contact resistance of the contact surface between the outermost workpiece and the workpiece adjacent thereto can be increased, and thus, the amount of heat therebetween based on Joule heating can be increased as well. Consequently, it becomes possible for the nugget, which is generated at the contact surface, to grow to a large size, thereby assuring a sufficient bonding strength between the outermost workpiece and the workpiece adjacent thereto.

In addition, since the metallic plates are pressed by the pressing member, the outermost workpiece is prevented from separating away from the workpiece adjacent thereto.

Accordingly, the softened melted portion can be prevented from scattering as spattering from spaced locations between the outermost workpiece and the workpiece adjacent thereto.

Further, the pressing member may comprise an auxiliary electrode having a polarity opposite to that of the first welding tip, such that when electric current is conducted between the first welding tip and the second welding tip, a branching current is made to flow either from the first welding tip to the auxiliary electrode, or from the auxiliary electrode to the first welding tip.

In this case, the first welding tip, which abuts against the outermost workpiece together with the auxiliary electrode (pressing member) has a polarity opposite to that of the auxiliary electrode, and therefore, a branching current is formed which flows from the first welding tip to the auxiliary electrode, or in an opposite direction from the auxiliary electrode to the first welding tip. As a result of such a branching current that flows in the interior of the outermost workpiece, the contact surface between the outermost workpiece and the workpiece adjacent thereto is heated sufficiently.

As a result of heating in accordance with the branching current, a nugget having a sufficient size is grown at the contact surface. Consequently, a joined portion of superior bonding strength can be obtained.

Additionally, in this case, the current value of the current that flows at the contact surfaces between the workpieces is small in comparison with ordinary resistance welding, in which the stacked body are gripped only between the first welding tip and the second welding tip and current is made to flow therebetween. Owing thereto, any concerns over spatter occurring during the period in which nuggets that are formed at the contact surfaces are grown to a sufficient size can be dispensed with.

It is preferable for the branching current to be controlled by a timer. More specifically, for example, a resistance welding method for carrying out resistance welding with respect to a stacked body formed by stacking a plurality of workpieces may comprise the steps of:

sandwiching the stacked body between a first welding tip and a second welding tip, and bringing an auxiliary electrode having a polarity opposite to that of the first welding tip into abutment against an outermost workpiece, which is positioned on an outermost portion of the stacked body and against which the first welding tip is in abutment;

carrying out resistance welding on the stacked body by conducting an electric current between the first welding tip and the second welding tip, and causing a branching current to flow from the first welding tip to the auxiliary electrode, or to flow from the auxiliary electrode to the first welding tip;

electrically insulating the first welding tip and the auxiliary electrode from each other and stopping flow of the branching current, while continuing conduction of the electric current between the first welding tip and the second welding tip; and stopping conduction of electric current between the first welding tip and the second welding tip, wherein a time from start of conduction of electric current between the first welding tip and the second welding tip until stopping conduction of the electric current is controlled by a welding timer, and the welding timer sends an electrical conduction start signal to a branching current timer, and wherein the branching current timer carries out a control to initiate measurement of time from receipt of the electrical conduction start signal, and to stop the branching current when a predetermined set time is reached.

In this manner, by controlling the time at which the branching current flows, the branching current can be stopped at a time appropriate for stopping the same. More specifically, since the timing at which the branching current is stopped can be controlled with high precision, the degree of growth of the nugget between the outermost workpiece and the workpiece adjacent thereto can be controlled highly accurately.

In addition, in this case, simultaneously with starting conduction of current under action of the welding timer, the electrical conduction start signal, by which the start of electrical conduction is recognized, is sent to the branching current timer. Accordingly, in the branching current timer, substantially simultaneously with the actual start of electrical conduction (welding), it can be recognized that electrical conduction (welding) has been initiated. Stated otherwise, the timing at which electrical conduction (welding) actually is started is substantially simultaneous with the timing at which the branching current timer recognizes the same, so that a time lag does not occur between both timings, or even if such a time lag occurs, the time lag is so short that it can be ignored.

The branching current timer measures the passage of time simultaneously with the branching current timer receiving the electrical conduction start signal. In addition, in the branching current timer, upon a preset time having elapsed, the branching current timer stops flow of the branching current. In the foregoing manner, since the timing at which electrical conduction (welding) actually is started and the timing at which the branching current timer recognizes the same are substantially simultaneous, the branching current can be stopped at a time that is appropriate for stopping the same.

In this manner, in accordance with the aforementioned timer controls, the timing at which the branching current is stopped can be controlled with high precision. Consequently, the degree of growth of the nugget between the outermost workpiece and the workpiece adjacent thereto can be controlled highly accurately.

Further, a slope in a conduction time vs. temperature graph of the outermost workpiece can be calculated, and the branching current may be stopped at a time that the slope undergoes a change. More specifically, a resistance welding method for carrying out resistance welding with respect to a stacked body formed by stacking a plurality of workpieces may comprise the steps of:

sandwiching the stacked body between a first welding tip and a second welding tip, and bringing an auxiliary electrode having a polarity opposite to that of the first welding tip into abutment against an outermost workpiece, which is positioned on an outermost portion of the stacked body and against which the first welding tip is in abutment;

carrying out resistance welding on the stacked body by conducting an electric current between the first welding tip and the second welding tip, and causing a branching current to flow from the first welding tip to the auxiliary electrode, or to flow from the auxiliary electrode to the first welding tip; and electrically insulating the first welding tip and the auxiliary electrode from each other and stopping flow of the branching current when a slope of a conduction time vs. temperature graph of the outermost workpiece changes from a large slope to a small slope.

If the branching current flows for an excessively long time, the nugget formed between the outermost workpiece and the workpiece adjacent thereto becomes small. Thus, with the above-noted resistance welding method, at the time that the slope of a conduction time vs. temperature graph of the outermost workpiece changes from a large slope to a small slope, or stated otherwise, at a time that the speed of the temperature rise of the outermost workpiece, which up to then had been large, starts to become small, the branching current is stopped. Owing thereto, the nugget that is formed between the outermost workpiece and the workpiece adjacent thereto can be made to grow adequately large in size.

For stopping the branching current, the electrical path between the first welding tip and the auxiliary electrode may be cut off. For this purpose, for example, a switch may be provided, which connects or interrupts an electrical path only between the auxiliary electrode and the power source. By switching the switch from an ON (connected) state to an OFF (disconnected) state, or by switching the same in an opposite manner, the electrical path can be connected or interrupted between the first welding tip and the auxiliary electrode.

Alternatively, a displacement mechanism may be provided for displacing the auxiliary electrode, such that under an action of the displacement mechanism, the auxiliary electrode is brought into abutment against the outermost workpiece, or is made to separate away from the outermost workpiece. Naturally, during the time that the auxiliary electrode is in abutment against the outermost workpiece, the electrical path between the first welding tip and the auxiliary electrode is connected, whereas, during the time that the auxiliary electrode is separated away from the outermost workpiece, the electrical path between the first welding tip and the auxiliary electrode is disconnected.

Furthermore, another auxiliary electrode may be provided, which is provided on the side of the second welding tip and has a polarity opposite to that of the second welding tip, such that after either one of the branching current that flows from the first welding tip to the auxiliary electrode (the auxiliary electrode on the side of the first welding tip) or the branching current that flows from the auxiliary electrode to the first welding tip has vanished, a branching current may be made to flow either from the other auxiliary electrode (the auxiliary electrode on the side of the second welding tip) to the second welding tip, or from the second welding tip to the other auxiliary electrode.

In this case, a nugget can be made to grow adequately at the contact surface between the outermost workpiece against which the second welding tip is in abutment and the workpiece adjacent thereto.

According to another embodiment of the present invention, a resistance welding device is provided for carrying out resistance welding with respect to a stacked body formed by stacking a plurality of workpieces, comprising:

a first welding tip and a second welding tip that sandwich the stacked body therebetween;

a pressing member that abuts against an outermost workpiece, which is positioned on an outermost portion of the stacked body, at a region thereof that differs from a region where the first welding tip is in abutment, for thereby pressing the stacked body from the side of the outermost workpiece; and a pressing mechanism for generating a pressing force on the pressing member.

In accordance with such a structure, the pressing force with respect to the stacked body by the first welding tip and the second welding tip can be distributed such that an active range becomes larger from the side of the first welding tip toward the second welding tip. As a result, the contact resistance of the contact surface between the outermost workpiece against which the first welding tip is in abutment and the workpiece adjacent thereto can be increased, and the contact surface can be heated sufficiently so that a nugget of appropriate size can be grown. Thus, the bonding strength between the outermost workpiece and the workpiece adjacent thereto can also be increased.

Moreover, in the case that a welding gun, on which the first welding tip and the second welding tip are disposed, is supported by a robot, the pressing mechanism preferably also is disposed on the welding gun. In this case, since a reactive force from the stacked body can be absorbed by the welding gun, the reactive force can be prevented from extending to the robot per se. Accordingly, there is no particular need to adopt as the robot one having a great amount of rigidity. Stated otherwise, since a small scale robot can be used, the investment cost for equipment can be kept low.

Further, the pressing member is constituted by the auxiliary electrode having a polarity opposite to that of the first welding tip, such that when current is conducted, either a branching current that flows from the first welding tip to the auxiliary electrode, or a branching current that flows from the auxiliary electrode to the first welding tip may be generated. In the foregoing manner, in this case, by means of the current that flows from the first welding tip to the auxiliary electrode, or the current that flows in the opposite direction, since the contact surfaces between the metallic plates and the workpieces adjacent thereto are sufficiently heated, nuggets that are sufficiently large in size can be made to grow at the contact surfaces, and joined regions that exhibit superior bonding strength can be obtained.

According to another embodiment of the present invention, there is provided a resistance welding device for carrying out resistance welding with respect to a stacked body formed by stacking a plurality of workpieces, comprising:

a first welding tip and a second welding tip that sandwich the stacked body therebetween;

an auxiliary electrode that abuts against an outermost workpiece, which is positioned on an outermost portion of the stacked body together with the first welding tip, and having a polarity opposite to that of the first welding tip; and a control circuit, which when resistance welding is carried out by conducting an electric current between the first welding tip and the second welding tip that sandwich the stacked body therebetween, controls a time during which a branching current flows from the first welding tip to the auxiliary electrode, or flows from the auxiliary electrode to the first welding tip, wherein the control circuit electrically insulates the first welding tip and the auxiliary electrode from each other and stops flow of the branching current when a slope of a conduction time vs. temperature graph of the outermost workpiece changes from a large slope to a small slope.

With such a structure, as noted above, generation of spatter can be avoided, and a nugget that is formed between the outermost workpiece and the workpiece adjacent thereto can be grown sufficiently.

A configuration may be adopted in which the branching current is controlled by means of a timer control. In this case, for example, a resistance welding device is provided for carrying out resistance welding with respect to a stacked body formed by stacking a plurality of workpieces, comprising:

a first welding tip and a second welding tip that sandwich the stacked body therebetween;

an auxiliary electrode that abuts against an outermost workpiece, which is positioned on an outermost portion of the stacked body together with the first welding tip, and having a polarity opposite to that of the first welding tip;

a welding timer that controls a time of conduction of electric current when current is conducted between the first welding tip and the second welding tip, which sandwich the stacked body therebetween for carrying out resistance welding thereon;

a branching current timer, which when the current is conducted, controls a time during which a branching current flows from the first welding tip to the auxiliary electrode, or flows from the auxiliary electrode to the first welding tip; and a control circuit that sends an electrical conduction start signal to the welding timer, and inputs to the branching current timer a time at which the branching current flows, wherein, by operation of the welding timer to which the electrical conduction start signal was sent, the electrical conduction start signal is sent to the branching current timer simultaneously with start of electrical conduction between the first welding tip and the second welding tip.

In this manner, by controlling the time at which the branching current flows, the branching current can be stopped at a time appropriate for stopping the same. More specifically, since the timing at which the branching current is stopped can be controlled with high precision, the degree of growth of the nugget between the outermost workpiece and the workpiece adjacent thereto can be controlled highly accurately.

In such a structure, a switch may be provided, which connects or interrupts an electrical path only between the auxiliary electrode and the power source. Alternatively, the auxiliary electrode may be made to approach toward or separate away from the outermost workpiece.

Further, a structure may be adopted in which the first welding tip and the auxiliary electrode are electrically insulated from each other to thereby stop the branching current at a time that a slope in a conduction time vs. temperature graph changes from a large slope to a small slope. In this case, the resistance welding device for carrying out resistance welding with respect to a stacked body formed by stacking a plurality of workpieces comprises:

a first welding tip and a second welding tip that sandwich the stacked body therebetween;

an auxiliary electrode that abuts against an outermost workpiece, which is positioned on an outermost portion of the stacked body together with the first welding tip, and having a polarity opposite to that of the first welding tip; and a control circuit, which when resistance welding is carried out by conducting an electric current between the first welding tip and the second welding tip that sandwich the stacked body therebetween, controls a time during which a branching current flows from the first welding tip to the auxiliary electrode, or flows from the auxiliary electrode to the first welding tip, wherein the control circuit electrically insulates the first welding tip and the auxiliary electrode from each other and stops flow of the branching current when a slope of a conduction time vs. temperature graph of the outermost workpiece changes from a large slope to a small slope.

With such a structure, as noted above, generation of spatter can be avoided, and the nugget that is formed between the outermost workpiece and the workpiece adjacent thereto can be grown sufficiently.

Although the auxiliary electrode may be configured to approach or separate away from the outermost workpiece (i.e., to be displaced) integrally with the first welding tip, preferably, the displacement mechanism is provided separately for displacing only the auxiliary electrode.

Furthermore, the auxiliary electrode may have an annular shape that surrounds the first welding tip. In this case, the branching current flows evenly in a radial shape through the interior of the outermost workpiece. Accordingly, the contact surface between the outermost workpiece and the workpiece adjacent thereto can be heated evenly to thereby easily form a nugget, and the nugget can easily be grown to a sufficient size.

For stopping the branching current, in the same way as noted above, the electrical path between the first welding tip and the auxiliary electrode may be cut off. For this purpose, for example, a switch may be provided, which connects or interrupts an electrical path only between the auxiliary electrode and the power source. By switching the switch from an ON (connected) state to an OFF (disconnected) state, or by switching the same in an opposite manner, the electrical path can be connected or interrupted between the first welding tip and the auxiliary electrode.

Alternatively, a displacement mechanism may be provided for displacing the auxiliary electrode, such that under an action of the displacement mechanism, the auxiliary electrode is brought into abutment against the outermost workpiece or is made to separate away from the outermost workpiece. Naturally, during a time that the auxiliary electrode is in abutment against the outermost workpiece, the electrical path between the first welding tip and the auxiliary electrode is connected, whereas, during a time that the auxiliary electrode is separated away from the outermost workpiece, the electrical path between the first welding tip and the auxiliary electrode is disconnected.

Furthermore, another auxiliary electrode, which is disposed on the side of the second welding tip and has a polarity opposite to that of the second welding tip, may be provided. In this case, after either one of the branching current that flows from the first welding tip to the auxiliary electrode (the auxiliary electrode on the side of the first welding tip) or the branching current that flows from the auxiliary electrode to the first welding tip has vanished, a branching current may be made to flow either from the other auxiliary electrode (the auxiliary electrode on the side of the second welding tip) to the second welding tip, or from the second welding tip to the other auxiliary electrode.

Consequently, a nugget can be made to grow adequately at the contact surface between the outermost workpiece against which the second welding tip is in abutment and the workpiece adjacent thereto.

DESCRIPTION OF EMBODIMENTS

Preferred embodiments of a resistance welding method according to the present invention, and a resistance welding device for implementing the aforementioned method, shall be described in detail below with reference to the accompanying drawings.

Figure 1:
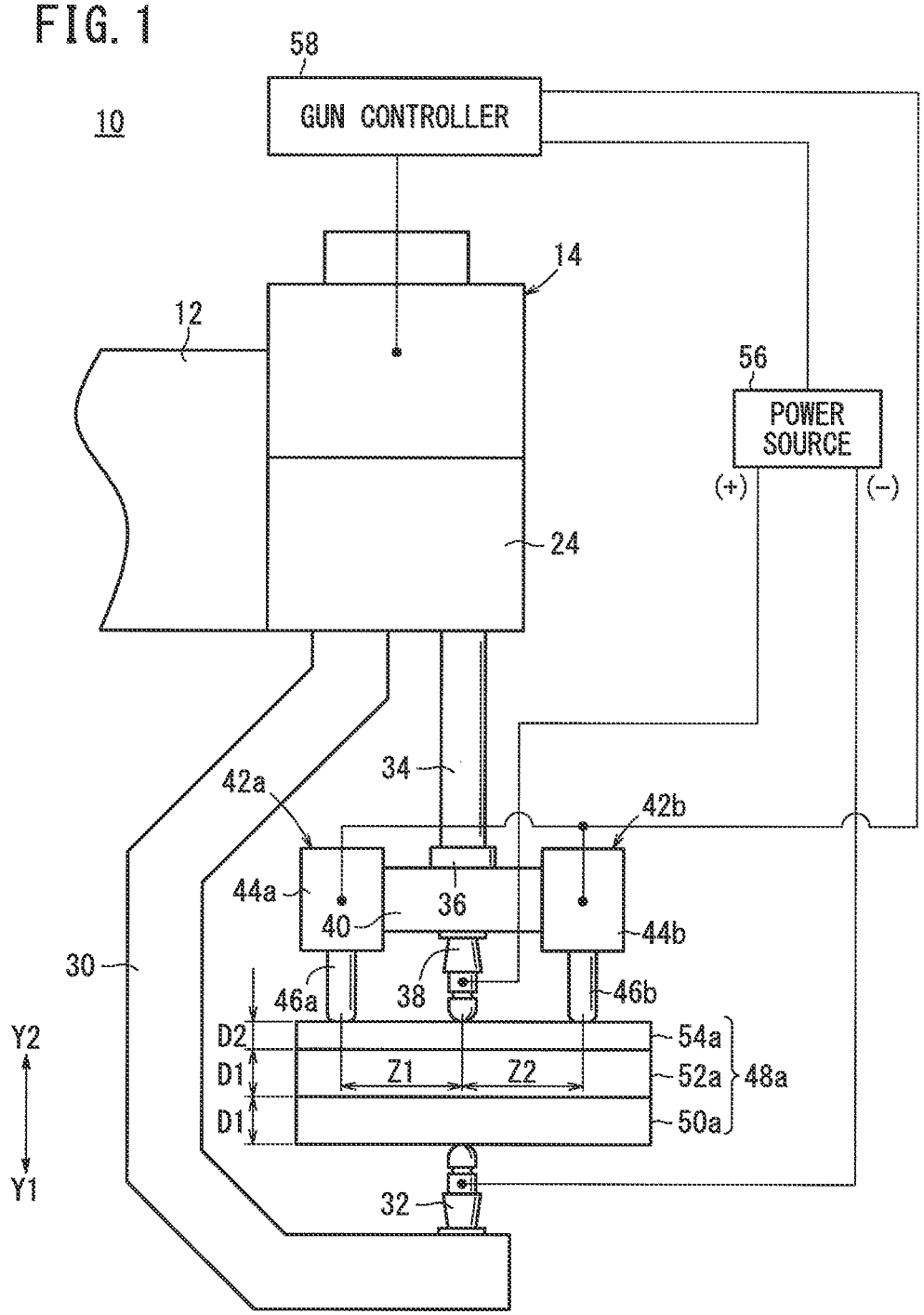
FIG. 1 is an enlarged view of essential features of a resistance welding device according to a first embodiment of the present invention.

FIG. 1 is an enlarged view of essential features of a spot welding apparatus (resistance welding device) 10 according to a first embodiment. The spot welding apparatus 10 includes a robot having an arm (neither of which are shown), and a welding gun 14 which is supported by a wrist unit 12 constituting part of the aforementioned arm.

In this case, the welding gun 14 is equipped with a substantially C-shaped first arm 30, which is arranged beneath a gun main body 24. On the lower end of the fixed arm 30, a lower tip 32, which serves as a second welding tip, is disposed to face toward the gun main body 24. The lower tip 32 extends in a direction toward the gun main body 24.

A ball screw mechanism (not shown) is accommodated on the gun main body 24. A ball screw of the ball screw mechanism displaces a connecting rod 34 that projects from the gun main body 24 and extends toward the lower tip 32, in a vertical direction (in the direction of the arrow Y2 or the direction of the arrow Y1) in FIG. 1. The ball screw is rotatable by a non-illustrated servo motor that constitutes part of the ball screw mechanism.

On the distal end of the connecting rod 34, an upper tip 38, which serves as a first welding tip, is disposed in confronting relation to the lower tip 32. Furthermore, two cylinder mechanisms 42a, 42b (pressing mechanisms) are supported via a bridging member 40 on a stay 36. From respective cylinder tubes 44a, 44b that make up the cylinder mechanisms 42a, 42b, pressing rods 46a, 46b that serve as pressing members project and extend in parallel with the upper tip 38.

To explain somewhat concerning the stacked body 48a that serves as the object to be welded, in this case, the stacked body 48a is constituted from three metallic plates 50a, 52a, 54a, which are stacked in this order from below. Among such plates, the metallic plates 50a, 52a have a thickness D1 (e.g., 1 mm to 2 mm), whereas the thickness D2 of the metallic plate 54a is set to a shorter dimension (e.g., 0.5 mm to 0.7 mm) in comparison with the thickness D1. More specifically, the respective thicknesses of the metallic plates 50a, 52a are the same, whereas the metallic plate 54a is thin-walled in comparison to the metallic plates 50a, 52a. Stated otherwise, the wall thickness of the metallic plate 54a is the smallest among the three metallic plates 50a, 52a, 54a that make up the stacked body 48a.

The metallic plates 50a, 52a are high resistance workpieces made, for example, from JAC590, JAC780, or JAC980, which are so-called high tensile strength steels (any of which is a high performance, high tensile strength steel, according to standards of the Japan Iron and Steel Federation), whereas the metallic plate 54a is a low resistance workpiece made, for example, from JAC270, which is a so-called mild steel (a high performance steel sheet for drawing, according to standards of the Japan Iron and Steel Federation). The metallic plates 50a, 52a may be of the same metal types or of different metal types.

Concerning the lower tip 32 and the upper tip 38, the stacked body 48a which serves as the object to be welded is gripped between the lower tip 32 and the upper tip 38, for thereby enabling an electrical current to be conducted through the stacked body 48a. The lower tip 32 is connected electrically to a negative terminal of a power source 56, whereas the upper tip 38 is connected electrically to a positive terminal of the power source 56. Thus, in the first embodiment, current flows from the upper tip 38 to the lower tip 32.

As will be described later, the distances Z1, Z2 between the upper tip 38 and the pressing rods 46a, 46b are set so that an appropriate surface pressure distribution is obtained in the metallic plate 54a and in the metallic plate 52a positioned directly beneath the metallic plate 54a.

In the above-mentioned structure, the servo motor, the cylinder mechanisms 42a, 42b, and the power source 56, which constitute the ball screw mechanism, are connected electrically to a gun controller 58 that operates as a control means. More specifically, operations as well as energization and deenergization of the servo motor, the cylinder mechanisms 42a, 42b, and the power source 56 are controlled by the gun controller 58.

The spot welding apparatus 10 according to the first embodiment is basically constructed as described above. Next, operations and effects of the spot welding apparatus 10 will be described in relation to a spot welding method (resistance welding method) according to the first embodiment.

When spot welding is carried out with respect to the stacked body, or stated otherwise, when the metallic plates 50a, 52a are joined together and the metallic plates 52a, 54a are joined together, at first, the robot moves the wrist unit 12, and more specifically the welding gun 14, in order to position the stacked body 48a between the lower tip 32 and the upper tip 38.

After the gun main body 24 has been lowered to a predetermined position, under operation of the gun controller 58, the servo motor that makes up the ball screw mechanism is energized, accompanied by start of rotation of the ball screw. In accordance therewith, the upper tip 38 and the pressing rods 46a, 46b descend in the direction of the arrow Y1 so as to approach the stacked body 48a. As a result, the stacked body 48a is gripped between the lower tip 32 and the upper tip 38.

Figure 2:
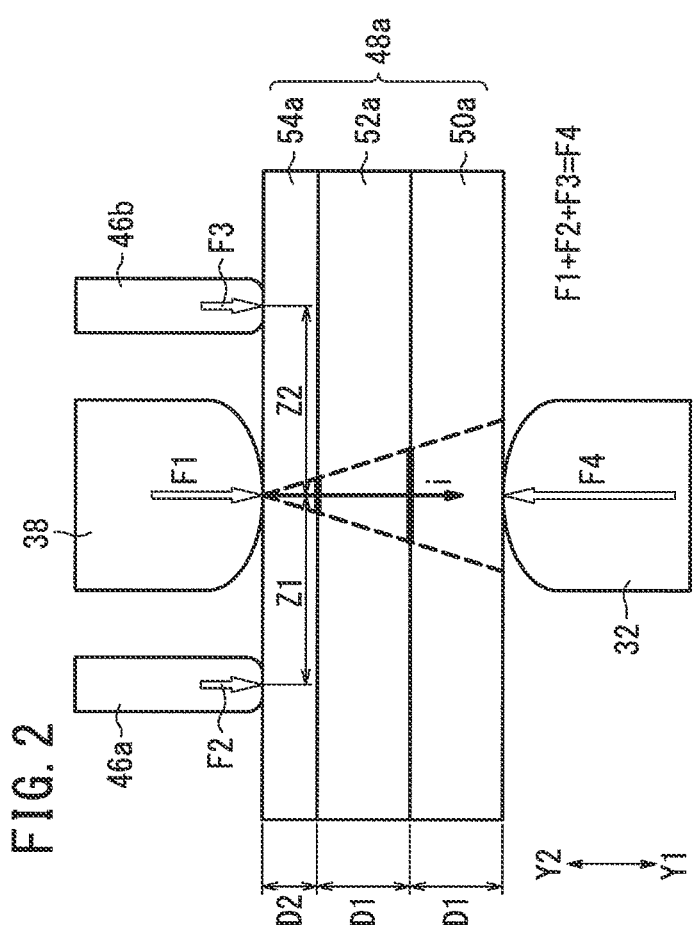
FIG. 2 is a frontal outline view of essential features showing a condition in which a stacked body, which serves as an object to be welded, is gripped by a lower tip, an upper tip, and pressing rods (pressing members)

On the other hand, the gun controller 58 also energizes the cylinder mechanisms 42a, 42b. In accordance therewith, the pressing rods 46a, 46b are made to project further in the direction of the arrow Y1, whereupon the pressing rods 46a, 46b are brought into abutment against the metallic plate 54a either simultaneously with or before or after the stacked body 48a is gripped by the upper tip 32 and the lower tip 38. In FIG. 2, a cross sectional view is presented which shows the situation at this time.

Figure 3:
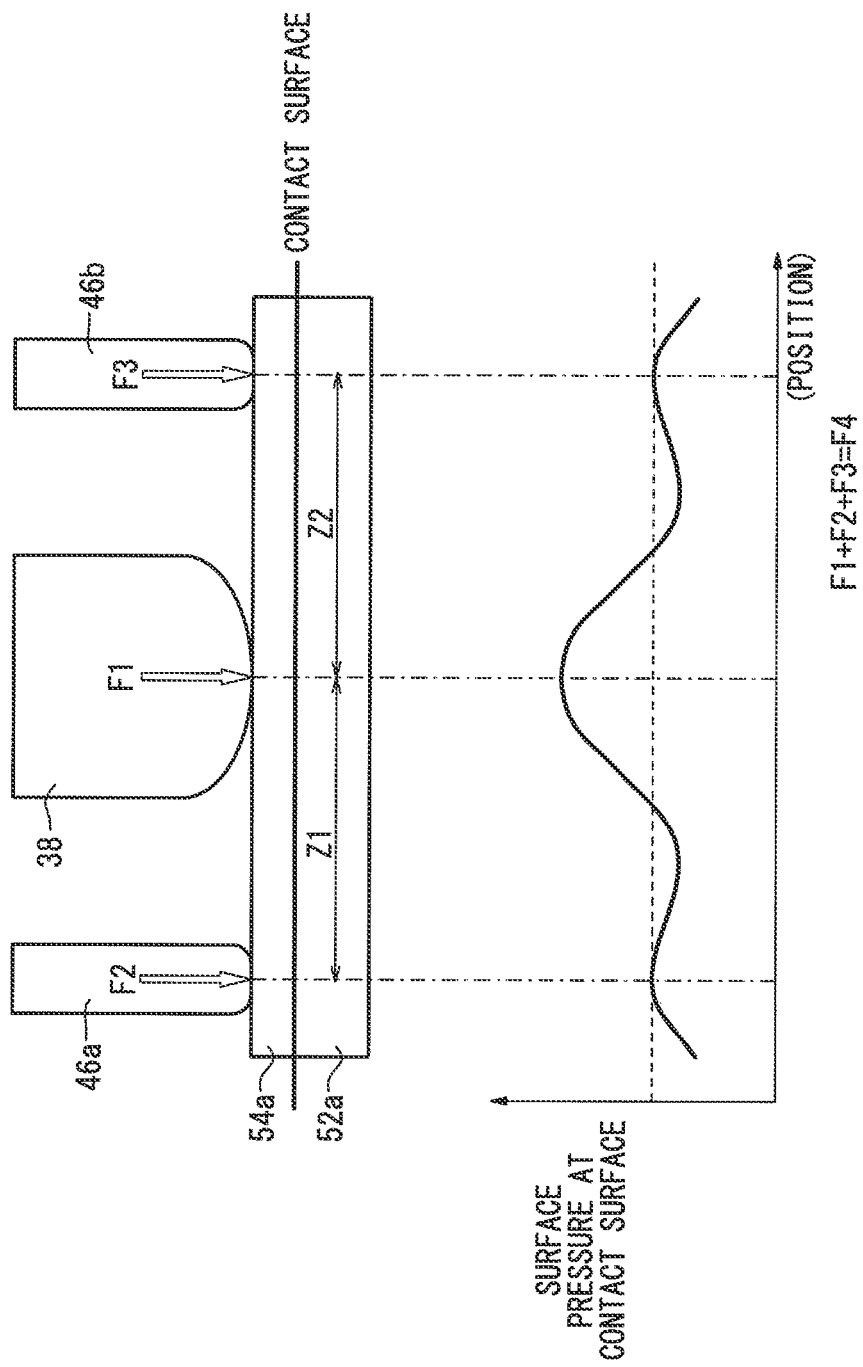
FIG. 3 is a front schematic view and a graph showing an example of a condition in which an appropriate surface pressure distribution is formed between an uppermost positioned workpiece of the stacked body and a workpiece directly underneath the same.

As shown in FIG. 3, the distances Z1, Z2 between the upper tip 38 and the pressing rods 46a, 46b are set such that, at the contact surface between the metallic plate 54a and the metallic plate 52a, a surface pressure is greatest at the location where the upper tip 38 is pressed, and so that a next greatest surface pressure is obtained at locations where the metallic plates are pressed by the pressing rods 46a, 46b. Preferably, Z1 is equal to Z2 (Z1=Z2).

Stated otherwise, at the aforementioned contact surface, locations are formed where the surface pressure is smaller in comparison with the surface pressure due to pressing of the upper tip 38 and the surface pressure due to pressing of the pressing rods 46a, 46b. Thus, a pressure distribution is formed as shown in FIG. 2. Below, this distribution will be described in greater detail.

By way of the gun controller 58, the rotary energizing force of the servo motor that rotates the ball screw of the ball screw mechanism, and the urging force of the cylinder mechanisms 42a, 42b are controlled such that the total applied pressure (F1+F2+F3) of the upper tip 38 and the pressing rods 46a, 46b with respect to the metallic plate 54a is equal to or in balance with the applied pressure (F4) of the lower tip 32 with respect to the metallic plate 50a. In accordance with such a control, the applied pressure (F1+F2+F3) with respect to the stacked body 48a in the direction of the arrow Y1 is substantially the same as the applied pressure (F4) that acts thereon in the direction of the arrow Y2. Further, preferably, F2 is equal to F3 (F2=F3).

More specifically, at this time, the relationship F1<F4 is satisfied. Consequently, the force from the lower tip 32 and the upper tip 38 received by the stacked body 48a is distributed, as shown schematically in FIG. 2, such that the active region thereof widens (becomes larger) as the force proceeds from the upper tip 38 toward the lower tip 32. Therefore, the force acting on the contact surface between the metallic plates 52a, 54a is smaller in comparison to the force acting on the contact surface between the metallic plates 50a, 52a. Further, in the case that a location is not formed for which the surface pressure thereof is small in comparison with the surface pressure due to the applied pressure of the upper tip, and the surface pressures due to the applied pressures of the pressing rods 46a, 46b, as a result of the distances Z1, Z2 being excessively small, then it becomes difficult for this type of distribution to be formed.

Figure 4:
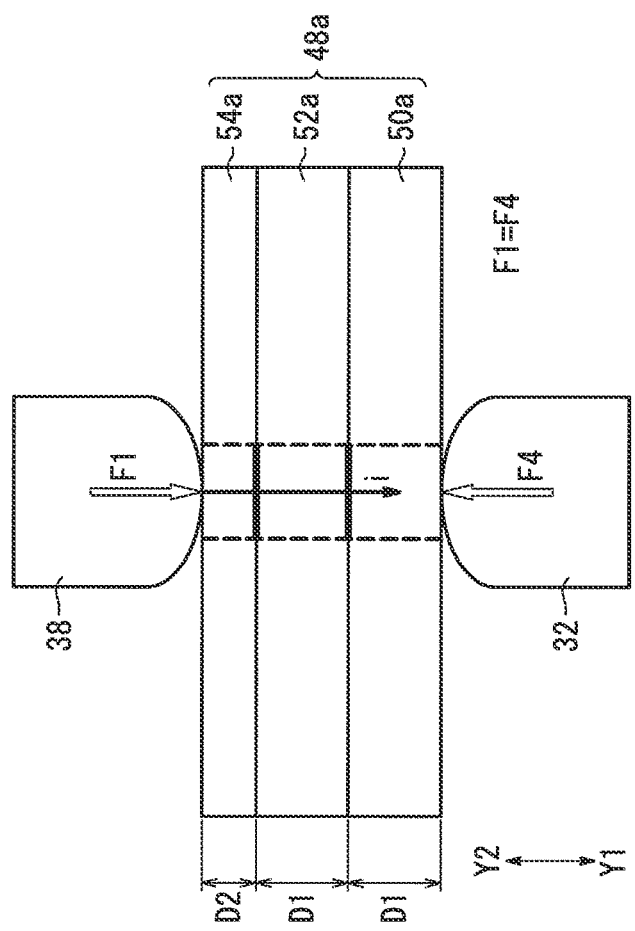
FIG. 4 is a front schematic view showing a state in which the stacked body is gripped solely by the lower tip and the upper tip.

FIG. 4 is a view showing schematically a force distribution received by the stacked body 48a from the lower tip 32 and the upper tip 38, for a case in which the pressing rods 46a, 46b are not used and F1=F4. As understood from FIG. 4, in this case, the force is substantially equivalent from the upper tip 38 to the lower tip 32. In other words, the force acting on the contact surface between the metallic plates 52a, 54a is equivalent to the force that acts on the contact surface between the metallic plates 50a, 52a.

In FIGS. 2 and 4, the range of the force that acts on the contact surface of the metallic plates 52a, 54a is shown by the bold lines. As understood by comparing FIGS. 2 and 4, the range at which the force acts is narrower when F1<F4 than when F1=F4. This implies that, compared to when F1=F4, when F1<F4 the range over which the metallic plate 54a is pressed against the metallic plate 52a is narrower, or stated otherwise, the contact surface area is small.

Accompanied by the applied pressure from the upper tip 38 to the lower tip being distributed, and the contact area of the metallic plate 54a with respect to the metallic plate 52a being small, a reactive force is created from the stacked body 48a toward the upper tip 38. In the first embodiment, such a reactive force is received by the pressing rods 46a, 46b.

In the foregoing manner, the cylinder mechanisms 42a, 42b including the pressing rods 46a, 46b are supported through the bridging member 40 with respect to the connecting rod 34, which is connected to the ball screw mechanism accommodated in the gun main body 24. Thus, ultimately, the reactive force received by the pressing rods 46a, 46b is absorbed by the gun main body 24 (welding gun 14).

Accordingly, in this case, the reactive force from the stacked body 48a can be prevented from acting on the robot. Therefore, it is unnecessary to adopt for use as the robot a large scale structure having a large rigidity. Stated otherwise, a small scale robot can be used, and as a result, investment costs for equipment can be kept to a minimum.

Next, the gun controller 58 outputs a control signal to the power source 56 to initiate conduction of current. As a result, as shown in FIG. 2 (as well as FIG. 4), a current i begins to flow in a direction from the upper tip 38 to the lower tip 32. As noted above, the upper tip 38 and the lower tip 32 are connected respectively to positive and negative terminals of the power source 56. Additionally, regions between the metallic plates 50a, 52a, and between the metallic plates 52a, 54a are heated respectively by Joule heating based on the current i.

Figure 5:
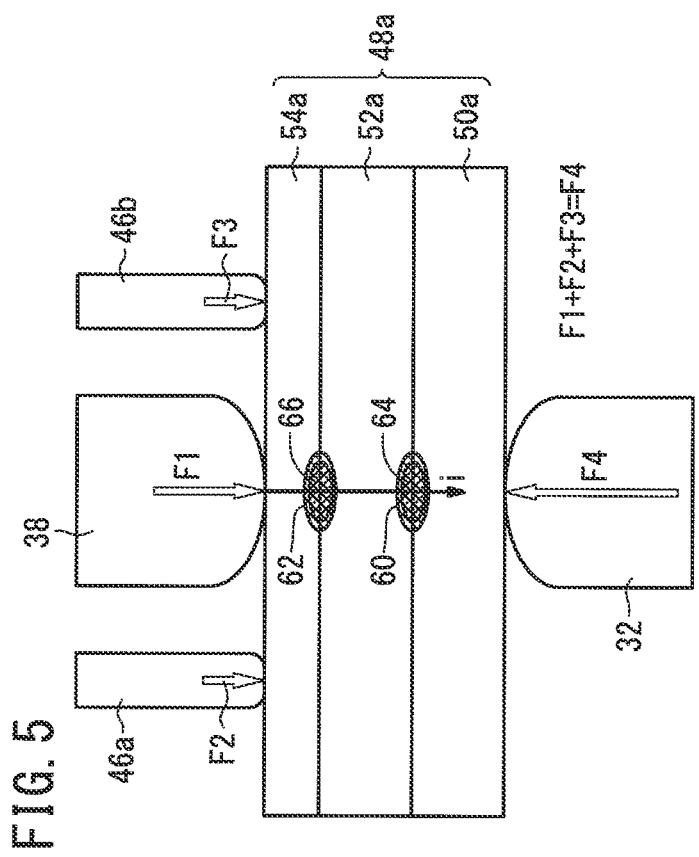
FIG. 5 is a schematic vertical cross sectional view showing a condition in which conduction of current is started from the condition in FIG. 2, and the current flows from the upper tip to the lower tip.

As noted previously, the contact area between the metallic plate 54a and the metallic plate 52a shown in FIG. 2 is smaller than the contact area between the metallic plate 54a and the metallic plate 52a shown in FIG. 4. For this reason, the contact resistance and the current density at the contact surface between the metallic plates 52a, 54a are greater for the case shown in FIG. 2 than for the case shown in FIG. 4, or stated otherwise, are greater when F1<F4 than when F1=F4. More specifically, when F1<F4, the generated amount of Joule heating, or in other words the amount of generated heat, is greater in comparison to when F1=F4. Accordingly, as shown in FIG. 5, when F1<F4, the heated region 60 generated at the contact surface between the metallic plates 50a, 52a, and the heated region 62 generated at the contact surface between the metallic plates 52a, 54a are developed to have substantially the same size.

The contact surface between the metallic plates 50a, 52a, and the contact surface between the metallic plates 52a, 54a are heated by the heated regions 60, 62, whereby a sufficient rise in heat is created to start to induce melting. As a result of such melted portions that are formed thereby being cooled and hardened, nuggets 64, 66 are formed respectively between the metallic plates 50a, 52a and between the metallic plates 52a, 54a. In FIG. 5, for facilitating understanding, the nuggets 64, 66 actually are shown; however, during conduction of current, such nuggets exist in the form of melted portions in a liquid phase. A similar convention shall be adopted in the subsequent figures to be discussed below.

As noted above, the heated region 60 at the contact surface between the metallic plates 50a, 52a, and the heated region 62 at the contact surface between the metallic plates 52a, 54a are of substantially the same size. Accordingly, the nuggets 64, 66 formed thereby also are of substantially the same size to each other.

While the melted portions are being formed, the metallic plate 54a is pressed by the pressing rods 46a, 46b toward the side of the metallic plate 52a. As a result of being pressed in this manner, the low rigidity metallic plate 54a is suppressed from reacting to the conduction of current (heating), or more specifically, is prevented from separating away from the metallic plate 52a. Owing thereto, the softened melted portion can be prevented from scattering as spatter from spaced locations between the metallic plate 54a and the metallic plate 52a.

After the melted portions have grown sufficiently over a predetermined period of time, conduction of current is halted, and the upper tip 38 is separated away from the metallic plate 54*a*. Alternatively, the upper tip 38 and the lower tip 32 may be electrically insulated from each other simply by separating the upper tip 38 from the metallic plate 54*a*.

All of the above-mentioned operations from initiation until completion of spot welding are conducted under the control of the gun controller 58.

In the foregoing manner, accompanying the termination of conduction of current, heating of the metallic plates 50*a*, 52*a*, 54*a* is brought to an end. With the passage of time, the melted portions are cooled and solidified respectively into nuggets 64, 66, whereupon the metallic plates 50*a*, 52*a*, and the metallic plates 52*a*, 54*a* are joined together mutually through the nuggets 64, 66 to result in a bonded product.

In the bonded product, similar to the bonding strength between the metallic plates 50*a*, 52*a*, the bonding strength between the metallic plates 52*a*, 54*a* is superior. This is because, as noted above, the nugget 66 is grown to a sufficient size between the metallic plates 52*a*, 54*a* accompanying the adequate level of Joule heating at the contact surface between the metallic plates 52*a*, 54*a*.

As noted above, according to the first embodiment, generation of spatter can be avoided, together with enabling the nugget 66 to be grown between the metallic plates 52*a*, 54*a* to a size that is substantially the same as that of the nugget 64 between the metallic plates 50*a*, 52*a*. Consequently, a formed product can be obtained that exhibits superior bonding strength between the metallic plates 52*a*, 54*a*.

With the first embodiment, although the nugget 66 between the metallic plates 52*a*, 54*a* can be formed to a size commensurate with increasing the amount of the pressing forces F2, F3 by the pressing rods 46*a*, 46*b*, if the pressing forces F2, F3 are increased to a certain amount, a tendency exists for the size or degree of growth of the nugget to become saturated. Stated otherwise, even though the pressing forces F2, F3 are increased in excess of a certain amount, it is difficult for the nugget 66 to be grown beyond a certain size. Further, if the pressing forces F2, F3 are increased excessively, in accordance with the balanced relationship between the pressing force F4 and the sum of the pressing forces F1, F2, F3, it is required that the pressing force F1 become excessively small. As a result, the nugget 64 formed between the metallic plates 50*a*, 52*a* becomes smaller.

Accordingly, the difference between the pressing force F1 from the upper tip 38, and the pressing forces F2, F3 from the pressing rods 46*a*, 46*b* preferably is set to enable the nuggets 64, 66 to be as large in size as possible.

With the spot welding apparatus 10 shown in FIG. 1, although the cylinder mechanisms 42*a*, 42*b* are supported by the connecting rod 34, the cylinder mechanisms 42*a*, 42*b* may be supported by the gun main body 24, or may be supported by the fixed arm 30.

Further, in any of these cases, in place of the cylinder mechanisms 42*a*, 42*b*, various other types of pressure applying means, such as spring coils, servo motors, or the like, can be adopted.

Furthermore, a pressing member may be provided by an annular shaped member that is arranged to surround the upper tip 38.

Furthermore, the materials of the assembly of the metallic plates 50*a*, 52*a*, 54*a* are not particularly limited to the aforementioned steel materials, and may be any materials on which spot welding can be performed. For example, an assembly may be provided in which all of the metallic plates 50*a*, 52*a*, 54*a* are mild steel, or an assembly may be provided in which only the metallic plate 50*a* is high tensile strength steel, whereas the metallic plates 52*a*, 54*a* are both made of mild steel.

Figure 6:
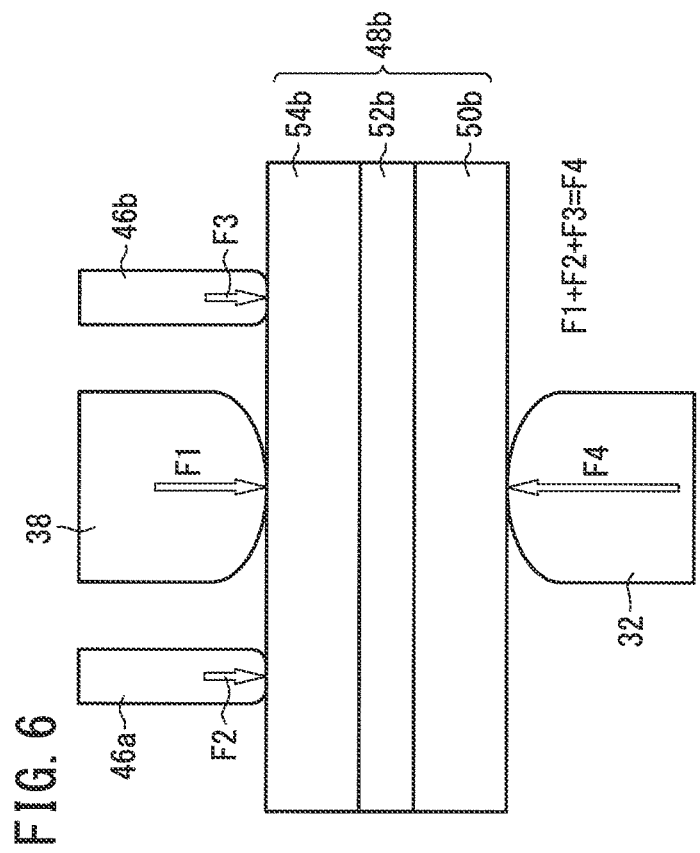
FIG. 6 is a schematic front view of essential features showing a condition in which a stacked body, which differs from that shown in FIG. 2, is gripped by the lower tip, the upper tip, and the pressing rods (pressing members)

Further, the object to be welded is not limited to a stacked body 48*a*, in which the thickness of the uppermost positioned metallic plate 54*a* is smaller than that of the metallic plates 50*a*, 52*a*. As shown in FIG. 6, a stacked body 48*b* may be provided in which a metallic plate 52*b* having a smallest thickness is sandwiched between the metallic plates 50*a*, 54*b*. As the materials for this exemplary assembly, an assembly may be offered in which the metallic plate 50*b* is made of high tensile strength steel, and the metallic plates 52*b*, 54*b* are made of mild steel, although no particular limitation is placed on the types of materials used.

Of course, the stacked body may have a centrally positioned metallic plate that is largest in thickness, or the stacked body may have a lowermost positioned metallic plate the thickness of which is smaller in comparison with the other two metallic plates.

Figure 7:
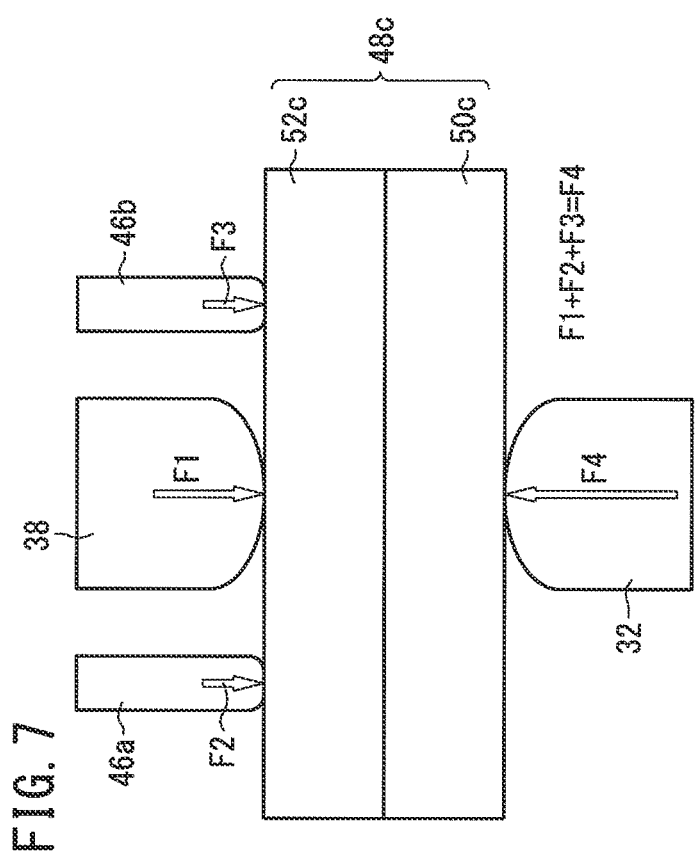
FIG. 7 is a schematic front view of essential features showing a condition in which a stacked body, which differs from those shown in FIGS. 2 and 6, is gripped by the lower tip, the upper tip, and the pressing rods (pressing members)

In addition, the number of metallic plates is not limited to three. For example, as shown in FIG. 7, a stacked body 48*c* may be provided in which a metallic plate 52*c* made from high tensile strength steel is stacked with respect to another metallic plate 50*c* also made from high tensile strength steel.

The pressing member may also be constituted from an auxiliary electrode. Below, such a case will be described as a second embodiment of the present invention. Constituent elements thereof, which are the same as those shown in FIGS. 1 through 7, are designated using the same reference characters, and detailed explanations of such features are omitted.

Figure 8:
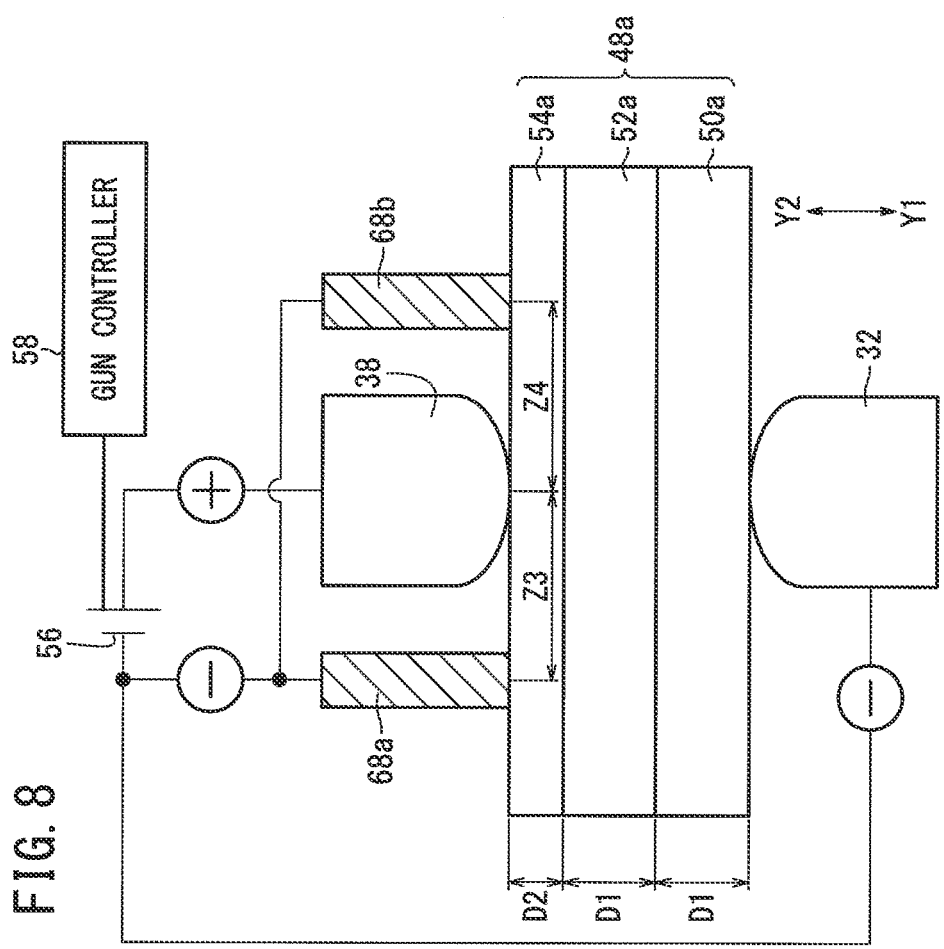
FIG. 8 is a schematic front view of essential features showing a condition in which a stacked body is gripped by an upper tip (first welding tip), a lower tip (second welding tip), and auxiliary electrodes, which make up a resistance welding device according to a second embodiment of the present invention.

FIG. 8 is a schematic front view of essential features of a spot welding apparatus according to a second embodiment of the present invention. The non-illustrated welding gun that makes up the spot welding apparatus, similar to the welding gun of the spot welding apparatus according to the first embodiment, is equipped with a lower tip 32 that serves as a second welding tip and an upper tip 38 that serves as a first welding tip, which are disposed on a wrist unit 12 (see FIG. 1) of a non-illustrated robot. Further, the welding gun includes auxiliary electrodes 68*a*, 68*b*, which are formed in rod-like shapes similar to the pressing rods 46*a*, 46*b*. In the second embodiment as well, an electric current is made to flow from the upper tip 38 to the lower tip 32.

In this case, on the gun main body 24 that supports the upper tip 38, a displacement mechanism, for example, a ball screw mechanism or a cylinder mechanism or the like, is provided, which causes the auxiliary electrodes 68*a*, 68*b* to be brought into proximity and separated away from the stacked body 48*a*. In accordance with such a displacement mechanism, the auxiliary electrodes 68*a*, 68*b* are capable of approaching toward and separating away from the stacked body 48*a* independently from the upper tip 38. In the second embodiment as well, the displacement mechanism preferably is disposed on the side of the welding gun.

In the second embodiment, the upper tip 38 is connected electrically to the positive terminal of the power source 56, whereas the lower tip 32 and the auxiliary electrodes 68*a*, 68*b* are connected electrically to the negative terminal of the power source 56. As understood from this feature, although the upper tip 38 and the auxiliary electrodes 68*a*, 68*b* are both brought into abutment together against the metallic plate 54*a* that is positioned uppermost on the stacked body 48*a*, the polarities thereof are mutually opposite to one another. In the following drawings, when the upper tip 38 and the auxiliary electrodes 68*a*, 68*b* are connected electrically and branching currents i2 are generated, the polarity of the auxiliary electrodes 68a, 68b is shown in the drawings, whereas conversely, at times that the branching currents i2 are not generated, the polarity of the auxiliary electrodes is not shown.

The distances Z3, Z4 between the upper tip 38 and the auxiliary electrodes 68a, 68b are set so that locations are formed where the surface pressure is smaller in comparison with the surface pressure due to the upper tip 38 and the surface pressures due to the auxiliary electrodes 68a, 68b, so that the applied pressure is distributed in a similar manner to the first embodiment (see FIG. 3). For this reason, although the upper tip 38 and the auxiliary electrodes 68a, 68b are separated to certain a degree from each other, if the distances Z3, Z4 between the upper tip 38 and the auxiliary electrodes 68a, 68b are excessively large, then resistance between the upper tip 38 and the auxiliary electrodes 68a, 68b increases, and it becomes difficult for the later-described branching currents i2 (see FIG. 10) to flow.

Accordingly, the distances Z3, Z4 are set to distances in order to obtain the aforementioned appropriate surface pressure distribution between the metallic plate 54a and the metallic plate 52a, and so that the resistance between the upper tip 38 and the auxiliary electrodes 68a, 68b is capable of allowing the branching currents i2 to flow at a suitable current value.

In the aforementioned configuration, the non-illustrated displacement mechanism and the power source 56 are connected electrically to the gun controller 58.

The spot welding apparatus according to the second embodiment is basically constructed as described above. Next, operations and effects of the spot welding apparatus will be described in relation to a spot welding method according to the second embodiment.

When spot welding is carried out with respect to the stacked body 48a, similar to the first embodiment, the aforementioned robot moves the welding gun in order to position the stacked body 48a between the upper tip 38 and the lower tip 32. Thereafter, the upper tip 38 and the lower tip 32 are brought into mutual proximity, and as a result, the stacked body 48a is gripped between the upper tip 38 and the lower tip 32.

Simultaneously with, or before or after the stacked body 48a is gripped, the auxiliary electrodes 68a, 68b are brought into abutment against the metallic plate 54a, whereupon the condition, which is shown schematically in cross section in FIG. 8, is brought about. Naturally, displacement for bringing the auxiliary electrodes 68a, 68b into abutment against the metallic plate 54a is carried out under operation of the displacement mechanism, which displaces the auxiliary electrodes 68a, 68b.

In this case as well, the gun controller 58 sets the applied pressures F2, F3 of the auxiliary electrodes 68a, 68b with respect to the metallic plate 54a such that the total applied pressure (F1+F2+F3) of the applied pressures F2, F3 together with the applied pressure F1 from the upper tip 38 is equal to or in balance with the applied pressure F4 from the lower tip 32.

In the second embodiment, in the same manner as the first embodiment, the difference between the pressing force F1 from the upper tip 38, and the pressing forces F2, F3 from the auxiliary electrodes 68a, 68b preferably is set to enable the nugget formed between the metallic plates 50a, 52a, and the nugget formed between the metallic plates 52a, 54a to be as large in size as possible.

Figure 9:
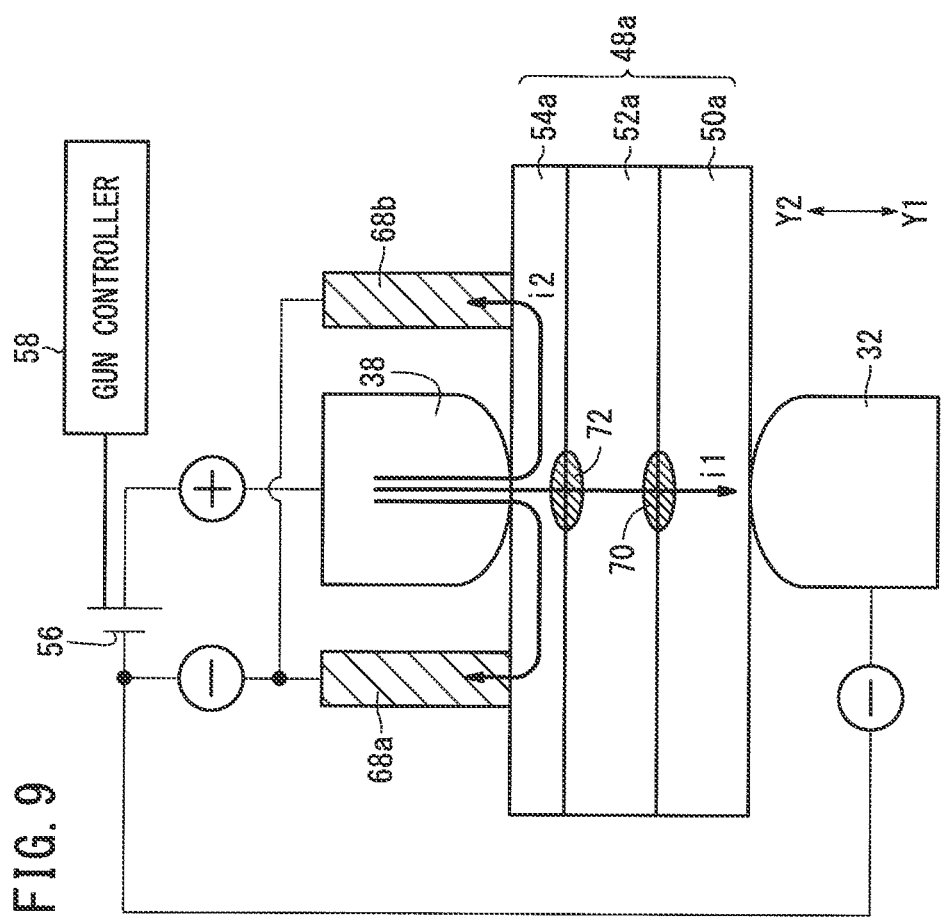
FIG. 9 is a schematic vertical cross sectional view showing a condition in which conduction of current is started from the condition in FIG. 8, and a current flows from the upper tip to the lower tip.

Next, conduction of current is started. In the second embodiment, because the upper tip 38 and the lower tip 32 are connected respectively to the positive electrode and the negative terminal of the power source 56, as shown in FIG. 9, a current i1 flows from the upper tip 38 to the lower tip 32. As a result of Joule heating based on the current i1, regions between the metallic plates 50a, 52a and the metallic plates 52a, 54a are heated respectively, thereby forming heated regions 70, 72 therein.

The auxiliary electrodes 68a, 68b are held in abutment against the metallic plate 54a, and the polarity of the auxiliary electrodes 68a, 68b is negative. Accordingly, simultaneously with generation of the aforementioned current i1, branching currents i2 also are generated that flow from the upper tip 38 to each of the auxiliary electrodes 68a, 68b.

In this manner, in the second embodiment, branching currents i2 are generated which do not flow in the metallic plates 50a, 52a, but flow only through the metallic plate 54a. As a result, compared to general spot welding in which only the upper tip 38 and the lower tip 32 are used, the current value that passes through the interior of the metallic plate 54a is increased.

Figure 10:
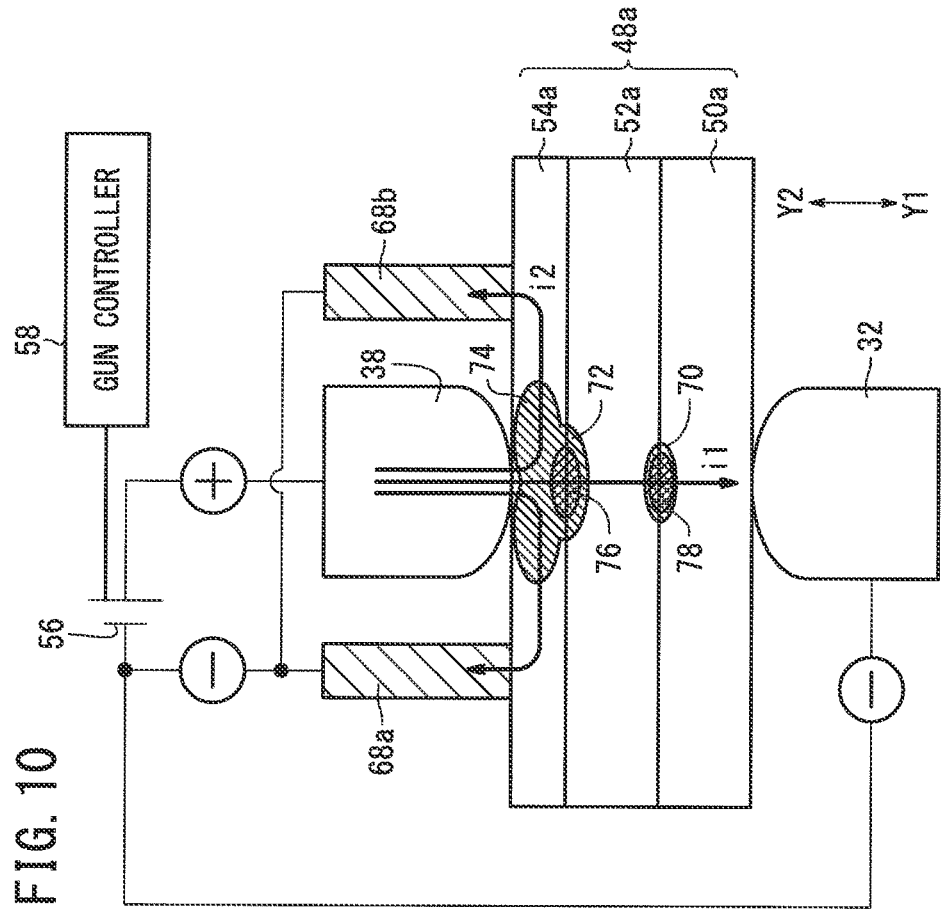
FIG. 10 is a schematic vertical cross sectional view showing a condition in which conduction of current is continued from the state shown in FIG. 9.

Accordingly, in this case, in the interior of the metallic plate 54a, another heated region 74 is formed apart from the aforementioned heated region 72. The heated region 74 enlarges with the passage of time, and as shown in FIG. 10, becomes integrated with the heated region 72.

At the contact surface between the metallic plates 52a, 54a, heat is transmitted from both of the heated regions 72, 74, which are integrated in the foregoing manner. Additionally, in this case, similar to the first embodiment, the contact resistance of the contact surface between the metallic plates 52a, 54a becomes large in comparison with the contact surface between the metallic plates 50a, 52a. Owing thereto, the temperature rises sufficiently at the contact surface and melting is started, and as a result, a nugget 76 is formed between the metallic plates 52a, 54a.

The heated region 74 can be made larger as the percentage of the branching currents i2 becomes greater. However, in the event that the percentage of the branching currents i2 becomes excessively large, since the current value of the current i1 decreases, the heated regions 70, 72 become smaller in size. As a result, the size of the nugget 76 becomes saturated, whereas the nugget 78 has a tendency to become smaller. Accordingly, the percentage of the branching currents i2 preferably is set such that the current i1 flows to a degree that enables the nugget 78 to grow adequately.

Further, the percentages or ratio of the current i1 and the branching currents i2 can be adjusted, for example as noted above, by changing the distances Z3, Z4 (see FIG. 8) between the upper tip 38 and the auxiliary electrodes 68a, 68b. A preferred ratio of the current i1 and the branching currents i2 is 70:30, for example.

The melted portion, and thus the nugget 76, grows over time so long as the current continues to flow. Accordingly, by continuing the conduction of current for a predetermined time, the nugget 76 can be grown to a sufficient size.

In this case, the current value of the current i1 flowing in the metallic plates 50a, 52a is smaller in comparison with that used in general spot welding. For this reason, during the time that the melted portion (nugget 76) grows to a large size between the metallic plates 52a, 54a, the amount by which the metallic plates 50a, 52a is heated can be prevented from increasing excessively. Accordingly, any concerns over generation of spatter can be dispensed with.

During this time, a melted portion that becomes the nugget 78 is formed between the metallic plates 50a, 52a due to the current i1. If the branching currents i2 continue to flow, compared to stopping flow of the branching currents i2, the overall conduction rate of the current i1 becomes smaller, and therefore there is a tendency for the heated region 70, and thus the nugget 78, to become somewhat smaller in size.

Figure 11:
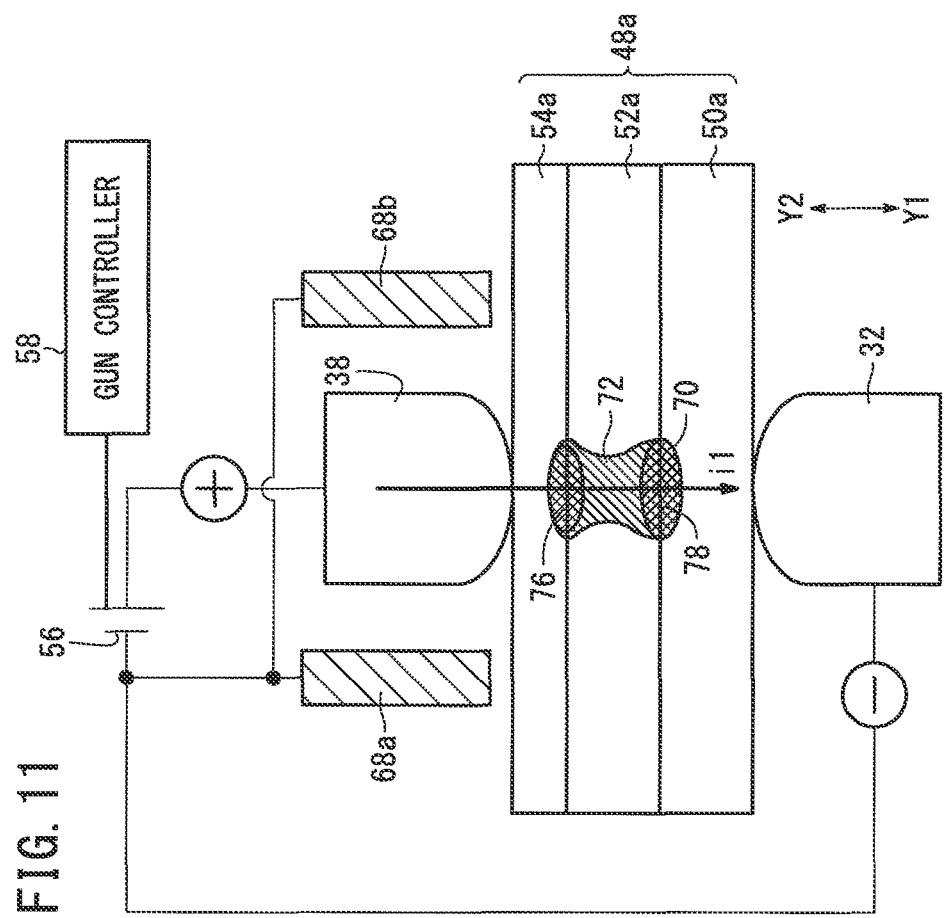
FIG. 11 is a schematic vertical cross sectional view showing a condition in which only the auxiliary electrodes are separated from the stacked body, whereas current continues to be conducted from the upper tip to the lower tip.

Accordingly, if it is desired for the nugget to be made to grow further, then as shown in FIG. 11, preferably, only the auxiliary electrodes 68a, 68b are separated away from the metallic plate 54a while current continues to be conducted from the upper tip 38 to the lower tip 32. Accompanying separation of the auxiliary electrodes 68a, 68b from the metallic plate 54a, since the value of the current i1 increases, the total amount of conduction of the current i1 becomes greater until conduction of the current is terminated.

In this case, since the branching currents i2 vanish, only the current i1 from the upper tip 38 to the lower tip 32 flows through the metallic plate 54a. As a result, the heated region 74 (see FIG. 10) also vanishes.

On the other hand, in the metallic plates 50a, 52a, a condition is brought about which is similar to ordinary spot welding. More specifically, at the metallic plates 50a, 52a, which are of greater thickness, the generated amount of Joule heating increases, and as a result, the heated region 70 widens together with the temperature thereof rising further. The contact surface between the metallic plates 50a, 52a is heated by the heated region 70 which has risen in temperature, and thus, the temperature in the vicinity of the contact surface rises sufficiently and becomes melted, thereby promoting growth of the melted portion (nugget 78).

Figure 12:
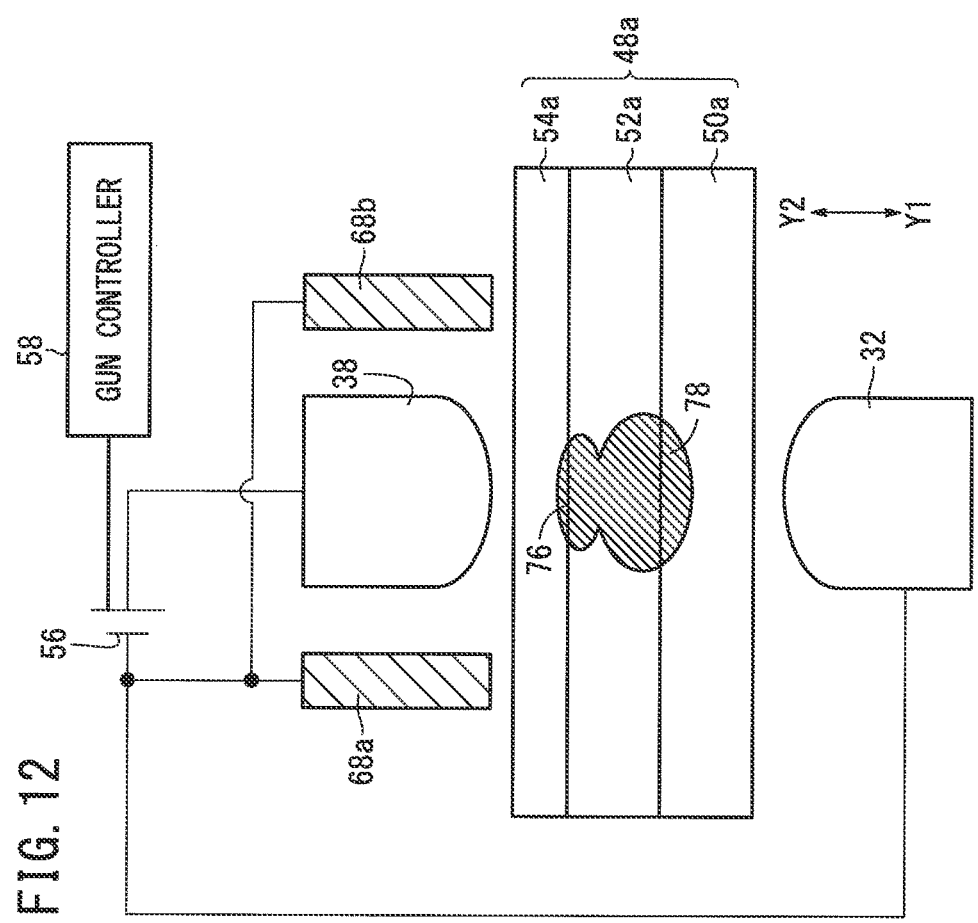
FIG. 12 is a schematic vertical cross sectional view showing a condition in which, continuing from the situation shown in FIG. 11, the upper tip is separated away from the stacked body, and conduction of current (resistance welding) is terminated.

Subsequently, until the melted portion (nugget 78) has grown sufficiently, for example as shown in FIG. 12, current may continue to be conducted until the melted portion becomes integrated with the melted portion that forms the nugget 76. The degree of growth of the nugget 78 with respect to the duration for which current continues to be conducted may be confirmed in advance experimentally by carrying out spot welding using a test piece or the like.

The contact surface between the metallic plates 50a, 52a is heated beforehand by the heated region 70 that was formed accompanying passage of the current i1 at the time that the nugget 76 was grown between the metallic plates 52a, 54a. Owing thereto, conformability of the metallic plates 50a, 52a to such heating is enhanced prior to the melted portion that forms the nugget 78 growing in size. Accordingly, it is more difficult for spatter to occur.

In the foregoing manner, according to the second embodiment, the occurrence of spatter can be avoided both when the nugget 76 is grown between the metallic plates 52a, 54a, as well as when the nugget 78 is grown between the metallic plates 50a, 52a.

After the melted portion that forms the nugget has grown sufficiently upon the passage of a predetermined period of time, conduction of current is stopped, and as shown in FIG. 12, the upper tip 38 is separated away from the metallic plate 54a. Alternatively, the upper tip 38 and the lower tip 32 may be electrically insulated from each other simply by separating the upper tip 38 away from the metallic plate 54a.

All of the above-mentioned operations from initiation until completion of spot welding are conducted under the control of the gun controller 58.

In this manner, accompanying the termination of conduction of current, heating of the metallic plates 50a, 52a is brought to an end. With the passage of time, the melted portion is cooled and solidified, whereupon the metallic plates 50a, 52a are joined together mutually through the nugget 78.

In the foregoing manner, the metallic plates 50a, 52a, and the metallic plates 52a, 54a that make up the stacked body 48a are joined, whereupon a bonded article is obtained as a final product.

In the bonded product, similar to the bonding strength between the metallic plates 50a, 52a, the bonding strength between the metallic plates 52a, 54a is superior. This is because, as noted above, the nugget 76 is grown to a sufficient size between the metallic plates 52a, 54a accompanying flow of the branching currents i2 in the metallic plate 54a.

In addition, as easily comprehended from the foregoing discussion, when the spot welding apparatus according to the second embodiment is constructed, the auxiliary electrodes 68a, 68b, and a displacement mechanism for displacing the auxiliary electrodes 68a, 68b may be provided. Accordingly, the structure of the spot welding apparatus together with the provision of the auxiliary electrodes 68a, 68b is not increased in complexity.

In the second embodiment as well, the object to be welded is not limited to the stacked body 48a, and it is possible to weld various types of stacked bodies, which differ in the number of metallic plates, the materials, and the thicknesses thereof. Below, further detailed examples shall be presented concerning this point.

Figure 13:
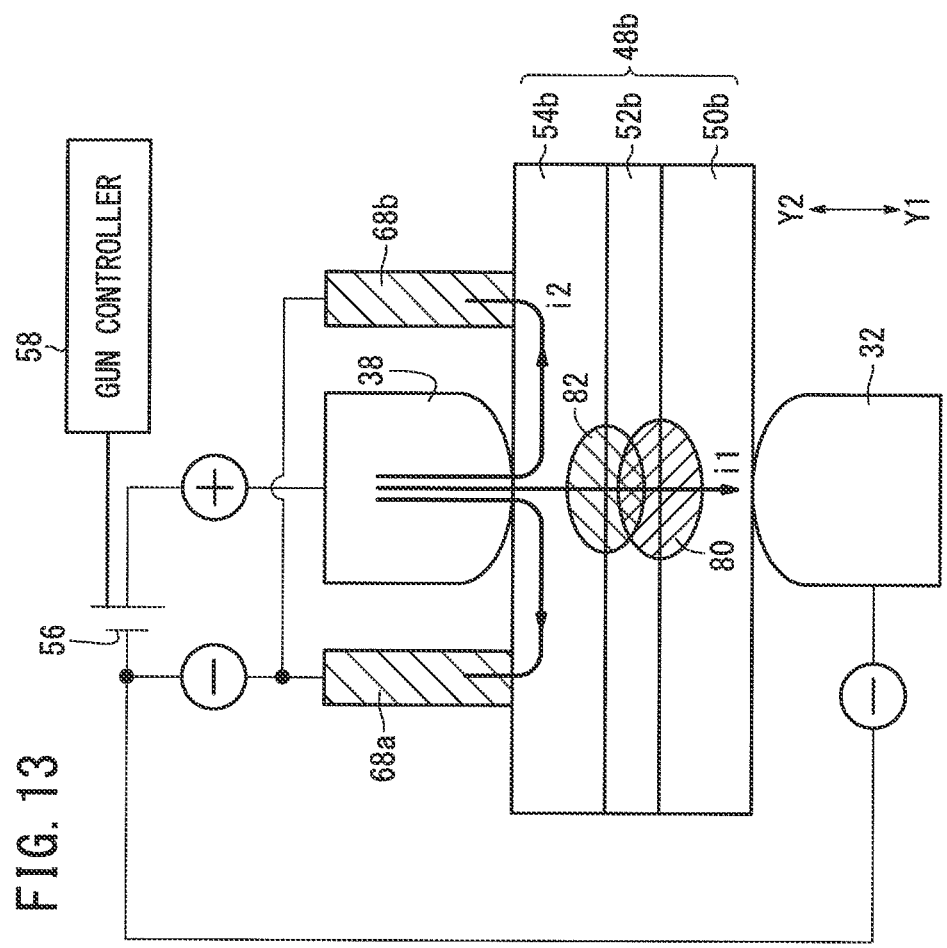
FIG. 13 is a schematic front view of essential features showing a condition in which a stacked body, which differs from that shown in FIG. 8, is gripped by the lower tip, the upper tip, and the auxiliary electrodes, and conduction of current is started.

The stacked body 48b shown in FIG. 13 is formed by sandwiching a metallic plate 52b, which is smallest in thickness, between the metallic plates 50b and 54b. For example, the metallic plate 50b is a high resistance workpiece made of high tensile strength steel, whereas the metallic plates 52b, 54b are low resistance workpieces made of mild steel.

In the case that spot welding is carried out with respect to the stacked body 48b using only the upper tip 38 and the lower tip 32, the contact surface between the metallic plates 50b, 52b is melted with higher priority. Since the metallic plate 50b is a high resistance workpiece, the contact resistance of the metallic plates 50b, 52b is greater than the contact resistance of the metallic plates 52b, 54b. Accordingly, when conduction of current is continued from the upper tip 38 to the lower tip 32 in order that a nugget is grown sufficiently at the contact surface between the metallic plates 52b, 54b, there is a concern that spatter will occur from the contact surface between the metallic plates 50b, 52b.

In contrast thereto, as shown in FIG. 13, according to the second embodiment that uses the auxiliary electrodes 68a, 68b, heated regions 80, 82 are formed at both the contact surface between the metallic plates 50b, 52b and at the contact surface between the metallic plates 52b, 54b. Thus, similar to the case of the above-described stacked body 48a, branching currents i2 are made to flow in the metallic plate 54b, whereby the contact surface between the metallic plates 52b, 54b can be heated sufficiently.

Figure 14:
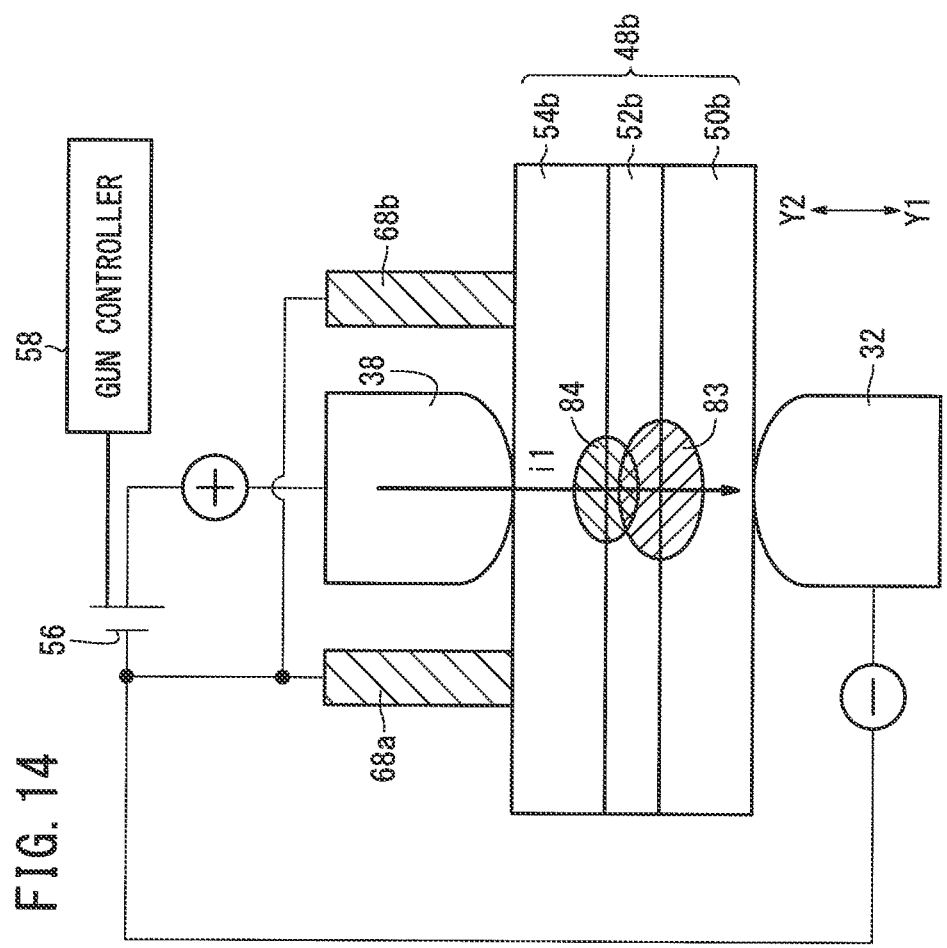
FIG. 14 is a schematic vertical cross sectional view showing a condition in which the electrical connection between the auxiliary electrodes and a negative electrode of a power supply is disconnected, whereas current continues to be conducted from the upper tip to the lower tip.
Figure 15:
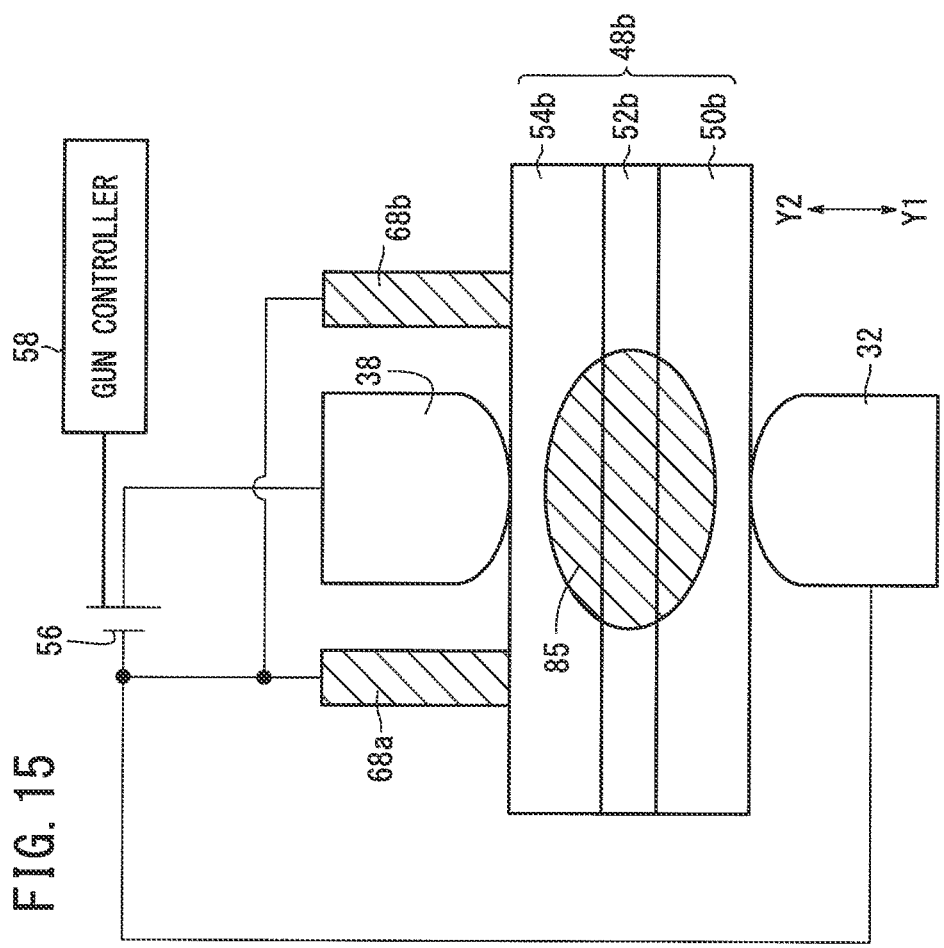
FIG. 15 is a schematic vertical cross sectional view showing a condition in which conduction of current (resistance welding) is terminated.

Consequently, the nuggets 83, 84 shown in FIG. 14 are formed. After the branching currents i2 have vanished, the current i1 continues to flow, such that, for example as shown in FIG. 15, a nugget 85 can be formed which is grown to a sufficient size spanning across both the contact surface between the metallic plates 50b, 52b and the contact surface between the metallic plates 52b, 54b.

As can be comprehended from the above descriptions in relation to carrying out spot welding with respect to the stacked bodies 48a, 48b, by utilizing the auxiliary electrodes 68a, 68b, a heated region, and hence a nugget, can be moved into proximity to the side against which the auxiliary electrodes 68a, 68b are placed in abutment.

Further, it is a matter of course that the stacked body is not particularly limited to an assembly in which the metallic plate 50b is made of high tensile strength steel, and the metallic plates 52b, 54b are made of mild steel.

Figure 16:
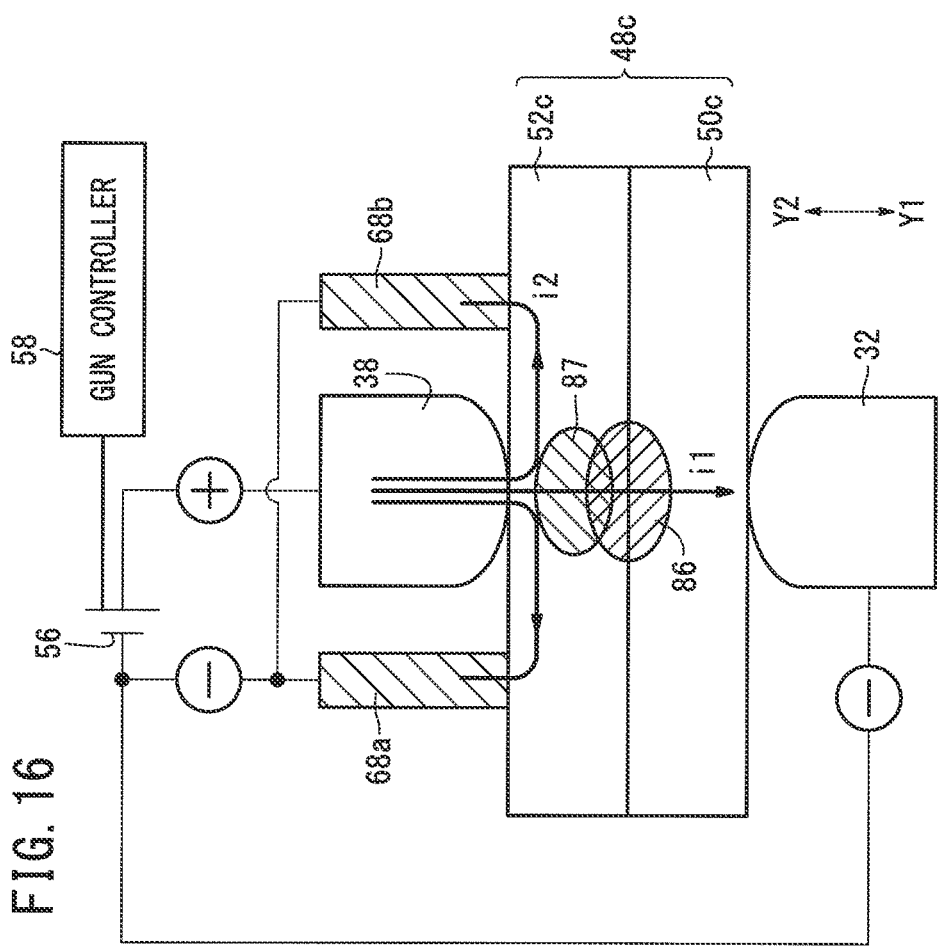
FIG. 16 is a schematic front view of essential features showing a condition in which a stacked body, which differs from those shown in FIGS. 8 and 13, is gripped by the lower tip, the upper tip, and auxiliary electrodes, and conduction of current is started.
Figure 53:
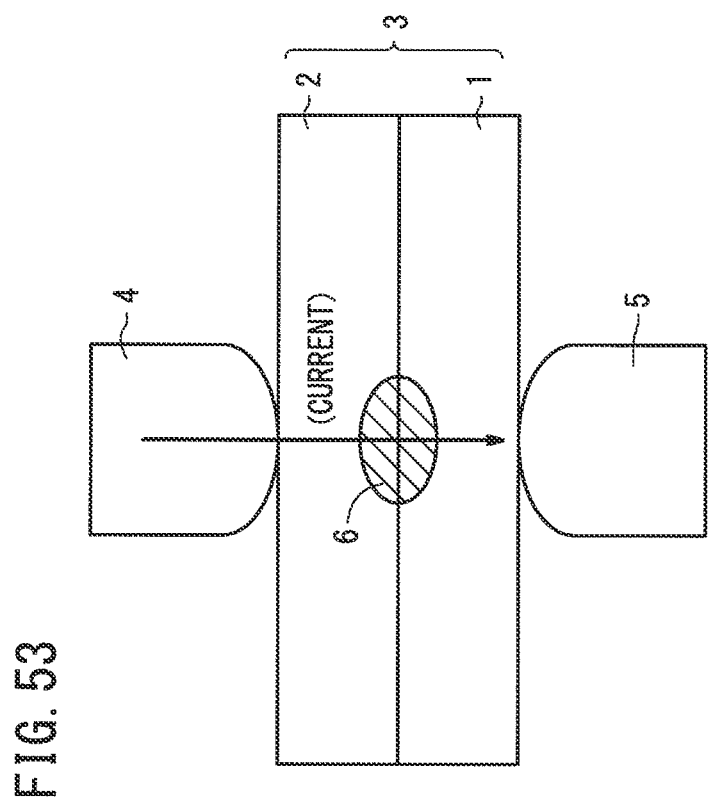
FIG. 53 is a schematic vertical cross sectional view showing a condition in general resistance welding, in which a stacked body is gripped only between a lower tip and an upper tip, and current is made to flow from the upper tip to the lower tip.
Figure 54:
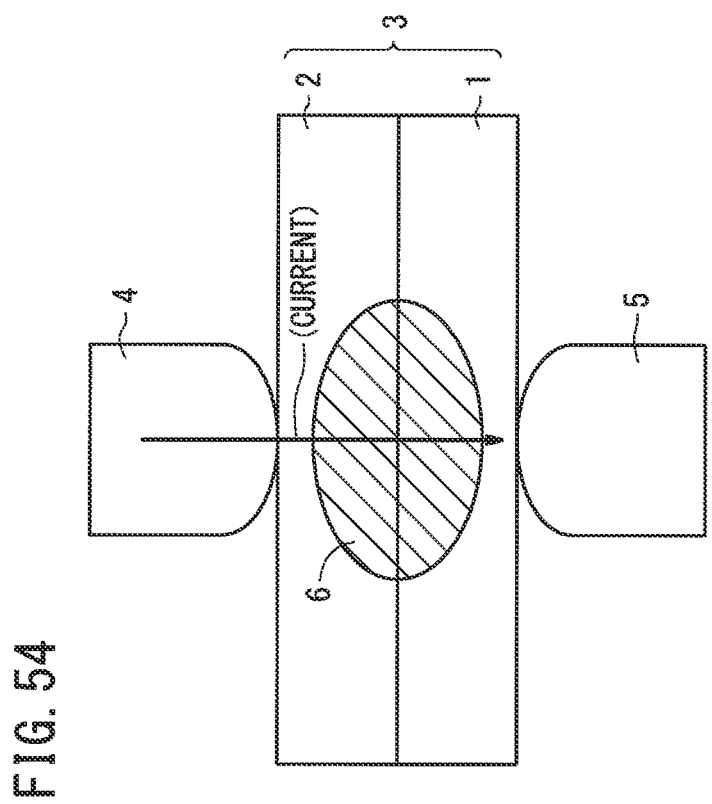
FIG. 54 is a schematic vertical cross sectional view showing a condition in which a melted portion is grown from the situation shown in FIG. 53.
Figure 55:
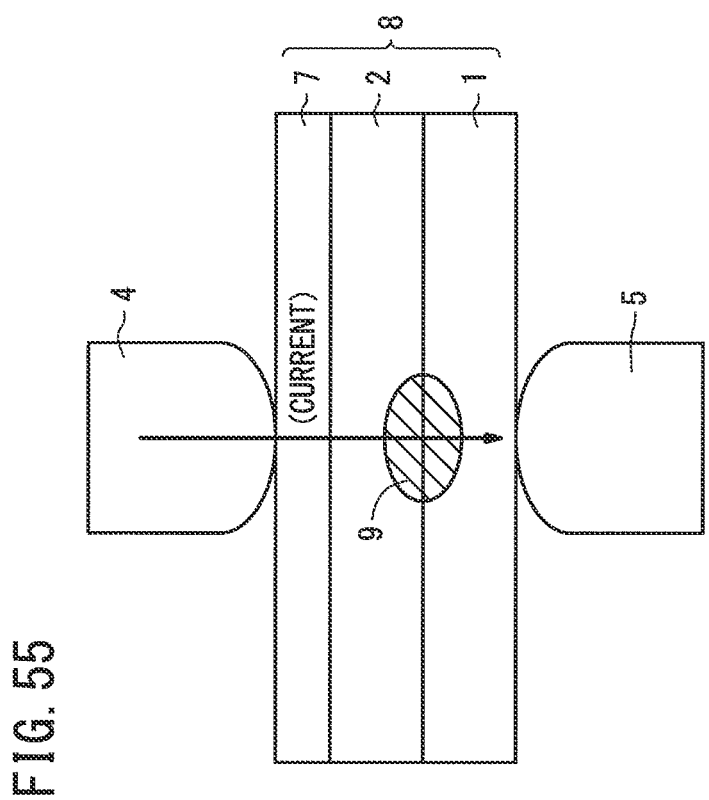
FIG. 55 is a schematic vertical cross sectional view showing a condition in which a stacked body, which differs from that shown in FIG. 53, is gripped only between a lower tip and an upper tip, and current is made to flow from the upper tip to the lower tip.
Figure 56:
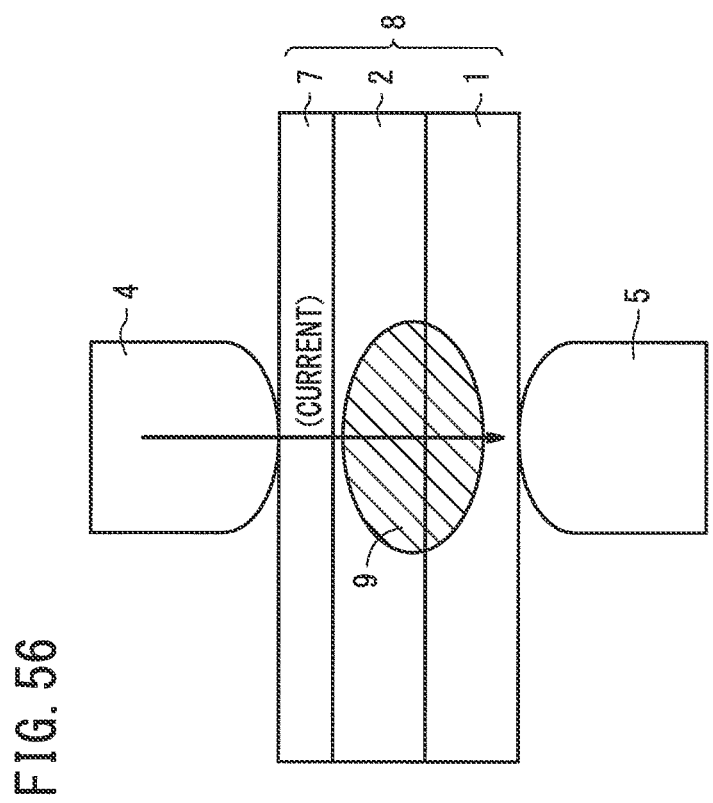
FIG. 56 is a schematic vertical cross sectional view showing a condition in which a melted portion is grown from the situation shown in FIG. 55.

Next, in FIG. 16, a case is shown in which a metallic plate 52c made of high tensile strength steel is stacked on a metallic plate 50c, which also is made of high tensile strength steel, to thereby form a stacked body 48c, and spot welding is carried out on the stacked body 48c using the auxiliary electrodes 68a, 68b. In the event that the auxiliary electrodes 68a, 68b were not used, as shown in FIGS. 53 and 54, at the contact surface between the metallic plates 50c, 52c (high resistance workpieces 1, 2), a melted portion 6 would grow to a large size in a comparatively short time. For this reason, it is easy for spatter to occur.

In contrast thereto, according to the second embodiment that uses the auxiliary electrodes 68a, 68b, as shown in FIG. 16, a heated region 86 is formed at the contact surface between the metallic plates 50c, 52c, and further above the contact surface between the metallic plates 50c, 52c, or stated otherwise, on a side in the vicinity of the auxiliary electrodes 68a, 68b in the metallic plate 52c, another heated region 87 is formed. This is because, due to the branching currents i2 flowing inside the metallic plate 52c, the interior of the metallic plate 52c is heated sufficiently. More specifically, in this case as well, a heated region, and hence a nugget 88 (see FIG. 17), can be moved into proximity to the side against which the auxiliary electrodes 68a, 68b are placed in abutment.

Figure 17:
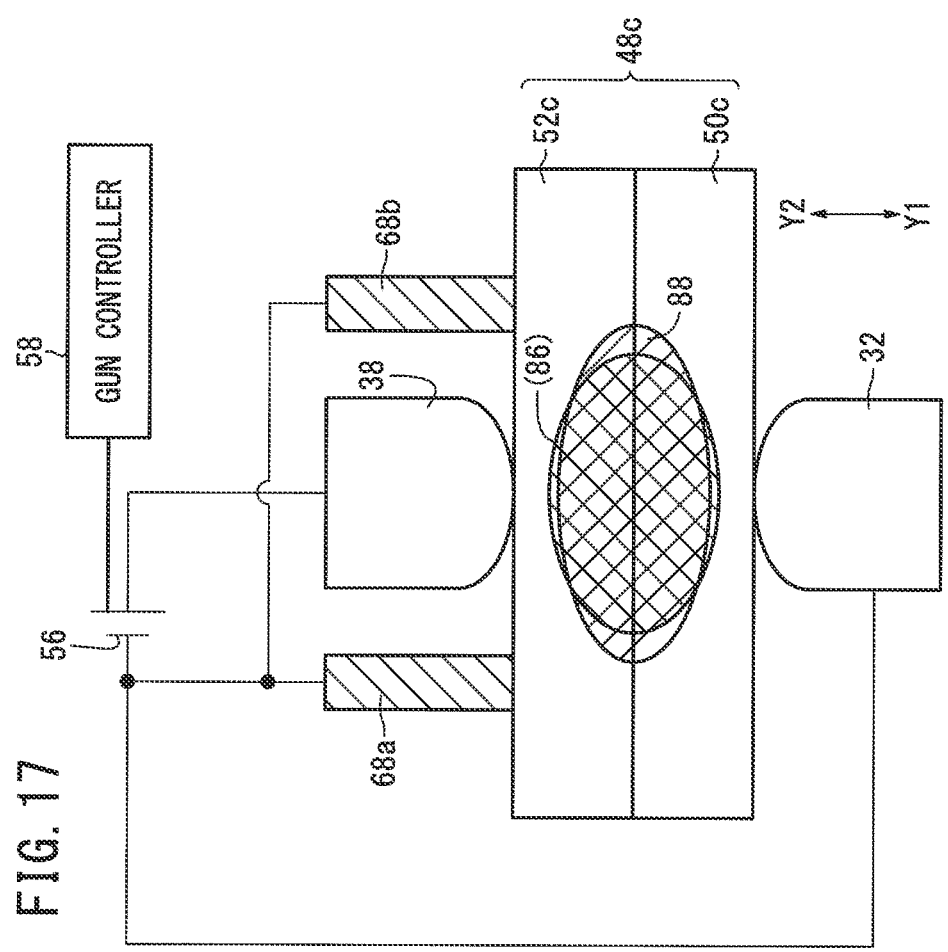
FIG. 17 is a schematic vertical cross sectional view showing a condition in which conduction of current (resistance welding) is terminated.

In addition, as a result, the contact surface between the metallic plates 50c, 52c is softened and sealability is improved. Accordingly, even if the current i1 continues to flow in order that the nugget 88 is formed, which is grown to a sufficient size as shown in FIG. 17, it is difficult for spatter to occur.

Figure 18:
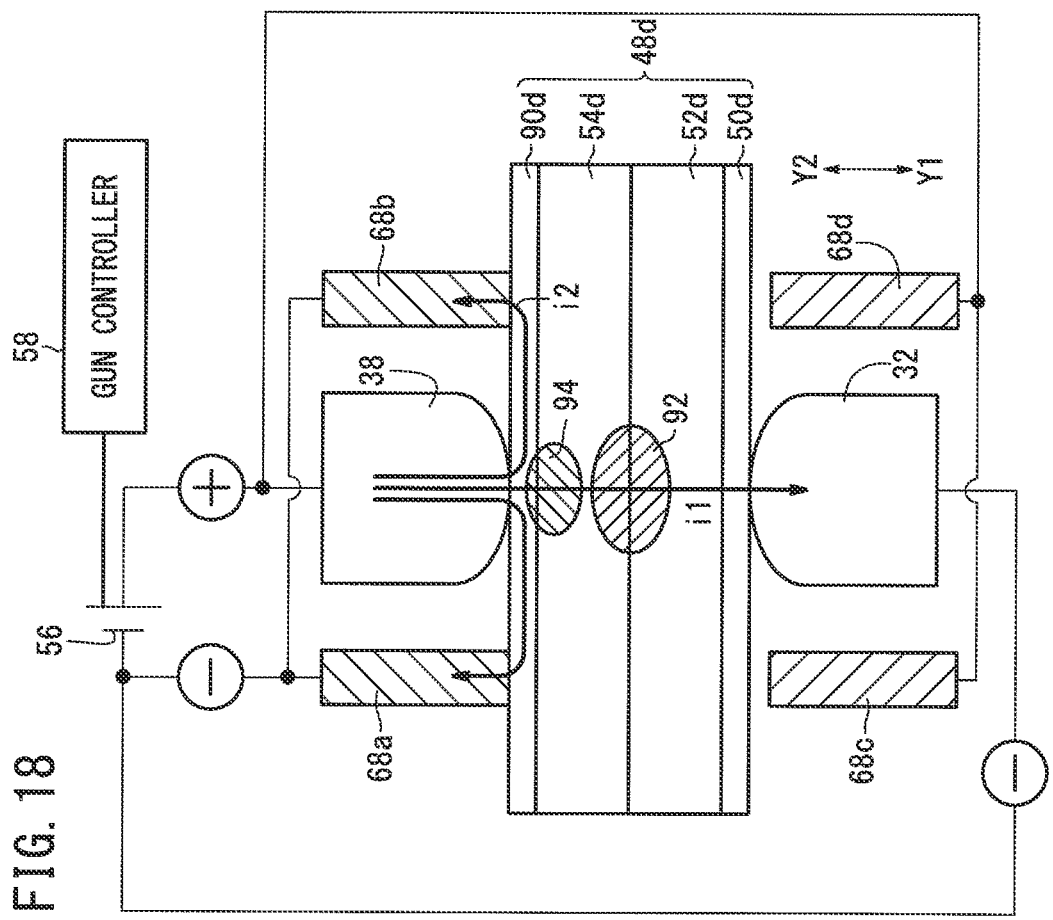
FIG. 18 is a schematic front view of essential features showing a condition in which a stacked body, which differs from those shown in FIGS. 8 and 13, is gripped by the lower tip, the upper tip, and auxiliary electrodes, and conduction of current is started.

Next, a case shall be explained in which spot welding is carried out with respect to the stacked body 48d shown in FIG. 18. The stacked body 48d is constituted by stacking, in this order from below, a low resistance metallic plate 50d made of mild steel, high resistance metallic plates 52d, 54d made of high tensile strength steel, and another low resistance metallic plate 90d made of mild steel. Further, the thicknesses of the metallic plates 50d, 90d are set to be smaller than the thicknesses of the metallic plates 52d, 54d.

In this case, in addition to the auxiliary electrodes 68a, 68b, which are disposed on the side of the upper tip 38, auxiliary electrodes 68c, 68d also are disposed on the side of the lower tip 32. The auxiliary electrodes 68c, 68d are connected electrically to a positive terminal of the power source, and accordingly, the auxiliary electrodes 68c, 68d are opposite in polarity to the lower tip 32. A displacement mechanism (a ball screw mechanism or a cylinder mechanism) for displacing the auxiliary electrodes 68c, 68d may be provided, for example, in the fixed arm 30 (see FIG. 1).

At first, as shown in FIG. 18, simultaneously with the upper tip 38 and the lower tip 32 gripping the stacked body 48d, or before or after gripping thereof, only the auxiliary electrodes 68a, 68b are brought into abutment against the metallic plate 90d. Thereafter, conduction of current is started, whereby a current i1 flows from the upper tip 38 to the lower tip 32, and branching currents i2 flow from the upper tip 38 to the auxiliary electrodes 68a, 68b. As a result, similar to the discussion above, nuggets 92, 94 are formed respectively at the contact surface between the metallic plates 52d, 54d, and at the contact surface between the metallic plates 54d, 90d.

Figure 19:
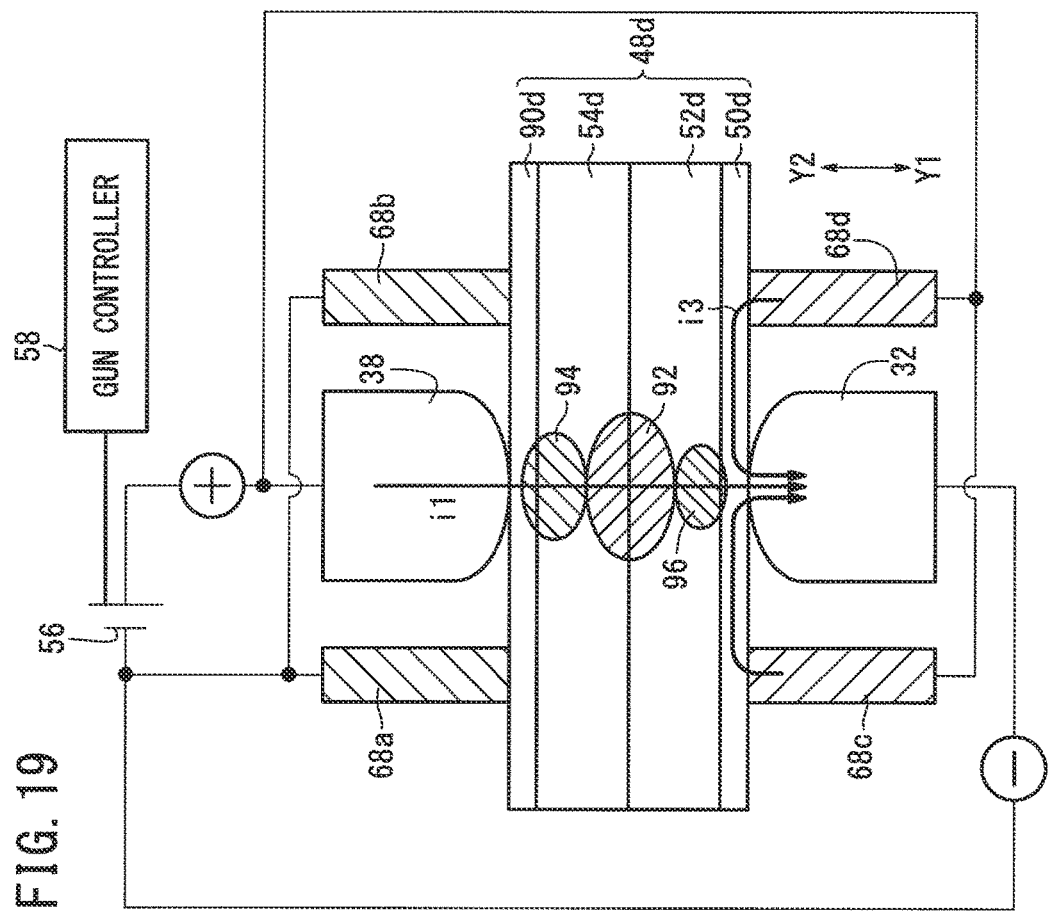
FIG. 19 is a schematic vertical cross sectional view showing a condition in which the electrical connection between the auxiliary electrodes on the side of the upper tip and a negative electrode of a power supply is disconnected, and while current continues to be conducted from the upper tip to the lower tip, the auxiliary electrodes on the side of the lower tip are kept in abutment against the workpiece.

Next, as shown in FIG. 19, by cutting off the electrical connection between the auxiliary electrodes 68a, 68b and the negative terminal of the power source 56, the branching currents i2 are made to vanish, and simultaneously therewith or before or after, the auxiliary electrodes 68c, 68d are brought into abutment against the metallic plate 50d. As a result, in the interior of the lowermost metallic plate 50d, branching currents i3 are made to flow from the auxiliary electrodes 68c, 68d to the lower tip 32.

Growth of the nugget 94 stops accompanying disappearance of the branching currents i2. On the other hand, since the current i1 continues to flow from the upper tip 38 to the lower tip 32, the nugget 92 at the contact surface between the metallic plates 52d, 54d grows in size, while in addition, due to the branching currents i3, another nugget 96 is newly formed at the contact surface between the metallic plates 50d, 52d.

Figure 20:
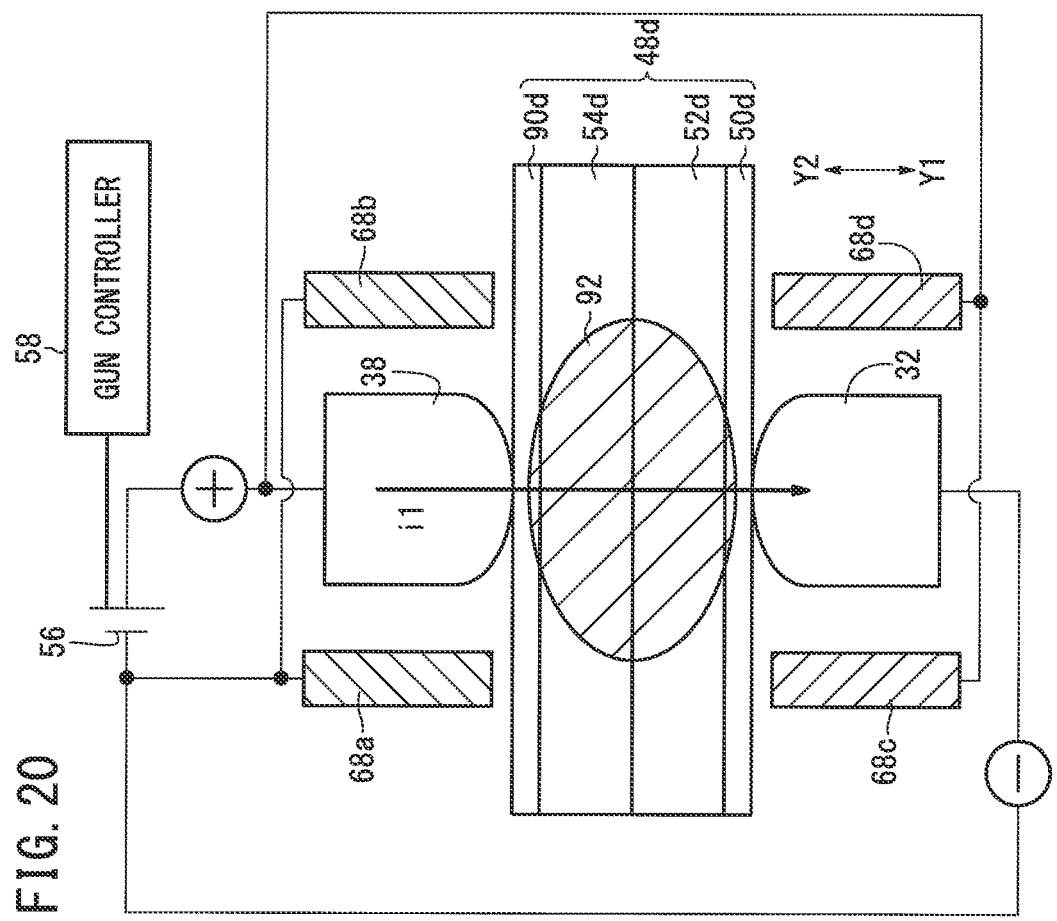
FIG. 20 is a schematic vertical cross sectional view showing a condition in which the electrical connection between the auxiliary electrodes on the side of the lower tip and a negative electrode of the power supply is disconnected, whereas current continues to be conducted from the upper tip to the lower tip.

Next, as shown in FIG. 20, the auxiliary electrodes 68c, 68d are separated away from the metallic plate 50d, whereupon the branching currents i3 are made to vanish, and accordingly, growth of the nugget 96 is stopped. Thereafter, by continuing flow of the current i1, only the nugget 92, which is formed at the contact surface between the metallic plates 52d, 54d, continues to grow in size, and can, for example, merge and become integral with the other nuggets 94, 96.

In the above-described second embodiment, although the auxiliary electrodes 68a, 68b are separated away from the metallic plate in advance of the upper tip 38, the auxiliary electrodes 68a, 68b and the upper tip may be separated away from the metallic plate 54a simultaneously.

Figure 21:
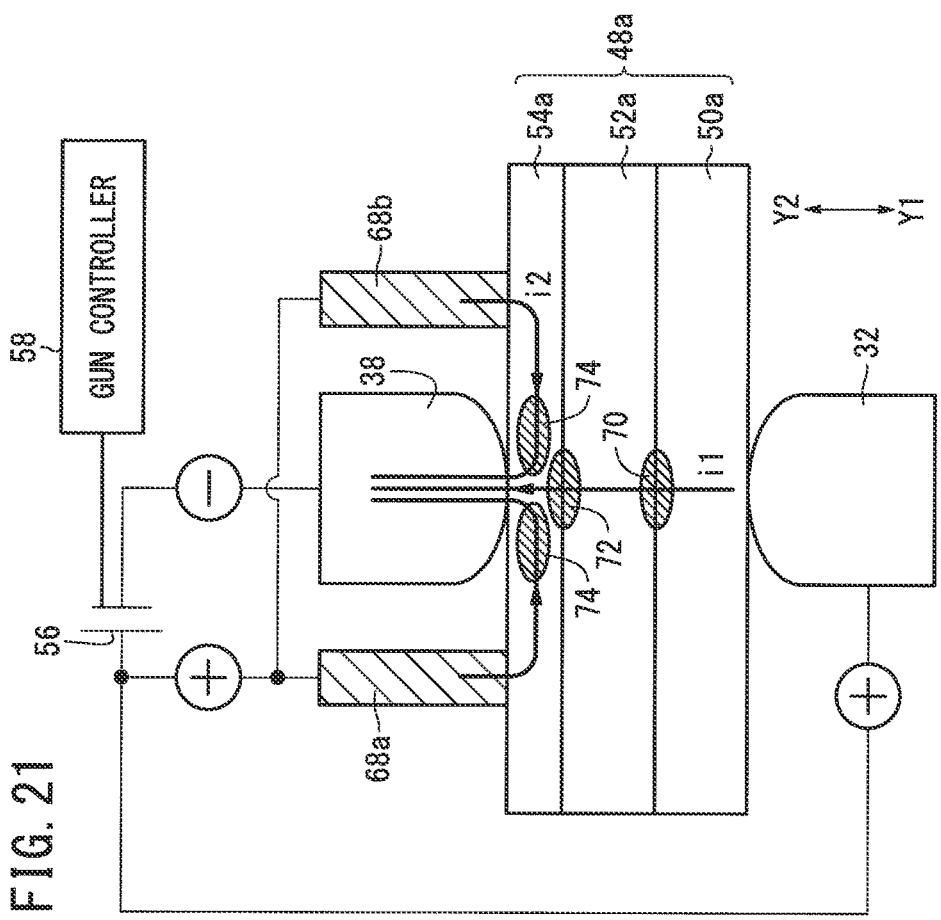
FIG. 21 is a schematic vertical cross sectional view showing a condition in which, opposite to the situation of FIG. 9, current is made to flow to the upper tip from the lower tip and the auxiliary electrodes.

Further, as shown in FIG. 21, a current may be made to flow from the lower tip 32, which is in abutment with the metallic plate 50a, to the upper tip 38, which is in abutment with the metallic plate 54a. In this case as well, the polarity of the auxiliary electrodes 68a, 68b that are in abutment against the metallic plate 54a is opposite to that of the upper tip 38. More specifically, the lower tip 32 and the auxiliary electrodes 68a, 68b are connected electrically to the positive terminal of the power source 56, whereas the upper tip 38 is connected electrically to the negative terminal of the power source 56. As a result, a current i1, which flows from the lower tip 32 to the upper tip 38, and branching currents i2, which flow from the auxiliary electrodes 68a, 68b to the upper tip 38, are created.

Figure 22:
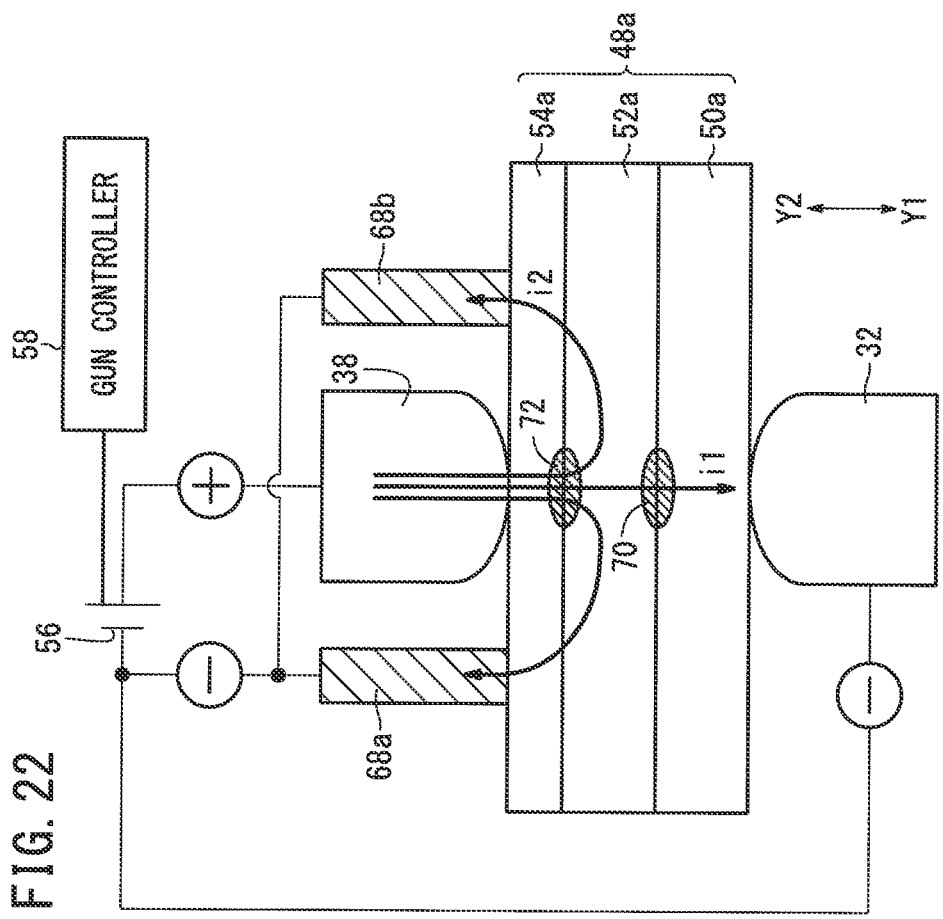
FIG. 22 is a schematic vertical cross sectional view showing a condition in which current is made to flow from the upper tip to the auxiliary electrodes, and through a workpiece positioned uppermost on the stacked workpiece and a workpiece directly beneath the same.

Furthermore, as shown in FIG. 22, the branching currents i2 may be made to flow not only through the metallic plate 54a against which the upper tip 38 is in abutment, but also through the metallic plate 52a that is positioned directly beneath the metallic plate 54a.

Additionally, in place of the auxiliary electrodes 68a, 68b being separated from the metallic plate 54a, a switch may be provided between the power source 56 and the auxiliary electrodes 68a, 68b, so that by placing the switch in a disconnected (OFF) state, only the branching currents that flow from the upper tip 38 to the auxiliary electrodes 68a, 68b, or only branching currents that flow in directions opposite thereto, are stopped. In this case, it goes without saying that the switch may be placed in a connected (ON) state in order to form the heated region 74.

In this case, there is no particular need to provide a displacement mechanism for displacing the auxiliary electrodes 68a, 68b independently from the upper tip 38. For this reason, an advantage is obtained in that the structure of the apparatus and control of operations can be simplified.

In any of the above cases, the auxiliary electrodes are not particularly limited to the auxiliary electrodes 68a, 68b, which are in the form of two elongate rods. For example, one or three or more elongate rod-shaped bodies may be provided. In the case that three or more auxiliary electrodes are used, similar to the aforementioned case of two auxiliary electrodes, the plural auxiliary electrodes 68a, 68b may be simultaneously brought into abutment against or separated away from the outermost metallic plate. Further, an auxiliary electrode may be provided by an annular shaped member that is arranged to surround the lower tip 32 or the upper tip 38.

In addition, in the structure of the spot welding apparatus according to the second embodiment, if the auxiliary electrodes 68a, 68b are electrically insulated from the power source 56, then the spot welding method according to the first embodiment can be implemented. More specifically, in accordance with the structure of the spot welding apparatus according to the second embodiment, by selecting whether or not current is allowed to flow with respect to the auxiliary electrodes 68a, 68b, either the spot welding method according to the second embodiment, or the spot welding method according to the first embodiment can selectively be implemented.

Furthermore, in the above-described first and second embodiments, although an example has been described of a C-shaped welding gun, a so-called X-shaped welding gun may be provided. In this case, the lower tip 32 and the upper tip 38 are disposed respectively on a pair of openable and closeable chuck pawls, wherein by closing or opening the pair of chuck pawls, the lower tip 32 and the upper tip 38 can be brought into mutual proximity or separated away from each other.

Further, it is a matter of course that the stacked body may be constituted from five or more metallic plates.

Next, a description shall be given of a third embodiment according to the present invention.

Figure 23:
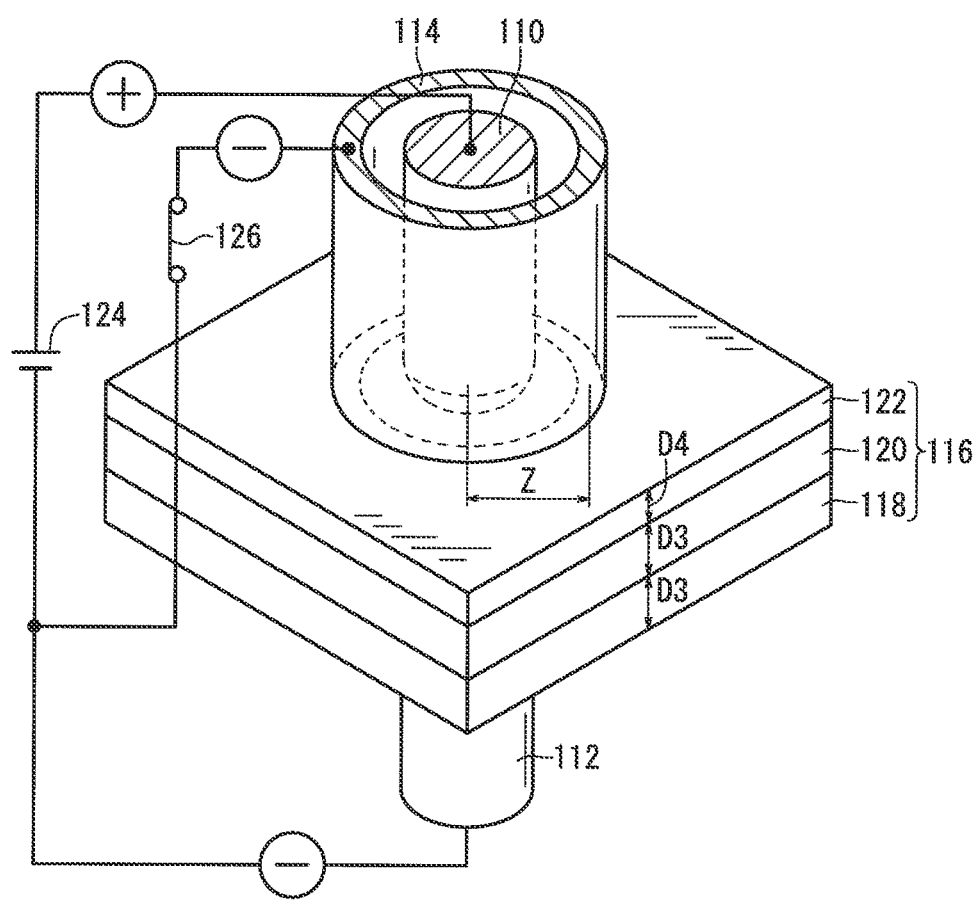
FIG. 23 is an enlarged perspective view with partial transverse cross section of essential features of a resistance welding device according to a third embodiment of the present invention.

FIG. 23 is an enlarged perspective view with partial transverse cross section of essential features of a resistance welding device according to a third embodiment of the present invention. The resistance welding device includes a non-illustrated welding gun, which is equipped with a first welding tip 110, a second welding tip 112, and an auxiliary electrode 114. In this case, the welding gun may be arranged on the end of a robot arm of an articulated robot such as a six-axis robot or the like. Such a structure in which the welding gun is disposed on the arm of an articulated robot is well known, and for this reason, detailed explanations of the structure are omitted.

To explain somewhat concerning the stacked body 116 that serves as the object to be welded, in this case, the stacked body 116 is constituted from three metallic plates 118, 120, 122, which are stacked in this order from below. Among such plates, the metallic plates 118, 120 have a thickness D3 (e.g., 1 mm to 2 mm), whereas the thickness D4 of the metallic plate 122 is set to a shorter dimension (e.g., 0.5 mm to 0.7 mm) in comparison with the thickness D3. More specifically, the respective thicknesses of the metallic plates 118, 120 are the same, whereas the metallic plate 122 is thin-walled in comparison to the metallic plates 118, 120. In the following description, the metallic plate 122 will be referred to as a thinnest workpiece.

The metallic plates 118, 120 are made, for example, from JAC590, JAC780, or JAC980, which are so-called high tensile strength steels (any of which is a high performance, high tensile strength steel, according to standards of the Japan Iron and Steel Federation), whereas the thinnest workpiece 122 is made, for example, from JAC270, which is a so-called mild steel (a high performance steel sheet for drawing, according to standards of the Japan Iron and Steel Federation). The metallic plates 118, 120 may be of the same metal type or of different metal types.

Further, an assembly may be provided in which all of the metallic plates 118, 120, 122 are mild steel, or an assembly may be provided in which only the metallic plate 118 is high tensile strength steel, whereas the metallic plates 120, 122 are both made of mild steel.

The materials of the metallic plates 118, 120, 122 are not particularly limited to the aforementioned steel materials, and may be any materials on which resistance welding can be performed.

The first welding tip 110 and the second welding tip 112 are formed in the shape of elongate rods. The stacked body 116, which serves as the object to be welded, is gripped between the first welding tip 110 and the second welding tip 112, and a current is conducted with respect to the stacked body 116. In the third embodiment as well, the current flows from the first welding tip 110 to the second welding tip 112.

In the case that the welding gun is a so-called X-shaped welding gun, the first welding tip 110 is disposed on one chuck pair that constitutes one of a pair of openable and closeable chuck pawls, whereas the second welding tip 112 is disposed on the remaining one of the chuck pawls. More specifically, accompanying opening or closing movements of the pair of chuck pawls, the first welding tip 110 and the second welding tip 112 are brought into mutual proximity or made to separate mutually away from each other.

The welding gun may also be a so-called C-shaped welding gun. In this case, the second welding tip 112 is disposed on the end of a fixed arm, whereas the first welding tip 110 is connected, for example, to a ball screw. By rotation of the ball screw, the first welding tip 110 is made to approach toward or separate away from the second welding tip 112.

The auxiliary electrode 114 is formed in an annular shape and is disposed in surrounding relation to the first welding tip 110 in this case. A displacement mechanism, for example, a ball screw mechanism or a cylinder mechanism or the like, which causes the auxiliary electrode 114 to approach and separate away from the stacked body 116, is provided in the welding gun that supports the first welding tip 110. By means of the displacement mechanism, the auxiliary electrode 114 is capable of approaching toward and separating away from the stacked body 116 independently from the first welding tip 110.

According to the third embodiment, the first welding tip 110 is connected electrically to the positive terminal of the power source 124, and the second welding tip 112 and the auxiliary electrode 114 are connected electrically to the negative terminal of the power source 124. As can be understood from such connections, although the first welding tip 110 and the auxiliary electrode 114 are both placed in abutment against the thinnest workpiece 122 constituting the stacked body 116, the polarities thereof are mutually opposite.

In addition, an ON/OFF switch 126 is interposed between the negative terminal of the power source 124 and the auxiliary electrode 114. More specifically, the negative terminal of the power source 124 and the auxiliary electrode 114 are electrically connected when the ON/OFF switch 126 is in an ON state, and are insulated from each other when the ON/OFF switch 126 is in an OFF state.

In the above-described structure, in the event that the distance Z between the auxiliary electrode 114 and the first welding tip 110 is excessively large, resistance is increased between the first welding tip 110 and the auxiliary electrode 114, and thus it becomes more difficult for the later-mentioned branching current i2 (see FIG. 26) to flow. Accordingly, the distance Z is set to a distance that enables the resistance between the auxiliary electrode 114 and the first welding tip 110 to be such that the branching current i2 can flow at an appropriate current value.

Figure 24:
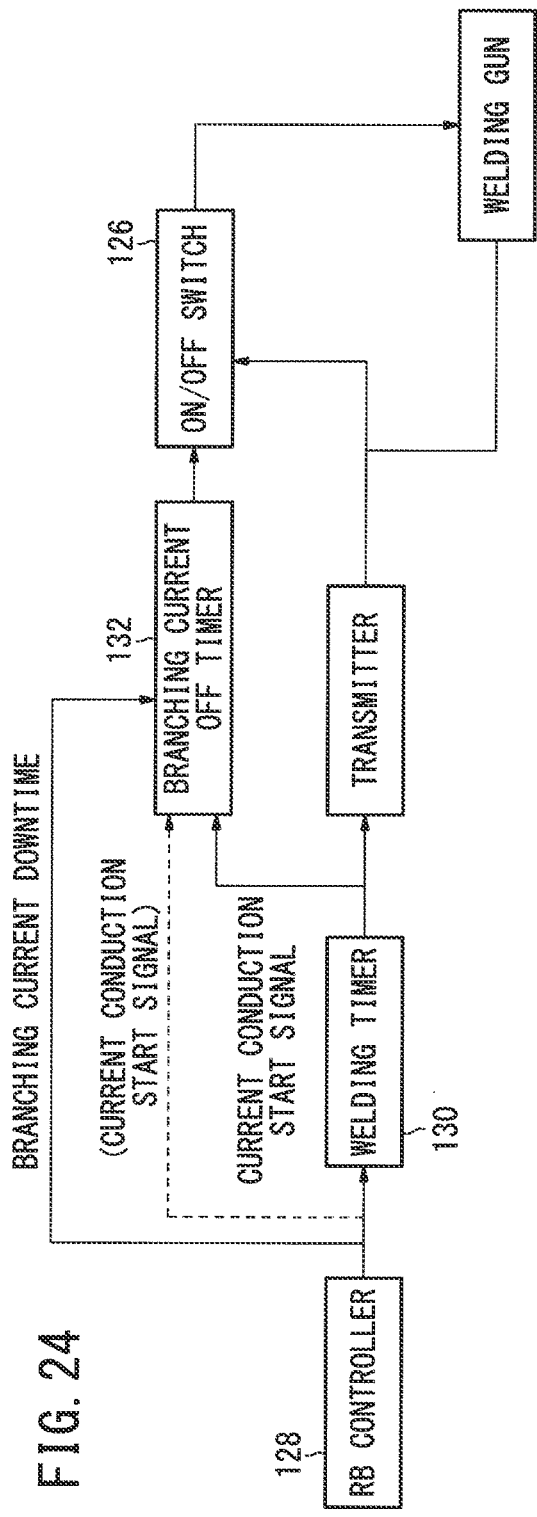
FIG. 24 is a block diagram showing schematically a control signal system of the resistance welding device.

A control signal system of the resistance welding device constructed principally in the foregoing manner is shown schematically in FIG. 24. As shown in FIG. 24, the resistance welding device includes an RB (robot) controller 128, a welding timer 130, and a branching current OFF timer 132 that serves as a branching current timer.

The RB controller 128 is a control circuit for controlling operations of the welding gun and the articulated robot, which as noted below, outputs and send command signals to the welding timer 130 and the branching current OFF timer 132. The command signals may be transmitted from the RB controller 128 itself, or once the RB controller 128 has received signals that are produced by a non-illustrated separate control circuit, the signals may be retransmitted from the RB controller 128.

The welding timer 130 is a timer for controlling conduction of current that flows from the first welding tip 110 to the second welding tip 112, or stated otherwise, which controls the welding time. This type of timer is well known and widely adopted in the art of resistance welding, and therefore details thereof are omitted herein.

Figure 26:
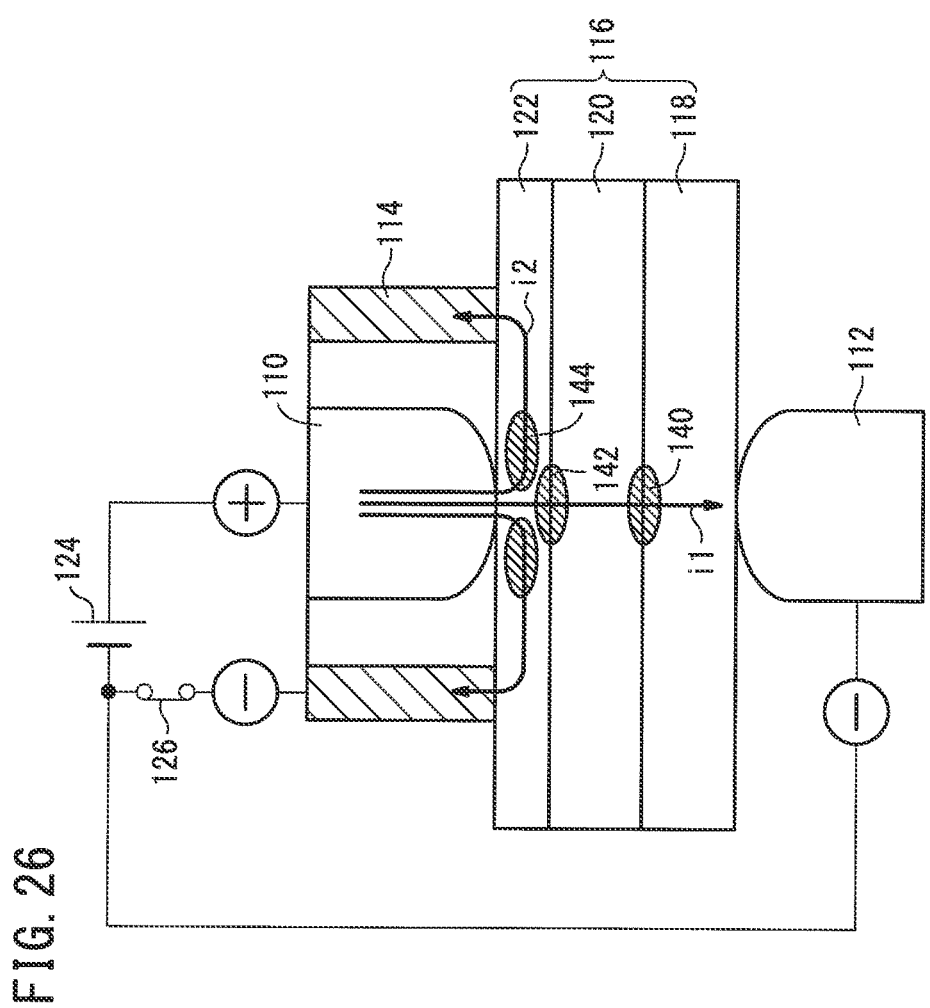
FIG. 26 is a schematic vertical cross sectional view showing a condition in which conduction of current is started and the current flows from the first welding tip to the second welding tip, and a branching current flows from the first welding tip to the auxiliary electrode.

The branching current OFF timer 132 is a timer for controlling the time at which the branching current i2 flows (see FIG. 26). More specifically, after a predetermined time has elapsed, the command for which was received beforehand from the RB controller 128, the branching current OFF timer 132 places the ON/OFF switch 126 (see FIG. 23) in an OFF state, whereby flow of the branching current i2 (see FIG. 26) is stopped.

The branching current OFF timer 132 may be provided as a separate component apart from the welding timer 130, or the function thereof may be accomplished through an operation of the welding timer 130.

The essential constitution of the resistance welding device according to the third embodiment is constructed basically as described above. Next, operations and effects thereof shall be explained in relations to specific operations of the resistance welding device.

First, the time for which the branching current is to flow is input to the RB controller 128. As shown in FIG. 24, the RB controller 128 issues a command to the effect that "IF THE INPUT TIME HAS ELAPSED, TURN OFF THE ON/OFF SWITCH 126".

When resistance welding is implemented on the stacked body 116, or stated otherwise, when the metallic plates 118, 120 and the metallic plates 120, 122 are joined by resistance welding, at first, under an action of the RB controller 128, the articulated robot moves the welding gun so as to position the stacked body 116 between the first welding tip 110 and the second welding tip 112. Thereafter, a closing operation of the check pawls is performed, or alternatively by energizing a displacement mechanism, the first welding tip 110 and the second welding tip 112 are made to approach one another relatively, whereby the stacked body 116 is gripped therebetween. Simultaneously with the gripping operation, the auxiliary electrode 114 is brought into abutment against the thinnest workpiece 122. Consequently, the condition shown by the schematic cross sectional view of FIG. 25 is brought about.

Abutment of the auxiliary electrode 114 against the thinnest workpiece 122 may be performed to such an extent that the auxiliary electrode merely contacts the thinnest workpiece 122, or to an extent whereby the auxiliary electrode 114 serves to press the thinnest workpiece 122 at a predetermined pressure.

Figure 25:
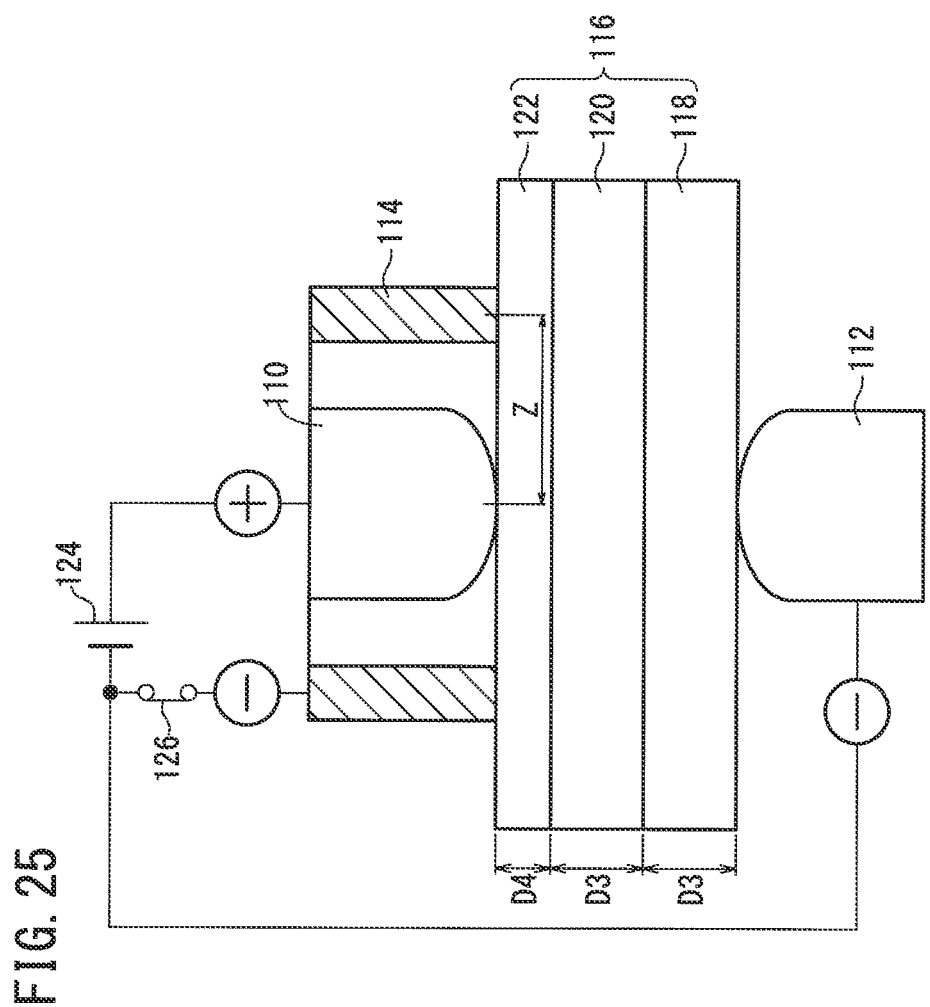
FIG. 25 is a schematic vertical cross sectional view showing a condition in which a stacked body, which serves as an object to be welded, is gripped by all of a first welding tip, a second welding tip, and an auxiliary electrode.

The RB controller 128, which has recognized formation of the condition shown in FIG. 25 by way of a contact type sensor or the like, issues a command signal to the effect of "START CONDUCTION OF CURRENT" to the welding timer 130. By means of the welding timer 130, which has received this command signal, conduction of current, which flows between the first welding tip 110 and the second welding tip 112, is started. Simultaneously therewith, a current conduction start signal is sent to the branching current OFF timer 132 (see FIG. 24).

To explain in greater detail the conduction of current, since the first welding tip 110 and the second welding tip 112 are connected respectively to the positive and negative terminals of the power source 124, as shown in FIG. 26, a current i1 flows from the first welding tip 110 to the second welding tip 112. Additionally, as a result of Joule heating based on the current i1, regions between the metallic plates 118, 120 and between the metallic plates 120, 122 are heated respectively. The reference numerals 140, 142 in FIG. 26 illustrate such heated regions.

The auxiliary electrode 114 also is in abutment against the thinnest workpiece 122, and the auxiliary electrode 114 is electrically biased at a negative polarity. Accordingly, simultaneously with the aforementioned current i1, a branching current i2 is started from the first welding tip 110 to the auxiliary electrode 114. Since the auxiliary electrode 114 is annular in shape, the branching current i2 flows radially.

Figure 27:
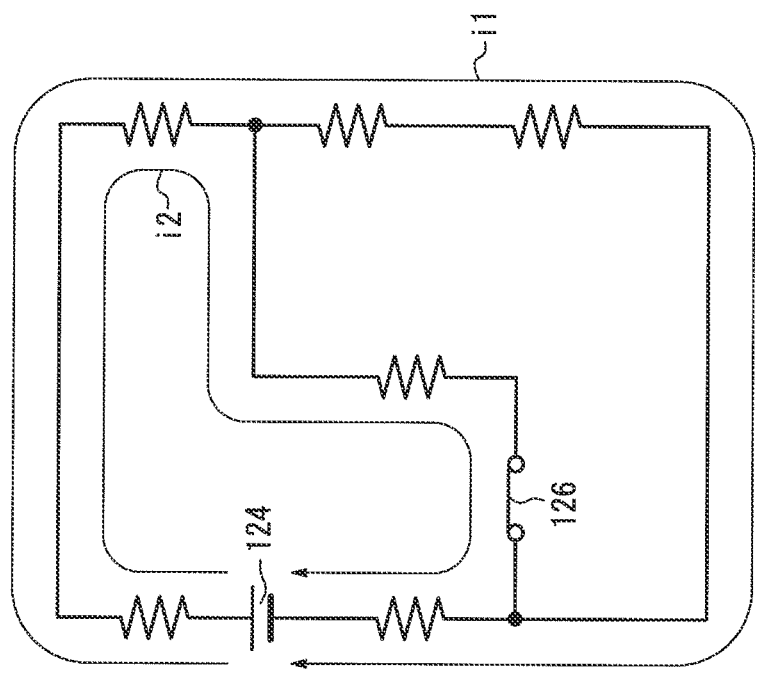
FIG. 27 is a schematic current path diagram showing in what paths the current and the branching current flow in an equivalent circuit of FIG. 26.

In this manner, in the third embodiment, the branching current i2 is generated, which flows only through the thinnest workpiece 122 and does not flow through the metallic plates 118, 120. FIG. 27 illustrates the current paths in an equivalent circuit at this time.

Figure 28:
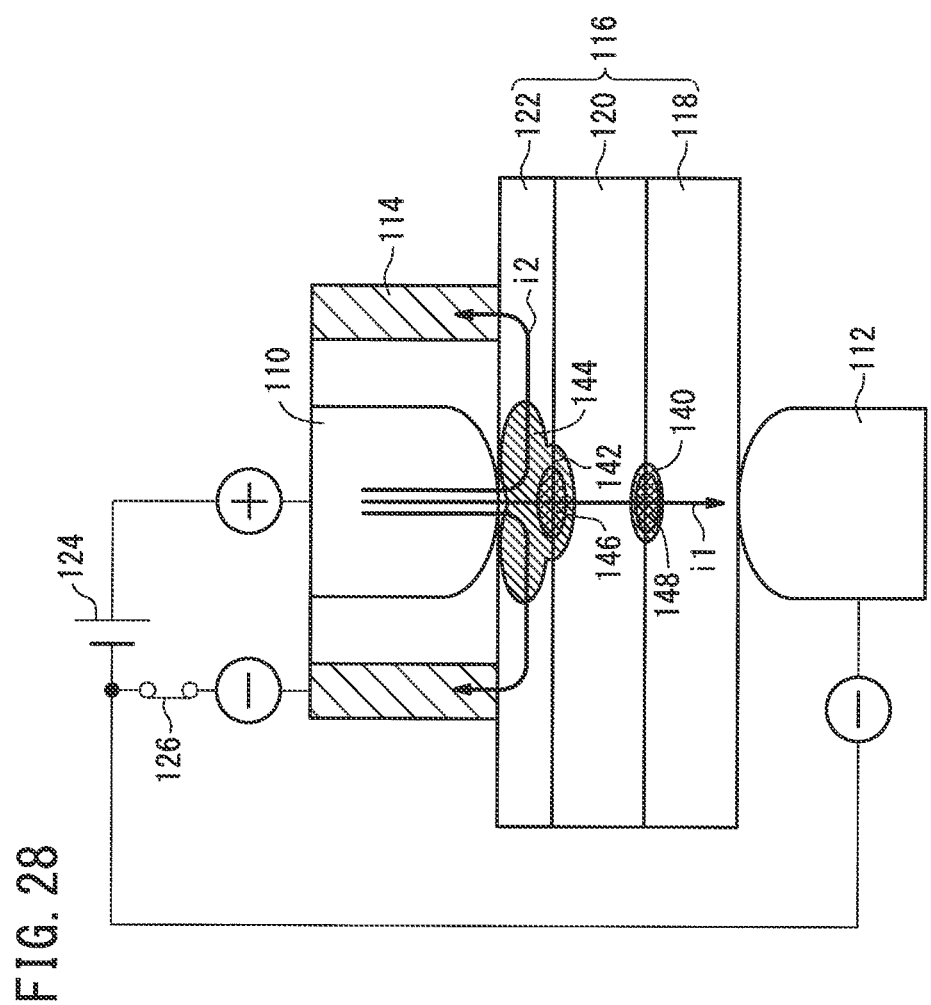
FIG. 28 is a schematic vertical cross sectional view showing a condition in which conduction of current is continued from the situation of FIG. 26.

As a result of the branching current i2, a large current is generated that passes through the interior of the thinnest workpiece 122, which is larger in comparison to general resistance welding using only the first welding tip 110 and the second welding tip 112. Accordingly, in this case, in the interior of the thinnest workpiece 122, apart from the heated region 142, an additional heated region 144 is formed. Moreover, since the branching current i2 flows radially, the heated region 144 heats the contact surface between the metallic plates 120, 122 radially. The heated region expands over time, and as shown in FIG. 28, merges to become integral with the heated region 142.

At the contact surface between the metallic plates 120, 122, heat is transmitted from both of the heated regions 142, 144, which are integrated in the foregoing manner. Owing thereto, the temperature rises sufficiently at the contact surface and melting is started, and as a result, a nugget 146 is formed between the metallic plates 120, 122.

The heated region 144 can be made larger as the percentage of the branching current i2 becomes greater. However, in the event that the percentage of the branching current i2 becomes excessively large, since the current value of the current i1 decreases, the heated regions 140, 142 become smaller in size. As a result, the size of the nugget 146 becomes saturated, whereas the nugget 148 has a tendency to become smaller. Accordingly, the percentage of the branching current i2 preferably is set such that the current i1 flows to a degree that enables the nugget 148 to grow adequately.

Further, the percentages or ratio of the current i1 and the branching current i2 can be adjusted, for example as noted above, by changing the distance Z (see FIGS. 23 and 25) between the first welding tip 110 and the auxiliary electrode 114.

The nugget 146 grows over time so long as the conduction of current is continued. Accordingly, by continuing conduction of current for a predetermined time, the nugget 146 can be grown sufficiently. The degree of growth of the nugget 146 with respect to the duration for which current continues to be conducted may be confirmed in advance experimentally by carrying out resistance welding using a test piece or the like.

In this case, the current value of the current i1 flowing in the metallic plates 118, 120 is smaller in comparison with that used in general resistance welding. For this reason, during the time that the nugget 146 grows to a large size between the metallic plates 120, 122, the amount by which the metallic plates 118, 120 are heated can be prevented from increasing excessively. Accordingly, any concerns over generation of spatter can be dispensed with.

During this time, a nugget 148 is formed between the metallic plates 118, 120 by the current i1. If the branching current i2 continues to flow, compared to the aforementioned case of stopping the branching current i2, the total amount of conduction of the current i1 becomes smaller, and therefore there is a tendency for the heated region 140 and hence the nugget 148 to become somewhat smaller. In the third embodiment, the branching current i2 is stopped so that the nugget 148 can grow larger in size.

Figure 29:
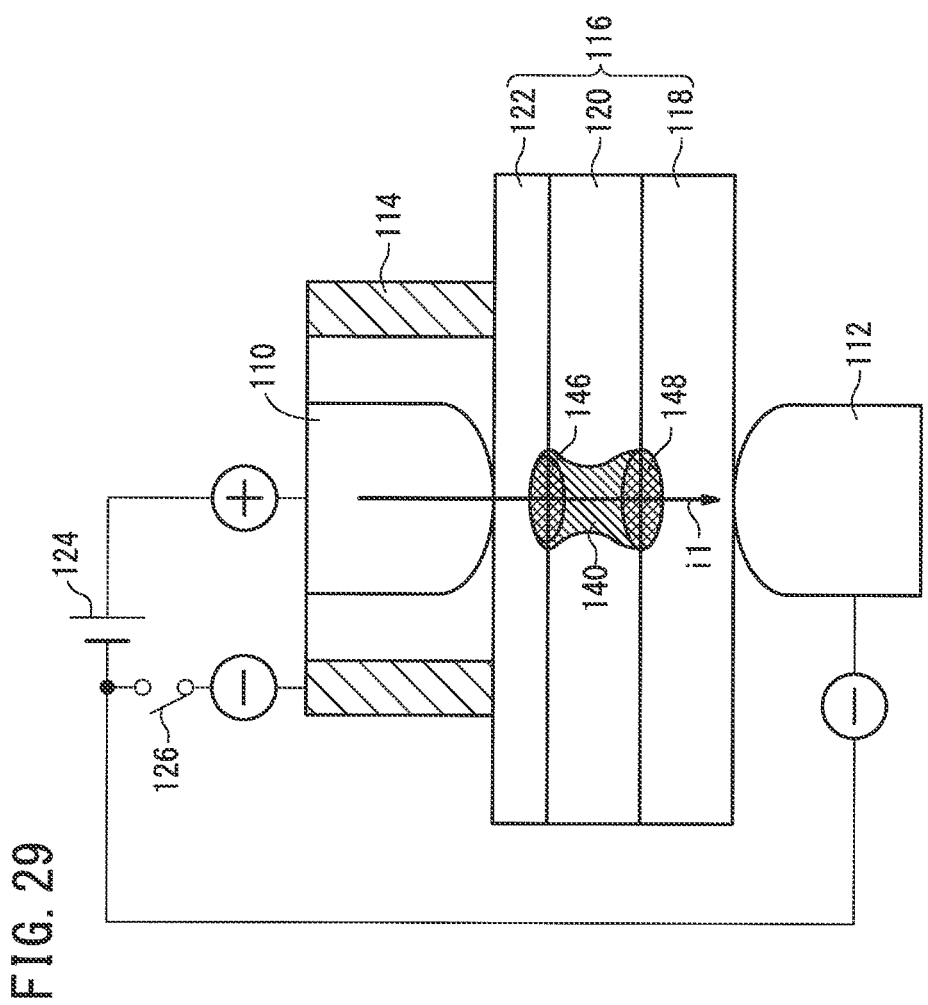
FIG. 29 is a schematic vertical cross sectional view showing a condition in which an ON/OFF switch is switched to an OFF state, yet conduction of current continues to take place from the first welding tip to the second welding tip.
Figure 30:
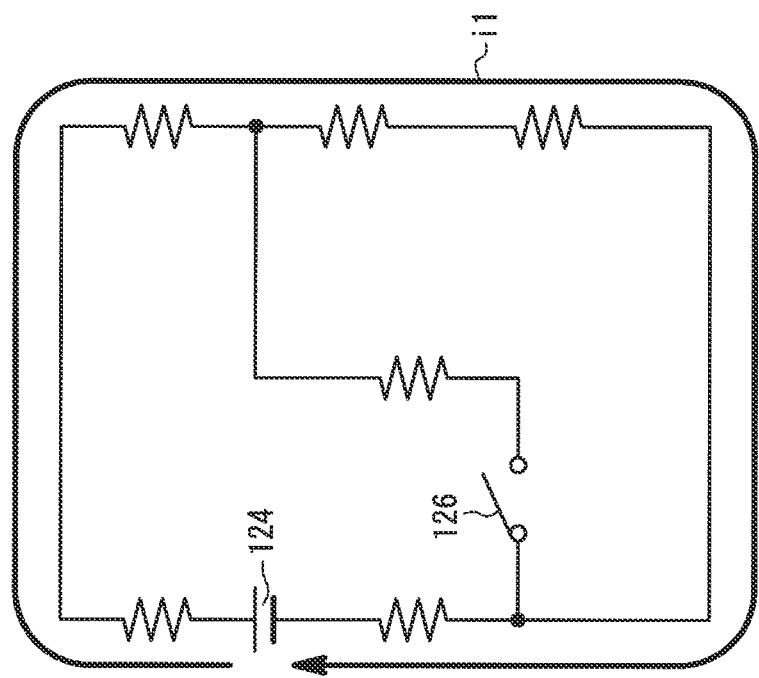
FIG. 30 is a schematic current path diagram showing in what paths the current and the branching current flow in an equivalent circuit of FIG. 29.

More specifically, as described above, in the branching current OFF timer 132, at the same time that conduction of current is started under the action of the welding timer 130, a current conduction start signal is sent, which enables the branching current OFF timer 132 to recognize that conduction of current has started. Simultaneously with receipt of the current conduction start signal, the branching current OFF timer 132 begins to measure an elapse of time. In addition, when a predetermined time, which was set beforehand in the branching current OFF timer 132, has elapsed, the branching current OFF timer 132 places the ON/OFF switch 126 in an OFF state, as shown in FIG. 29. Consequently, the negative terminal of the power source 124 and the auxiliary electrode 114 are insulated from one another, and as a result, the branching current i2 is stopped. FIG. 30 illustrates the current paths in an equivalent circuit at this time.

In the foregoing manner, in accordance with the third embodiment, simultaneously with starting conduction of current, the current conduction start signal is sent from the welding timer 130 to the branching current OFF timer 132, and together therewith, in the branching current OFF timer 132, at the same time that the current conduction start signal is received, measurement of the elapsed time is started.

As shown by the broken line in FIG. 24, it also is contemplated that transmission of the current conduction start signal may take place from the RB controller 128 to the branching current OFF timer 132. However, in this case, it is necessary for the branching current OFF timer 132 to send the current conduction start signal after the RB controller 128 has received a signal to the effect that "CONDUCTION OF CURRENT HAS STARTED", which was issued to the RB controller after the welding timer 130 has initiated start of conduction of current. In this case, a time lag occurs between the timing at which actual conduction of current is started (welding commences) and the timing at which the branching current OFF timer 132 receives the current conduction start signal and recognizes that conduction of current (welding) has started, corresponding to the time it takes for signals to be sent and received between the RB controller 128 and the welding timer 130. In this case, it is less easy for the branching current i2 to actually be stopped at the time appropriate for stopping the branching current i2.

In contrast thereto, according to the third embodiment, it is not necessary for the current conduction start signal and a signal representative of "CONDUCTION OF CURRENT HAS STARTED" to be sent and received between the RB controller 128 and the welding timer 130. This is because, as noted above, simultaneously with start of conduction of current from the first welding tip 110 to the second welding tip 112, the current conduction start signal is sent from the welding timer 130 to the branching current OFF timer 132, and simultaneously with receipt of the current conduction start signal, the branching current OFF timer 132 begins to measure the elapsed time.

Accordingly, the branching current OFF timer 132 can recognize the start of conduction of current (welding) substantially simultaneously with the actual start of conduction of current (welding). Stated otherwise, the timing at which electrical conduction (welding) actually is started is substantially simultaneous with the timing at which the branching current OFF timer 132 recognizes the same, so that a time lag does not occur between both timings, or even if such a time lag occurs, the time lag is so short that it can be ignored. Thus, the branching current i2 can easily be stopped at a time that is appropriate for stopping the branching current i2.

When the branching current i2 is stopped in the foregoing manner, only the current i1 from the first welding tip 110 to the second welding tip 112 flows in the thinnest workpiece 122. As a result, the heated region 144 shown in FIG. 28 also vanishes.

On the other hand, in the metallic plates 118, 120, a condition is brought about which is similar to ordinary resistance welding. More specifically, at the metallic plates 118, 120, which are of greater thickness, the generated amount of Joule heating increases, and as a result, the heated region 140 widens together with the temperature thereof rising further. The contact surface between the metallic plates 118, 120 is heated by the heated region 140, which has risen in temperature, and thus, the temperature in the vicinity of the contact surface rises sufficiently and becomes melted, thereby promoting growth of the nugget 148.

Figure 31:
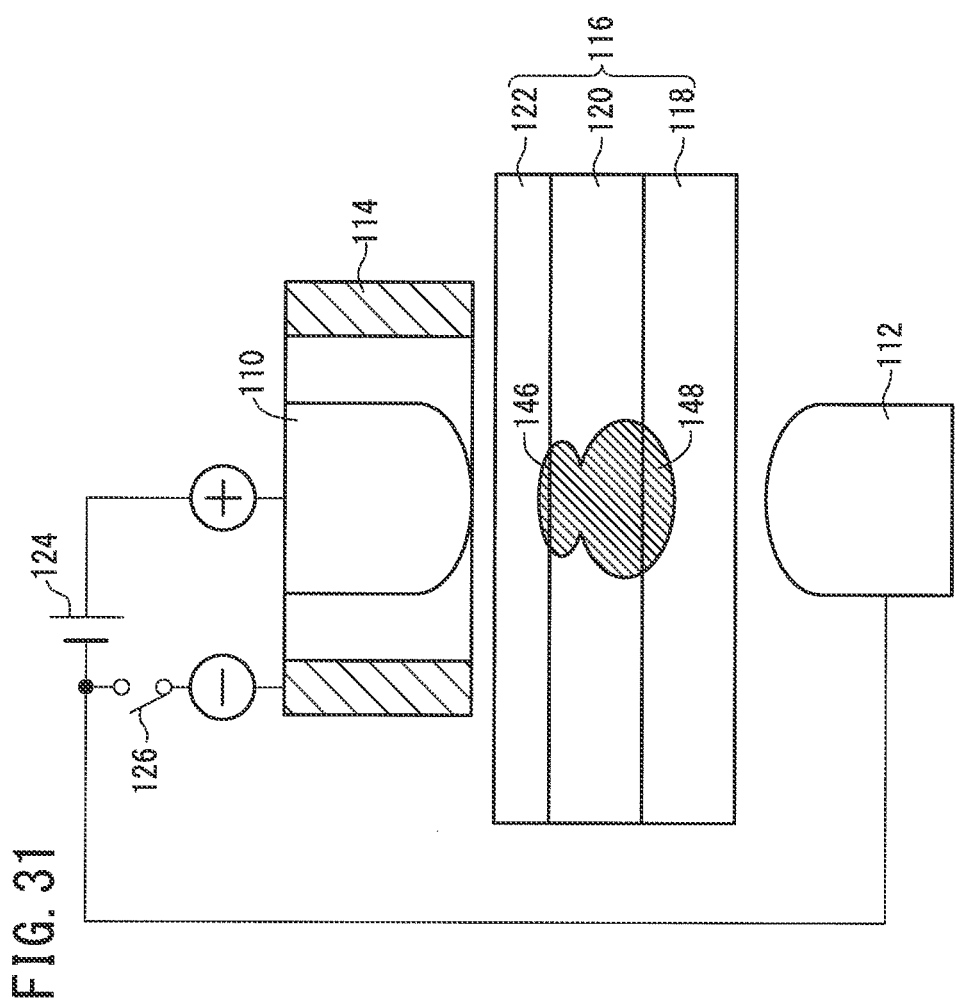
FIG. 31 is a schematic vertical cross sectional view showing a condition in which conduction of current (resistance welding) is terminated.

Subsequently, until the nugget 148 has grown sufficiently, for example as shown in FIG. 31, current may continue to be conducted until the nugget 148 becomes integrated with the nugget 146. The degree of growth of the nugget 146 with respect to the duration for which current continues to be conducted may be confirmed in advance experimentally by carrying out resistance welding using a test piece or the like.

The contact surface between the metallic plates 118, 120 is heated beforehand by the heated region 140 that was formed accompanying passage of the current i1 at the time that the nugget 146 was grown between the metallic plates 120, 122. Owing thereto, conformability of the metallic plates 118, 120 to such heating is enhanced prior to the nugget 148 growing in size. Accordingly, it is difficult for spatter to occur.

In the foregoing manner, according to the third embodiment, the occurrence of spatter can be avoided both when the nugget 146 is grown between the metallic plates 120, 122 as well as when the nugget 148 is grown between the metallic plates 118, 120.

Upon the passage of the predetermined period of time set beforehand in the welding timer 130 (i.e., a time required for the nugget 148 to grow adequately), conduction of current is stopped, and as shown in FIG. 31, the first welding tip 110 is separated away from the thinnest workpiece 122. Alternatively, the first welding tip 110 and the second welding tip 112 may be electrically insulated from each other simply by separating the first welding tip 110 away from the thinnest workpiece 122.

In the foregoing manner, accompanying the termination of conduction of current (welding), heating of the metallic plates 118, 120 is brought to an end. With the passage of time, the melted portion is cooled and solidified into the nugget 148, whereupon the metallic plates 118, 120 are joined together mutually.

In this manner, ultimately, a bonded product is obtained in which the metallic plates 118, 120 that make up the stacked body 116, as well as the metallic plates 120, 122 are bonded together.

In the bonded product, similar to the bonding strength between the metallic plates 118, 120, the bonding strength between the metallic plates 120, 122 is superior. This is because, as noted above, the nugget 146 is grown to a sufficient size between the metallic plates 120, 122 accompanying flow of the branching current i2 through the thinnest workpiece 122.

In addition, as easily comprehended from the foregoing discussion, when the resistance welding device according to the third embodiment is constructed, the auxiliary electrode 114, and a displacement mechanism for displacing the auxiliary electrode 114 may be provided. Accordingly, the structure of the resistance welding device together with the provision of the auxiliary electrode 114 is not increased in complexity.

In the above embodiment, although it has been described that the branching current i2 is stopped by placing the ON/OFF switch 126 in an OFF state, in place thereof, the auxiliary electrode 114 and the thinnest workpiece 122 may be separated from each other upon elapse of a predetermined time that is set in the branching current OFF timer 132, whereby the branching current i2 is terminated. In this case, a displacement mechanism may be provided which acts to displace the auxiliary electrode 114 independently from the first welding tip 110.

Figure 32:
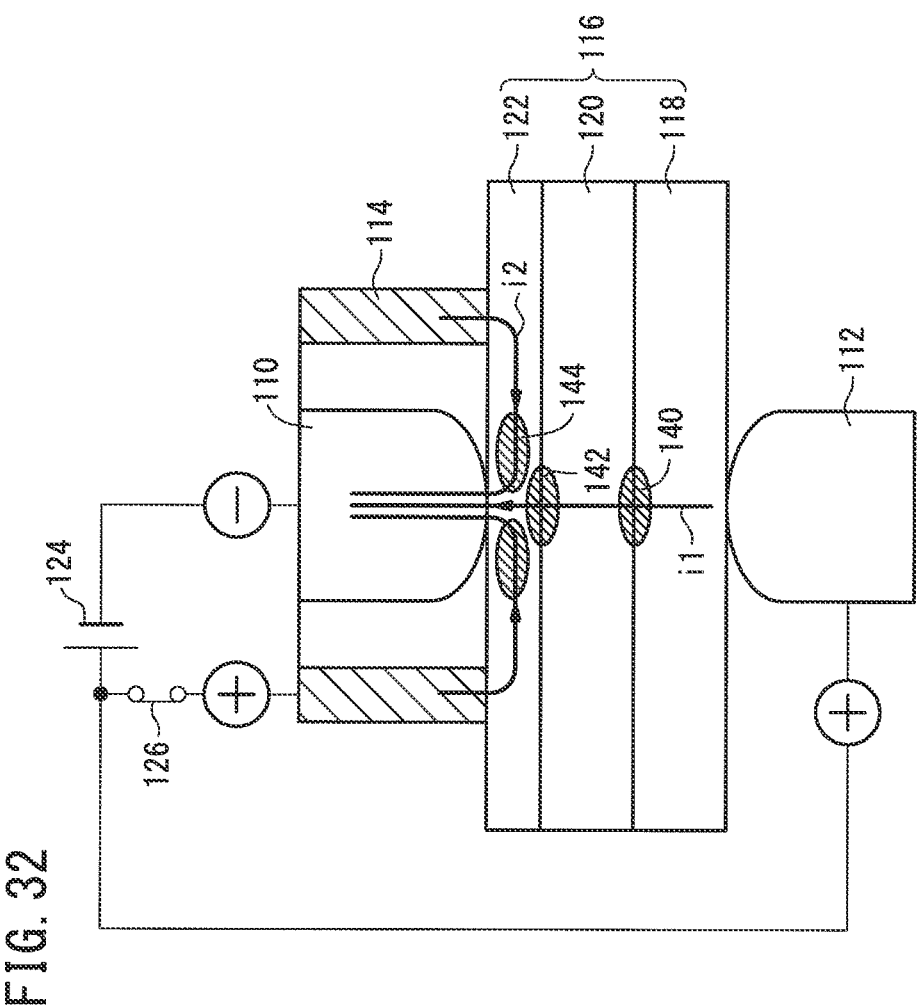
FIG. 32 is a schematic vertical cross sectional view showing a condition in which, opposite to the situation of FIG. 26, current is made to flow to the first welding tip from the second welding tip and the auxiliary electrode.

Further, as shown in FIG. 32, a current may be made to flow from the second welding tip 112, which is in abutment with the metallic plate 118, to the first welding tip 110, which is in abutment with the thinnest workpiece 122. In this case as well, the polarity of the auxiliary electrode 114 that is in abutment against the thinnest workpiece 122 is opposite to that of the first welding tip 110. More specifically, the second welding tip 112 and the auxiliary electrode 114 are connected electrically to the positive terminal of the power source 124, whereas the first welding tip 110 is connected electrically to the negative terminal of the power source 124. As a result, a current i1, which flows from the second welding tip 112 to the first welding tip 110, and a branching current i2, which flows from the auxiliary electrode 114 to the first welding tip 110, are created.

In any of these cases, the auxiliary electrode is not particularly limited to the annular shaped auxiliary electrode 114. For example, auxiliary electrodes may be provided in the form of elongate rods similar to the first welding tip 110 and the second welding tip 112. In this case, a single auxiliary electrode or a plurality of auxiliary electrodes may be provided, and in the case that a plurality of auxiliary electrodes are used, the plural auxiliary electrodes may be configured to abut against and separate away from the thinnest workpiece 122 simultaneously.

Figure 33:
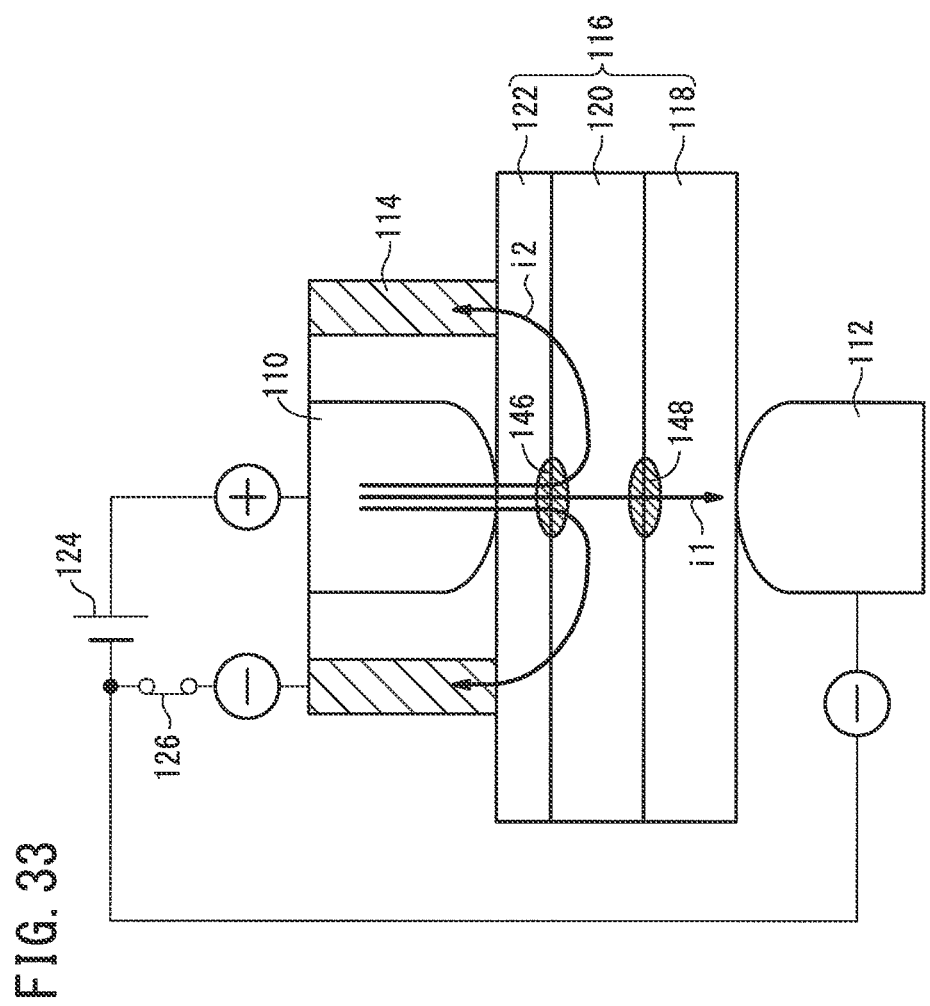
FIG. 33 is a schematic vertical cross sectional view showing a condition in which current is made to flow from the first welding tip to the auxiliary electrode, and through a thinnest workpiece positioned uppermost on the stacked workpiece and a workpiece directly beneath the same.

Furthermore, as shown in FIG. 33, the branching current i2 may be made to flow not only through the thinnest workpiece 122 against which the first welding tip 110 is in abutment, but also through the metallic plate 120 that is positioned directly beneath the thinnest workpiece 122.

In this case, resistance heating occurs between the thinnest workpiece 122 and the metallic plate 120, and as a result, the nugget 146 is formed. Conversely, the current from the first welding tip 110 to the auxiliary electrode 114 either does not flow between the metallic plates 118, 120, or even if some flow of the current takes place, the amount thereof is negligible. Accordingly, the created nugget 146 can easily be grown between the thinnest workpiece 122 and the metallic plate 120.

Figure 34:
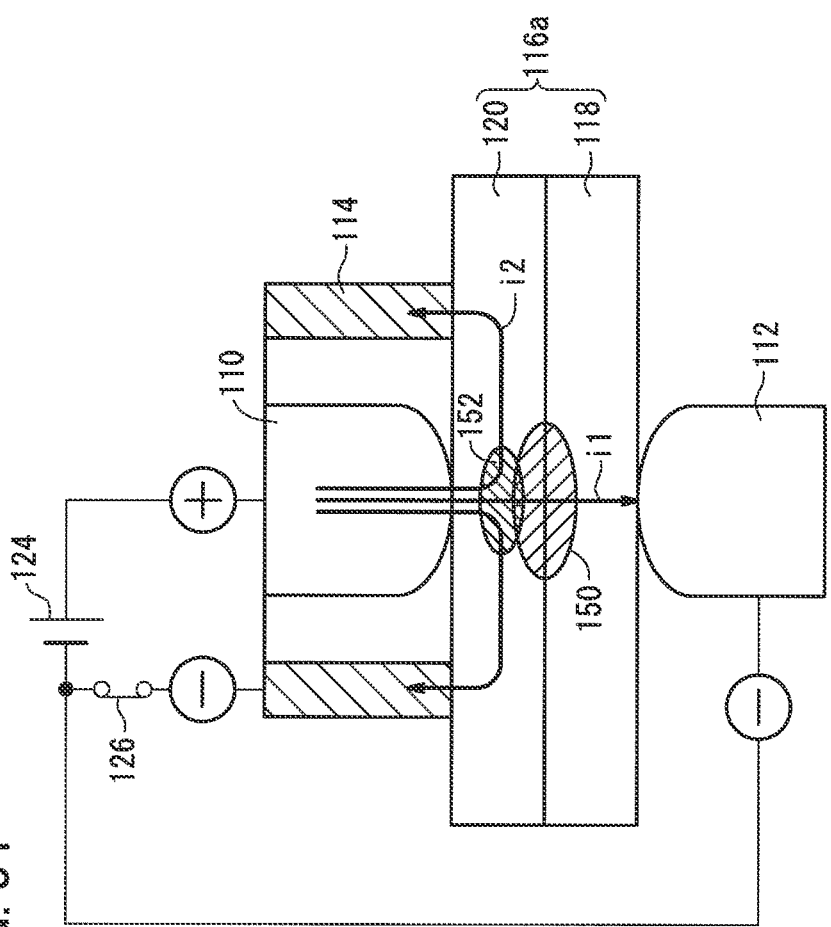
FIG. 34 is a schematic vertical cross sectional view showing a condition in which a stacked body, which differs from that shown in FIG. 25, is gripped by all of the first welding tip, the second welding tip, and the auxiliary electrode, and conduction of current is started.

Alternatively, the stacked body may be constituted from four or more metallic plates, and as shown in FIG. 34, a stacked body 116a may be constituted from only two metallic plates 118, 120. A description concerning such a case will be presented below.

When resistance welding is carried out on the stacked body 116a, similar to the case described above, under operation of the RB controller, the articulated robot moves the welding gun to sandwich the stacked body 116a between the first welding tip 110 and the second welding tip 112. Furthermore, the auxiliary electrode 114 is brought into abutment against the metallic plate 120. Consequently, the condition shown in FIG. 34 is brought about.

Subsequently, similar to the situation described above, the RB controller 128 issues a command signal to the effect of "START CONDUCTION OF CURRENT" to the welding timer 130, and by the welding timer 130 receiving the same, conduction of the current i1, which flows between the first welding tip 110 and the second welding tip 112, is started. Simultaneously therewith, the branching current i2 is made to flow radially from the first welding tip 110 to the auxiliary electrode 114. Furthermore, the current conduction start signal is sent to the branching current OFF timer 132 (see FIG. 24), whereupon the branching current OFF timer 132, which has received the current conduction start signal, begins to measure the elapsed time.

As understood from FIG. 34, based on the current i1, the region between the metallic plates 118, 120 is heated and softened by Joule heating, whereby a softened portion 150 is formed. On the other hand, the metallic plate 120 through which the current i1 as well as the branching current i2 flow, becomes heated due to Joule heating based on the current i1 and the branching current i2, and melting occurs therein, whereby a melted portion 152 is formed.

Figure 35:
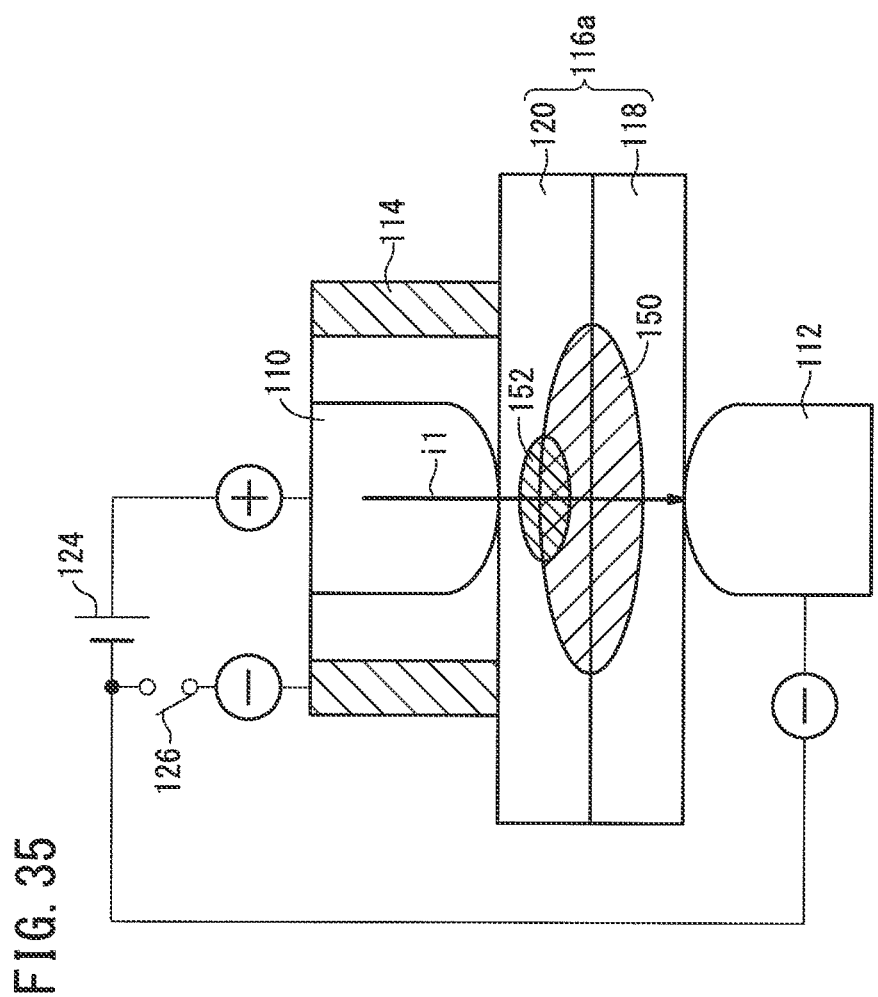
FIG. 35 is a schematic vertical cross sectional view showing a condition in which, continuing from the situation in FIG. 34, the ON/OFF switch is switch to an OFF state, yet conduction of current continues to take place from the first welding tip to the second welding tip.

In the branching current OFF timer 132, a predetermined time, which was determined experimentally by carrying out resistance welding with respect to a test piece, is set beforehand, by which the softened portion 150 can be softened sufficiently. As shown in FIG. 35, under an action of the branching current OFF timer 132, the ON/OFF switch 126 is placed in an OFF state, whereupon flow of the branching current i2 is stopped.

In the foregoing manner, when the branching current i2 is stopped, only the current i1 from the first welding tip 110 to the second welding tip 112 flows in the metallic plates 118, 120. At this time, the current i1 is greater in comparison with the current i1 that has flowed up to the time that the branching current i2 was stopped.

Figure 36:
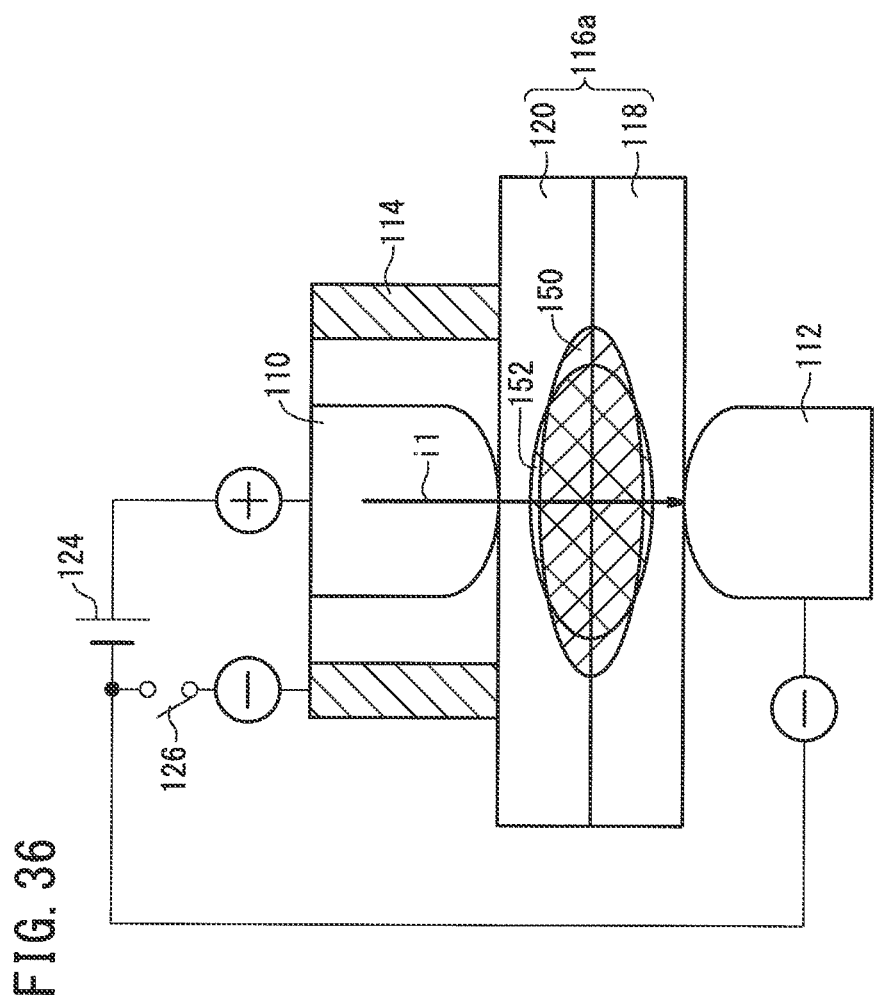
FIG. 36 is a schematic vertical cross sectional view showing a condition in which, continuing from the situation in FIG. 35, conduction of current is continued further from the first welding tip to the second welding tip.

Joule heating that takes place at the contact surface between the metallic plates 118, 120 for which the resistance thereof is large is greater in comparison to the condition before the branching current i2 was stopped. As a result, as shown in FIG. 36, the melted portion 152 grows large on the side of the softened portion 150, and ultimately, a nugget is formed from the melted portion 152.

As noted above, the softened portion 150 is formed beforehand at the contact surface between the metallic plates 118, 120, and for this reason, the region between the metallic plates 118, 120 is suitably sealed. Accordingly, even at the time that the branching current i2 is stopped and the current value of the current i1 increases, scattering of spatter from between the metallic plates 118, 120 is avoided.

In the foregoing manner, in the case that resistance welding is performed on the two metallic plates 118, 120, a large nugget can be grown at the contact surface between the metallic plates 118, 120 while also preventing generation of spatter.

Next, an explanation shall be given concerning a fourth embodiment of the present invention.

Figure 37:
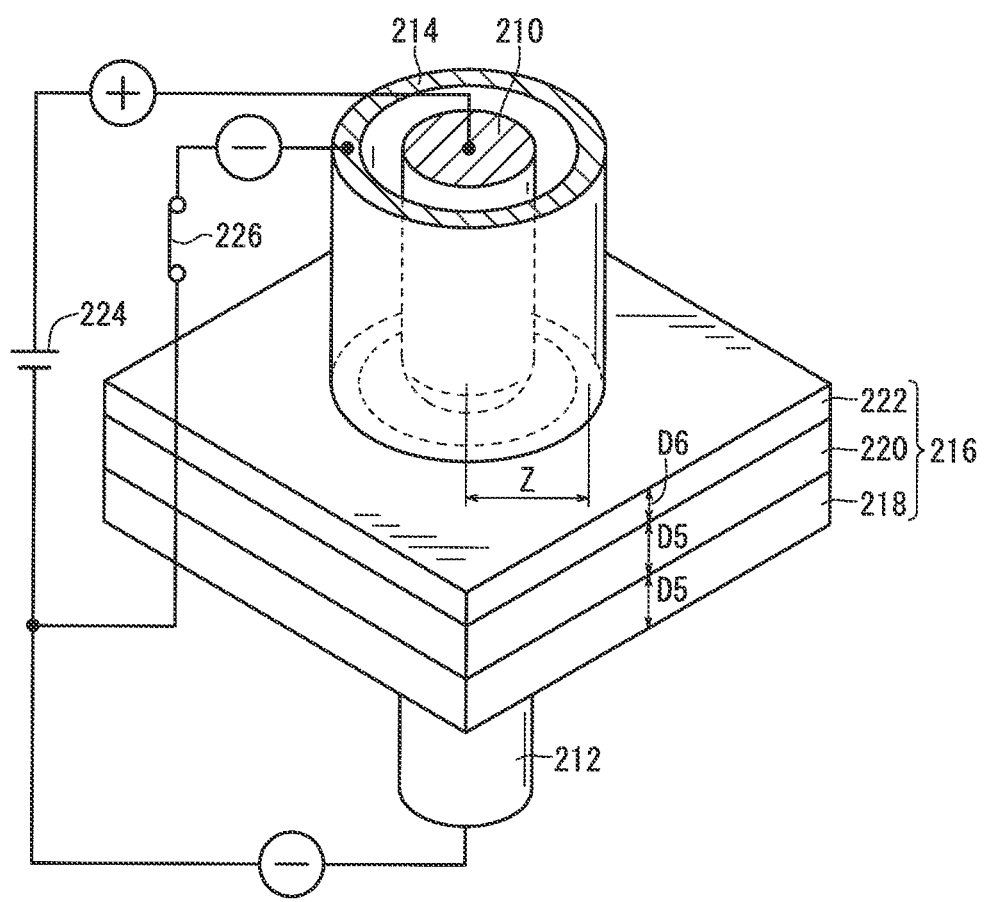
FIG. 37 is an enlarged perspective view with partial transverse cross section of essential features of a resistance welding device according to a fourth embodiment of the present invention.

FIG. 37 is an enlarged perspective view with partial transverse cross section of essential features of a resistance welding device according to a fourth embodiment of the present invention. The resistance welding device includes a non-illustrated welding gun, which is equipped with a first welding tip 210, a second welding tip 212, and an auxiliary electrode 214. The welding gun may be arranged, for example, on the end of a robot arm of an articulated robot such as a six-axis robot or the like. Such a structure in which the welding gun is disposed on the arm of an articulated robot is well known, and for this reason, detailed explanations of the structure are omitted.

To explain somewhat concerning the stacked body 216 that serves as the object to be welded, in this case, the stacked body 216 is constituted from three metallic plates 218, 220, 222, which are stacked in this order from below. Among such plates, the metallic plates 218, 220 have a thickness D5 (e.g., 1 mm to 2 mm), whereas the thickness D6 of the metallic plate 222 is set to a shorter dimension (e.g., 0.5 mm to 0.7 mm) in comparison with the thickness D5. More specifically, the respective thicknesses of the metallic plates 218, 220 are the same, whereas the metallic plate 222 is thin-walled in comparison to the metallic plates 218, 220. In the following description, the metallic plate 222 will also be referred to as a thinnest workpiece.

The metallic plates 218, 220 are made, for example, from JAC590, JAC780, or JAC980, which are so-called high tensile strength steels (any of which is a high performance, high tensile strength steel, according to standards of the Japan Iron and Steel Federation), whereas the thinnest workpiece 222 is made, for example, from JAC270, which is a so-called mild steel (a high performance steel sheet for drawing, according to standards of the Japan Iron and Steel Federation). The metallic plates 218, 220 may be of the same metal type or of different metal types.

Further, an assembly may be provided in which all of the metallic plates 218, 220, 222 are mild steel, or an assembly may be provided in which only the metallic plate 218 is made of high tensile strength steel, whereas the metallic plates 220, 222 are both made of mild steel.

The materials of the metallic plates 218, 220, 222 are not particularly limited to the aforementioned steel materials, and may be any materials on which resistance welding can be performed.

The first welding tip 210 and the second welding tip 212 are formed in the shape of elongate rods. The stacked body 216, which serves as the object to be welded, is gripped between the first welding tip 210 and the second welding tip 212, and a current is conducted with respect to the stacked body 216. In the fourth embodiment as well, the current flows from the first welding tip 210 to the second welding tip 212.

In the case that the welding gun is a so-called X-shaped welding gun, the first welding tip 210 is disposed on one chuck pawl that constitutes one of a pair of openable and closeable chuck pawls, whereas the second welding tip 212 is disposed on the remaining one of the chuck pawls. More specifically, accompanying opening or closing movements of the pair of chuck pawls, the first welding tip 210 and the second welding tip 212 are brought into mutual proximity or made to separate mutually away from each other.

The welding gun may also be a so-called C-shaped welding gun. In this case, the second welding tip 212 is disposed on the end of a fixed arm, whereas the first welding tip 210 is connected, for example, to a ball screw. By rotation of the ball screw, the first welding tip 210 is made to approach toward or separate away from the second welding tip 212.

The auxiliary electrode 214 is formed in an annular shape and is disposed in surrounding relation to the first welding tip 210. A displacement mechanism, for example, a ball screw mechanism or a cylinder mechanism or the like, which causes the auxiliary electrode 214 to approach and separate away from the stacked body 216, is provided in the welding gun that supports the first welding tip 210. By means of the displacement mechanism, the auxiliary electrode 214 is capable of approaching toward and separating away from the stacked body 216 independently from the first welding tip 210.

According to the fourth embodiment, the first welding tip 210 is connected electrically to the positive terminal of the power source 224, and the second welding tip 212 and the auxiliary electrode 214 are connected electrically to the negative terminal of the power source 224. As can be understood from such connections, although the first welding tip 210 and the auxiliary electrode 214 are both placed in abutment against the thinnest workpiece 222 constituting the stacked body 216, the polarities thereof are mutually opposite.

In the above-described structure, in the event that the distance Z between the auxiliary electrode 214 and the first welding tip 210 is excessively large, resistance is increased between the first welding tip 210 and the auxiliary electrode 214, and thus it becomes more difficult for the later-mentioned branching current i2 (see FIG. 39) to flow. Accordingly, the distance Z is set to a distance that enables the resistance between the auxiliary electrode 214 and the first welding tip 210 to be such that the branching current i2 can flow at an appropriate current value.

In addition, an ON/OFF switch is interposed between the negative terminal of the power source 224 and the auxiliary electrode 214. More specifically, the negative terminal of the power source 224 and the auxiliary electrode 214 are electrically connected when the ON/OFF switch 226 is in an ON state, and are insulated from each other when the ON/OFF switch 226 is in an OFF state.

The resistance welding device further includes a RB (robot) controller as a control circuit, which controls operations of the welding gun and the articulated robot. Under control operations of the RB controller, respective ON and OFF states of the ON/OFF switch 226 are switched.

The essential features of the resistance welding device according to the fourth embodiment are configured basically as described above. Next, operations and advantages of the resistance welding device will be explained in relation to a resistance welding method according to the fourth embodiment.

For carrying out the resistance welding method according to the fourth embodiment, at first, a current conduction test is performed using a test piece.

More specifically, under operations of the RB controller, the articulated robot moves the welding gun so as to position the stacked body 216 between the first welding tip 210 and the second welding tip 212. Thereafter, a closing operation of the check pawls is performed, or alternatively by energizing a displacement mechanism, the first welding tip 210 and the second welding tip 212 are made to approach one another relatively, whereby the stacked body 216 is gripped mutually therebetween. The auxiliary electrode 214 is brought into abutment against the thinnest workpiece 222 simultaneously with the gripping action.

Figure 39:
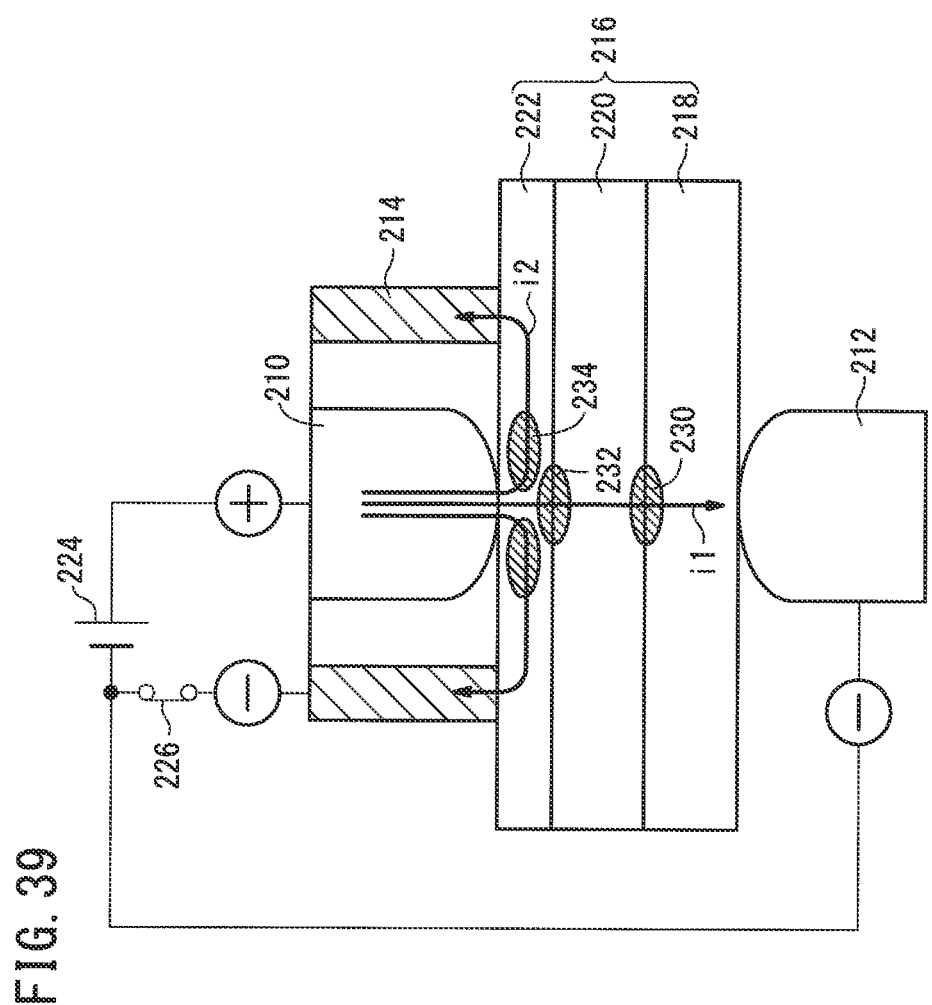
FIG. 39 is a schematic vertical cross sectional view showing a condition in which conduction of current is started and the current flows from the first welding tip to the second welding tip, and a branching current flows from the first welding tip to the auxiliary electrode.

Next, conduction of current is started. As noted above, since the first welding tip 210 and the second welding tip 212 are connected respectively to the positive and negative terminals of the power source 224, as shown in FIG. 39, a current i1 flows from the first welding tip 210 to the second welding tip 212. As a result of Joule heating based on the current i1, regions between the metallic plates 218, 220, and between the metallic plates 220, 222 are heated respectively. The reference numerals 230, 232 in FIG. 26 illustrate such heated regions.

The auxiliary electrode 214 also is in abutment against the thinnest workpiece 222, and the auxiliary electrode 214 is electrically biased at a negative polarity. Accordingly, simultaneously with the aforementioned current i1, a branching current i2 is emitted from the first welding tip 210 to the auxiliary electrode 214. Since the auxiliary electrode 214 is annular in shape, the branching current i2 flows radially.

Figure 40:
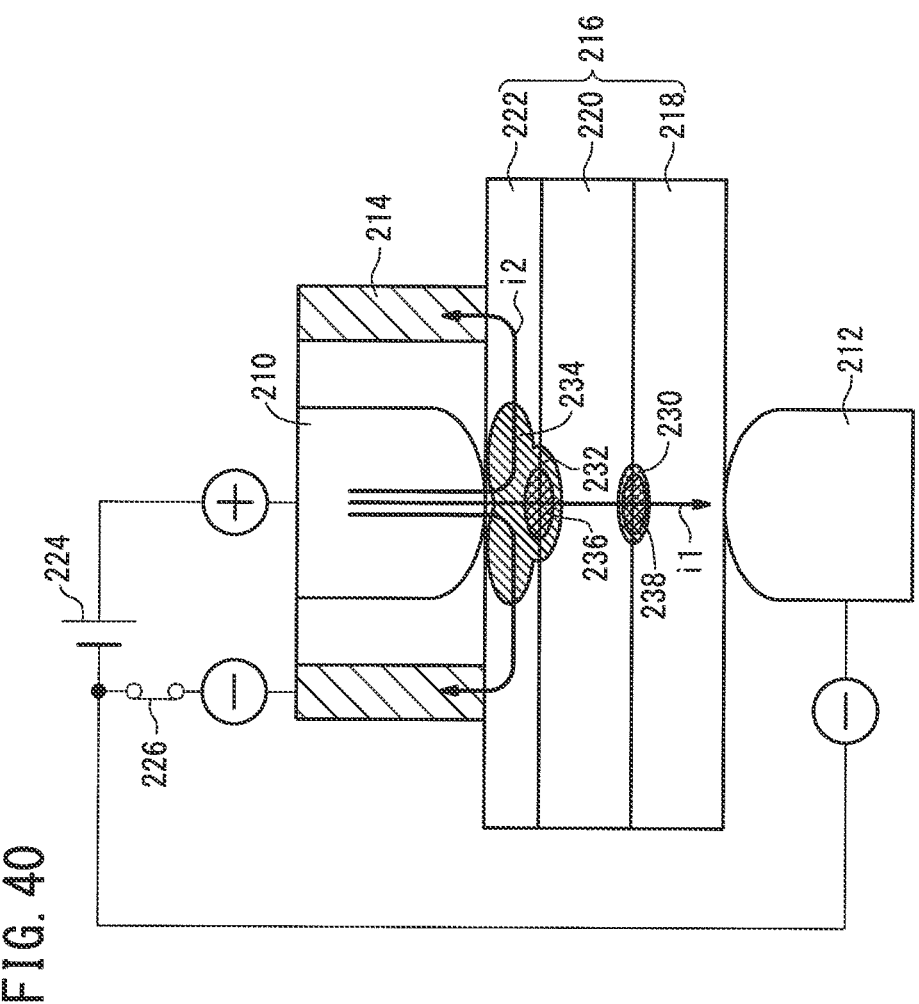
FIG. 40 is a schematic vertical cross sectional view showing a condition in which conduction of current is continued from the situation of FIG. 39.

Accordingly, in this case, in the interior of the thinnest workpiece 222, apart from the heated region 232, an additional heated region 234 is formed. Moreover, since the branching current i2 flows radially, the heated region 234 heats the contact surface between the metallic plates 220, 222 radially. The heated region 234 expands over time, and as shown in FIG. 40, merges to become integral with the heated region 232.

At the contact surface between the metallic plates 220, 222, heat is transmitted from both of the heated regions 232, 234, which are integrated in the foregoing manner. As a result, the temperature rises sufficiently at the contact surface and melting is started. Consequently, a nugget 236 is formed between the metallic plates 220, 222. Further, by means of the current i1, a nugget 238 also is formed between the metallic plates 218, 220.

Figure 41:
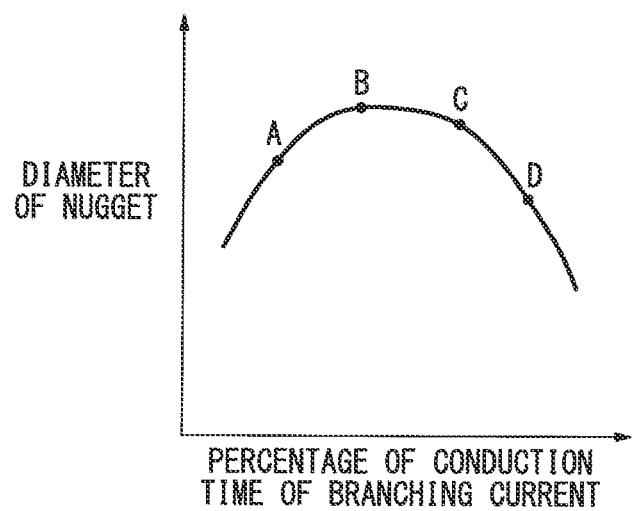
FIG. 41 is a graph showing a relationship between the percentage of time that the branching current flows from the first welding tip to the auxiliary electrode and nugget diameter.

In order that the nugget 236 can be grown sufficiently large between the metallic plates 220, 220, it may be contemplated to leave the auxiliary electrode 214 in contact with the thinnest workpiece 222 for a prolonged period, to thereby enable the branching current i2 to continue flowing over a longer time period. However, as shown in FIG. 41, in the event that the branching current i2 continues to flow for an excessively long time period, or stated otherwise, if the percentage of time at which the branching current i2 is conducted with respect to the time that the current i1 is conducted is large, then the diameter of the nugget 236 becomes smaller in size.

Figure 42:
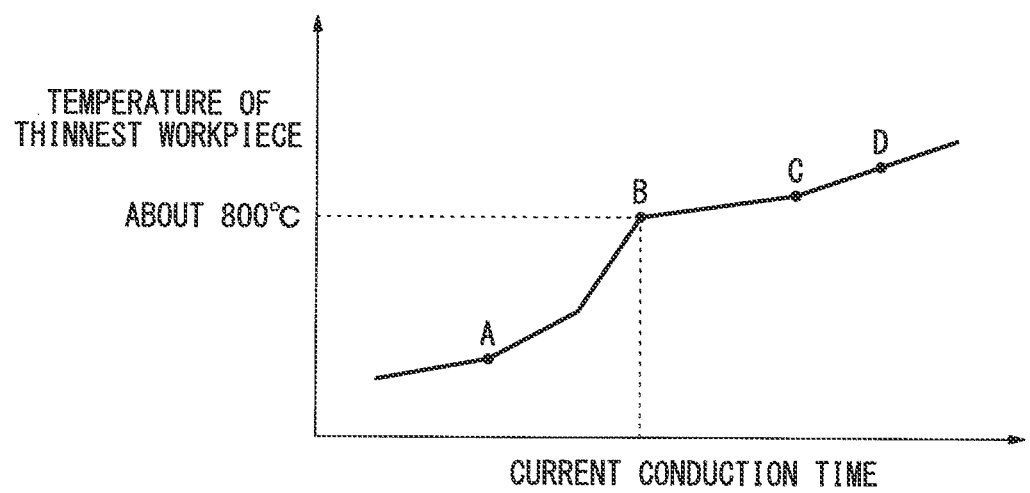
FIG. 42 is a graph showing a relationship between the time that the branching current flows from the first welding tip to the auxiliary electrode, and the temperature of the thinnest workpiece that is arranged on an outermost side of the stacked body.

Thus, in the fourth embodiment, in the aforementioned current conduction test, the temperature of the thinnest workpiece 222 is measured while the branching current i2 is conducted continuously, and the result thereof is plotted. More specifically, a conduction time vs. temperature graph in the thinnest workpiece 22 is created. As a temperature measuring means, a well-known type of thermocouple or radiation thermometer may be used FIG. 42 shows an example thereof. More specifically, FIG. 42 shows a case in which the slope of the temperature of the thinnest workpiece 22 changes at point B from a maximum slope to a minimum slope. More specifically, in this case, in the thinnest workpiece 222, as time passes up to point B, the temperature of the thinnest workpiece rises rapidly, whereas after reaching point B, the temperature does not rise significantly.

Figure 43:
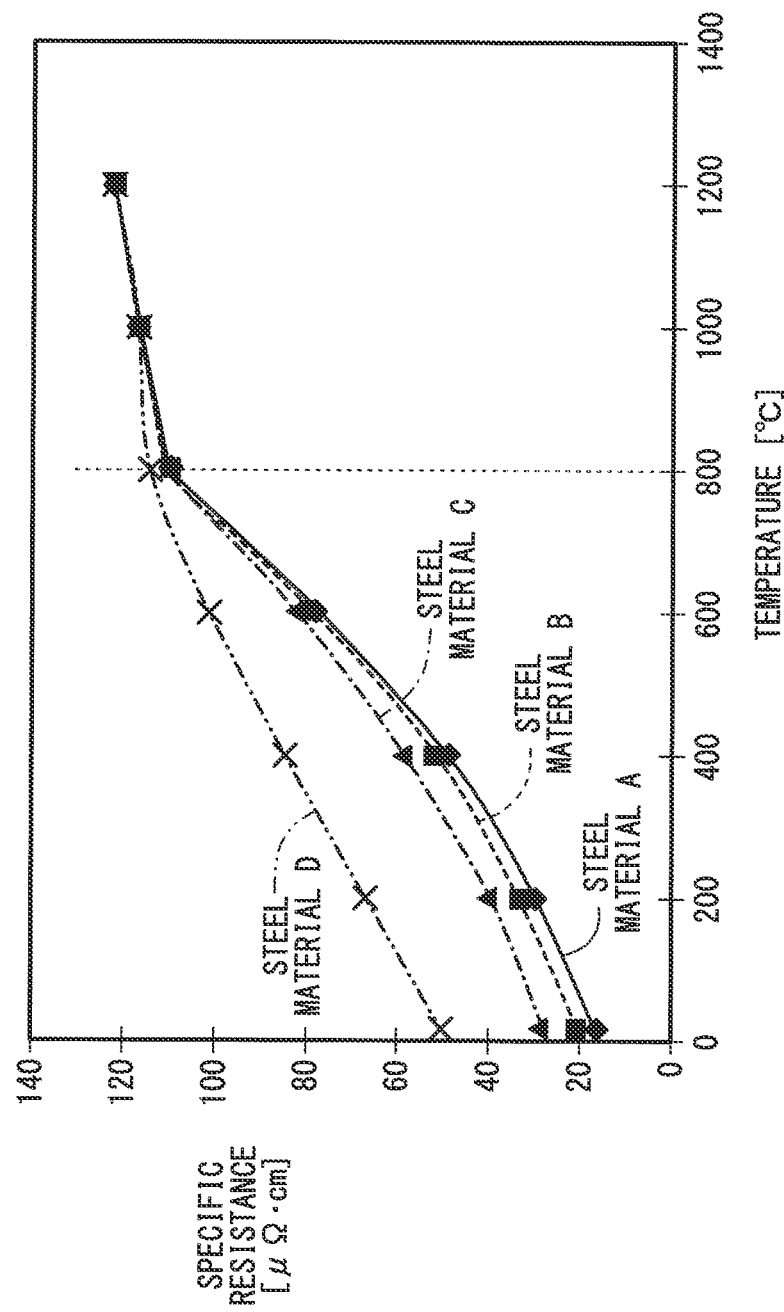
FIG. 43 is a graph showing a relationship between temperature and specific resistance in various steel materials.

As for the reasons for such a change in the temperature of the thinnest workpiece 222, the material of the thinnest workpiece 222 undergoes a transformation, and thus the specific resistance of the thinnest workpiece changes. More specifically, taking respective cases of steel materials as examples, as shown in FIG. 43, in any of a steel material A including 0.23% C (percent by weight, the same shall apply hereinafter) and 0.46% Mn (plotted by diamond markings ♦), a steel material B including 0.32% C, 0.69% Mn, 1.09% Cr, and 0.07% Ni (plotted by square markings ■), a steel material C including 0.34% C, 0.55% Mn, 0.78% Cr, 3.53% Ni, and 0.39% Mo (plotted by triangular markings ▲), and a steel material D including 0.13% C, 0.25% Mn, and 12.95% Cr (plotted by × markings), the rate of change of the specific resistance becomes small at roughly 800° C. Before and after the rate of change becomes different, an A3 transformation takes place at which the steel materials change from a body-centered cubic crystal to a face-centered cubic crystal.

Stated otherwise, in the case that any one of the steel material A, the steel material B, the steel material C, or the steel material D is used for the thinnest workpiece 222, until reaching about 800° C., which is the A3 transformation point, the specific resistance rises with a large slope, and therefore, the temperature of the thinnest workpiece 222 also rises with a large slope. This is because, since the specific resistance is large, the generated amount of Joule heating becomes large. In addition, when the temperature of about 800° C. is exceeded, the slope of the specific resistance becomes small, and as a result, based on the generated amount of Joule heating being smaller, the slope of the temperature rise of the thinnest workpiece 222 also becomes small.

In essence, up until about 800° C., which is the A3 transformation point, the temperature of the thinnest workpiece 222 rises with good efficiency. However, at temperatures in excess thereof, the rise in temperature of the thinnest workpiece 222 becomes small (see FIG. 42).

Each of the points A through D in FIG. 41 correspond respectively with the points A through D in FIG. 42. More specifically, the elapsed times from the origin to the respective points A through D in FIG. 41 are equivalent mutually with the elapsed times from the origin to the respective points A through D in FIG. 42.

Additionally, as can be understood by comparing points A through D in FIG. 41 with points A through D in FIG. 42, the diameter of the nugget 236 formed between the metallic plates 220, 222 becomes maximum when the branching current i2 is stopped upon reaching the point B, and only the current i1 continues to flow thereafter. If flow of the branching current i2 continues after having exceeded point B, then as shown at point D in FIG. 41, a tendency is confirmed for the diameter of the nugget 236 to become smaller in size.

After having established the above findings by means of the current conduction test, actual resistance welding is carried out. During actual resistance welding, the branching current i2 is stopped at point B, which was determined by the above current conduction test, or more specifically, when the slope of the temperature rise of the workpiece changes from a maximum to a minimum. For this purpose, for example, in the current conduction test, flow of the branching current i2 is started, and the elapsed time until the slope of the temperature of the thinnest workpiece 222 changes from a maximum to a minimum is input to the RB controller. Then, during actual resistance welding, a control is performed so that the ON/OFF switch 226 is placed in an OFF state when such a time is reached.

Further, using the aforementioned well known types of temperature measuring means, the temperature of the thinnest workpiece 222 may be measured, and a control may be performed such that, when the temperature at point B in FIG. 42 is reached, the ON/OFF switch 226 is placed in an OFF state.

Figure 44:
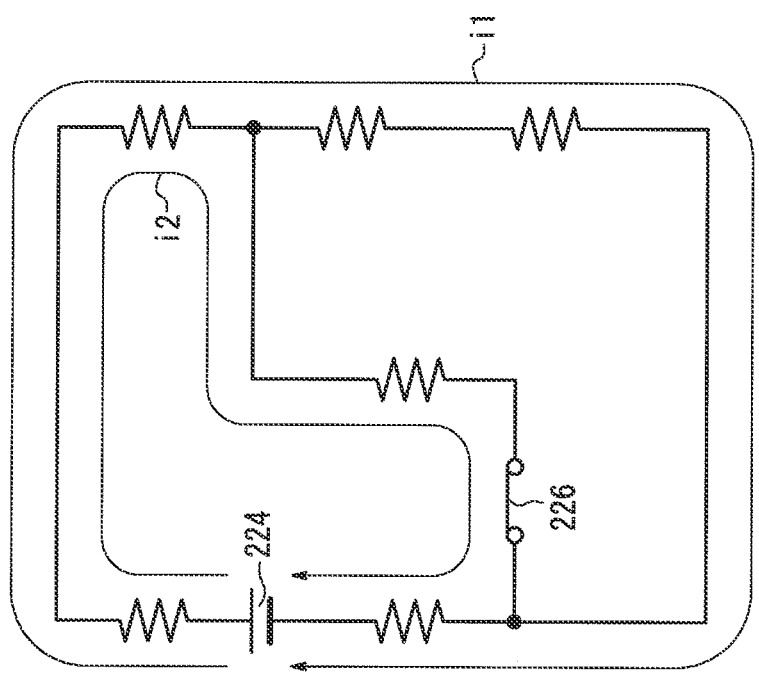
FIG. 44 is a schematic current path diagram showing in what paths the current and the branching current flow in an equivalent circuit of FIG. 40.

More specifically, first, the current conduction test is complied with, and the current i1 is made to flow from the first welding tip 210 to the second welding tip 212 that have gripped the stacked body 216, together with causing the branching current i2 to flow from the first welding tip 210 to the auxiliary electrode 214. As a result, heated regions 230, 232, 234 similar to those shown in FIGS. 39 and 40 are formed. Together therewith, the nugget 236 is formed between the metallic plates 220, 222, and the nugget 238 is formed between the metallic plates 218, 220. FIG. 44 illustrates the current paths in an equivalent circuit at this time.

In this case, the current value of the current i1 that flows in the metallic plates 218, 220 is smaller than in general resistance welding in which the branching current i2 does not flow. For this reason, during the time that the nugget 236 grows to a large size between the metallic plates 220, 222, the amount by which the metallic plates 218, 220 are heated can be prevented from increasing excessively. Accordingly, any concerns over generation of spatter can be dispensed with.

The heated region 234, and hence the nugget 236, can be made larger as the percentage of the branching current i2 becomes greater. However, in the event that the percentage of the branching current i2 becomes excessively large, since the current value of the current i1 decreases, the heated regions 230, 232 become smaller in size. As a result, the size of the nugget 236 becomes saturated, whereas the nugget 238 has a tendency to become smaller. Accordingly, the percentage of the branching current i2 preferably is set such that the current i1 flows to a degree that enables the nugget 238 to grow adequately.

Figure 38:
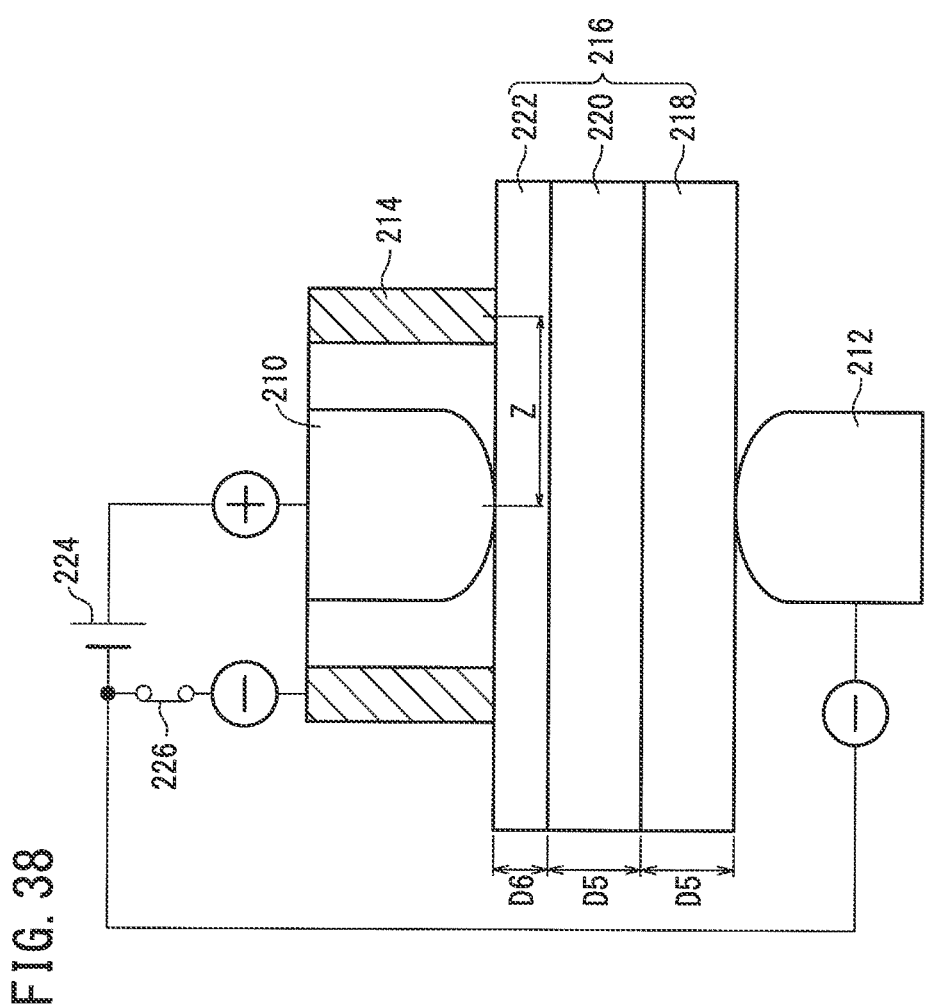
FIG. 38 is a schematic vertical cross sectional view showing a condition in which a stacked body, which serves as an object to be welded, is gripped by all of a first welding tip, a second welding tip, and an auxiliary electrode.

Further, the percentages or ratio of the current i1 and the branching current i2 can be adjusted, for example as noted above, by changing the distance Z (see FIGS. 37 and 38) between the first welding tip 210 and the auxiliary electrode 214. Alternatively, the percentage of the branching current i2 may be adjusted by providing a mechanism or a resistive element for adjusting the current amount in the current path of the branching current i2, for example, between the auxiliary electrode 214 and the power source 224.

In the foregoing manner, if the branching current i2 continues to flow, there is a tendency for the nugget 236 to become somewhat smaller in size. Accordingly, in the fourth embodiment, the branching current i2 is terminated at a point in time that the size of the nugget 236 is maximal.

Figure 45:
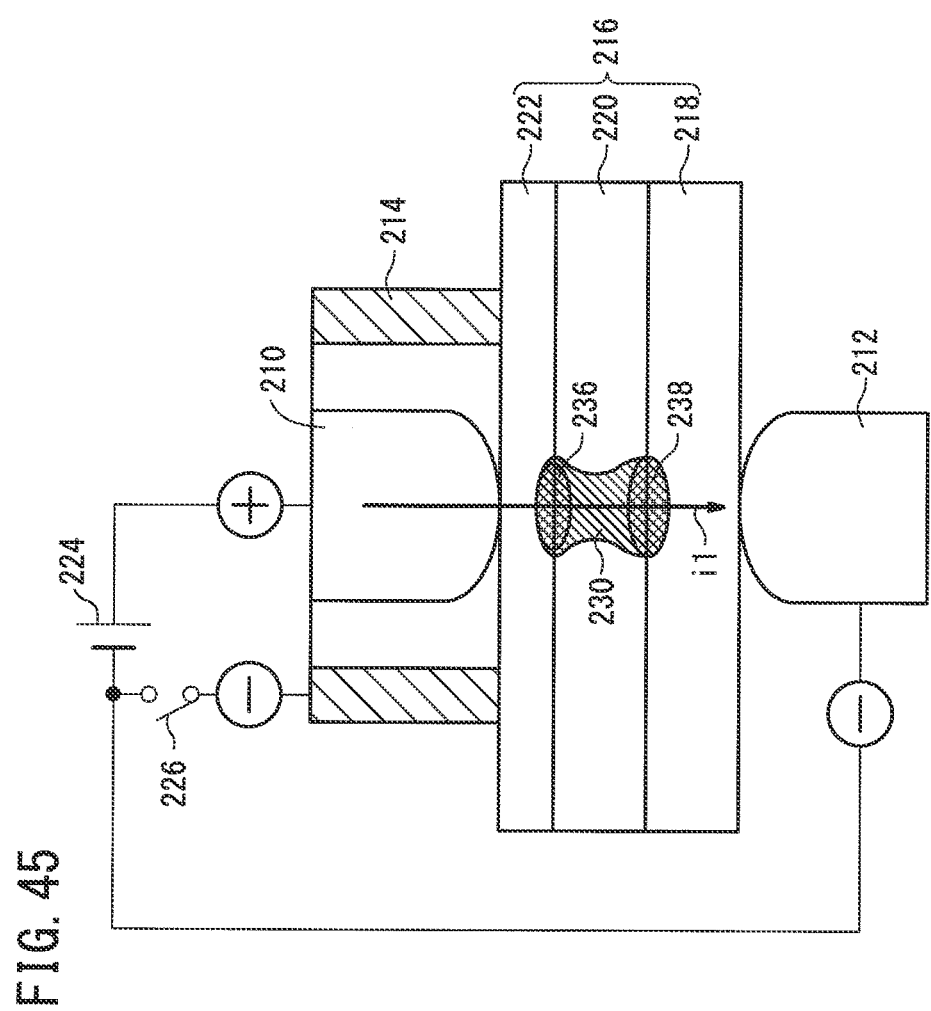
FIG. 45 is a schematic vertical cross sectional view showing a condition in which an ON/OFF switch is switched to an OFF state, yet conduction of current continues to take place from the first welding tip to the second welding tip.

For example, in the case that the elapsed time from start of flow of the branching current i2 in the current conduction test until the slope of the temperature of the thinnest workpiece 222 changes from a maximum to a minimum is input to the RB controller, then when this time is reached, as shown in FIG. 45, the RB controller places the ON/OFF switch 226 in an OFF state. Further, in the case that information concerning the temperature of the thinnest workpiece 222, which is measured by a temperature measuring means, is transmitted to the RB controller, then the RB controller performs a control to place the ON/OFF switch 226 in an OFF position when the temperature reaches the point B shown in FIG. 42.

Figure 46:
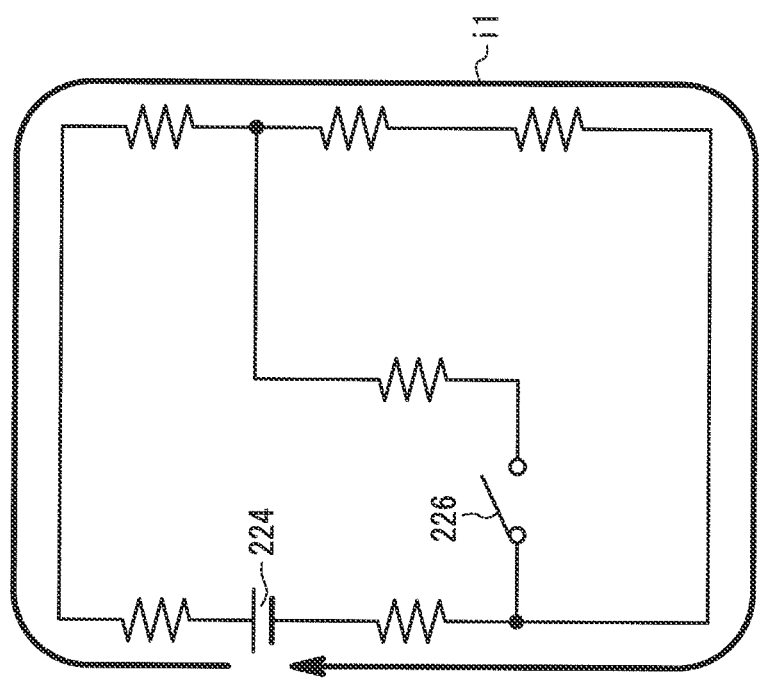
FIG. 46 is a schematic current path diagram showing in what paths the current and the branching current flow in an equivalent circuit of FIG. 45.

Thus, the power source 224 and the auxiliary electrode 214 are electrically insulated. As a result, the branching current i2 is stopped. FIG. 46 illustrates the current paths in an equivalent circuit at this time.

In the foregoing manner, when the branching current i2 is stopped, only the current i1 flows in the thinnest workpiece 222 from the first welding tip 210 to the second welding tip 212. As a result, the heated region 234 vanishes (see FIG. 40).

On the other hand, in the metallic plates 218, 220, a condition is brought about which is similar to ordinary resistance welding. More specifically, at the metallic plates 218, 220, which are of greater thickness, the generated amount of Joule heating increases, and as a result, the heated region 230 expands together with the temperature thereof rising further. The contact surface between the metallic plates 218, 220 is heated by the heated region 230 which has risen in temperature, and thus, the temperature in the vicinity of the contact surface rises (the contact surface is heated) sufficiently and becomes melted, thereby promoting growth of the nugget 238.

Subsequently, until the nugget 238 has grown sufficiently, for example as shown in FIG. 45, current may continue to be conducted until the nugget 238 becomes integrated with the nugget 236. The degree of growth of the nugget 238 with respect to the duration for which current continues to be conducted may be confirmed in advance experimentally by carrying out resistance welding using a test piece or the like.

The contact surface between the metallic plates 218, 220 is heated beforehand by the heated region 230 that was formed accompanying passage of the current i1 at the time that the nugget 236 was grown between the metallic plates 220, 222. Owing thereto, conformability of the metallic plates 218, 220 to such heating is enhanced prior to the nugget 238 growing in size. Accordingly, it is more difficult for spatter to occur.

In the foregoing manner, according to the fourth embodiment, the occurrence of spatter can be avoided both when the nugget 236 is grown between the metallic plates 220, 222, as well as when the nugget 238 is grown between the metallic plates 218, 220.

Figure 47:
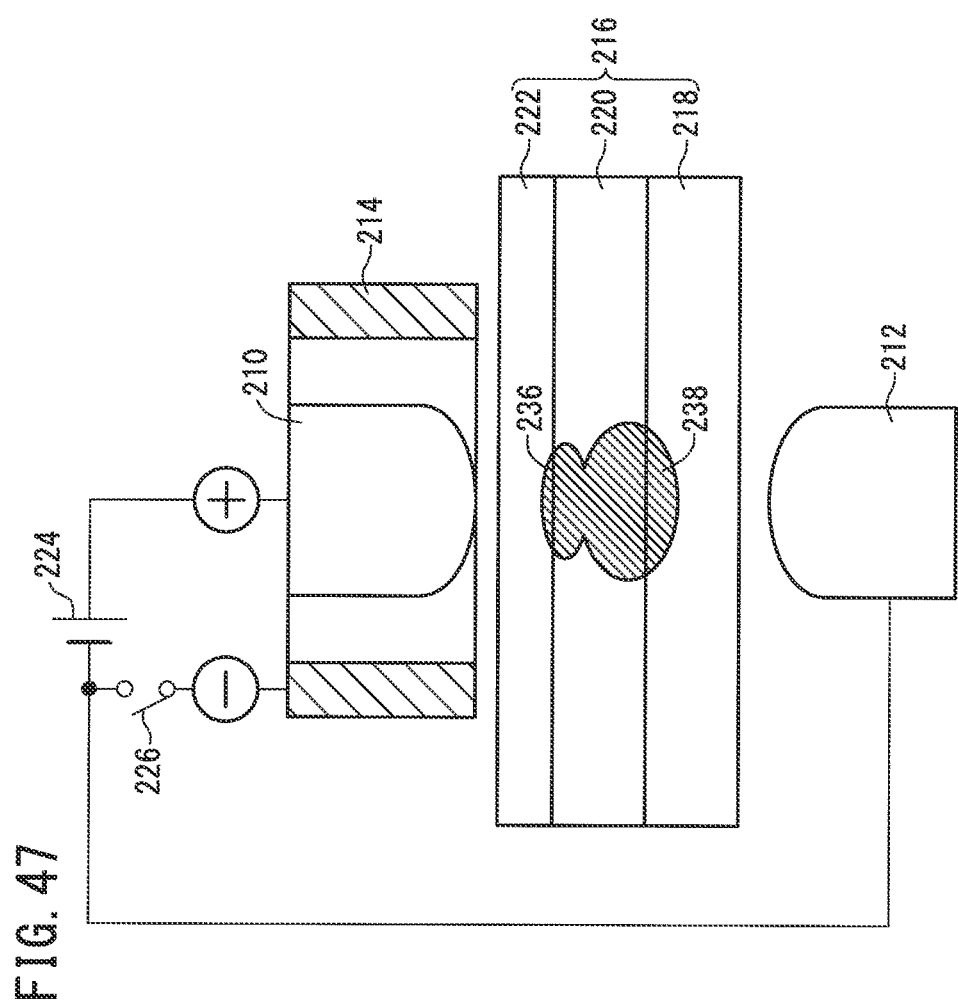
FIG. 47 is a schematic vertical cross sectional view showing a condition in which conduction of current (resistance welding) is terminated.

Upon the passage of the predetermined period of time (i.e., a time required for the nugget 148 to grow adequately), which is set beforehand in the welding timer that is included in the RB controller, conduction of current is stopped, and as shown in FIG. 47, the first welding tip 210 is separated away from the thinnest workpiece 222. Alternatively, the first welding tip 210 and the second welding tip 212 may be electrically insulated from each other simply by separating the first welding tip 210 away from the thinnest workpiece 222, whereby welding of the workpieces is completed.

In the foregoing manner, accompanying the termination of conduction of current (welding), heating of the metallic plates 218, 220 is brought to an end. With the passage of time, the melted portion is cooled and solidified into the nugget 238, whereupon the metallic plates 218, 220 are joined together mutually.

In this manner, ultimately, a bonded product is obtained in which the metallic plates 218, 220, as well as the metallic plates 220, 222 that make up the stacked body 216 are bonded together.

In the bonded product, similar to the bonding strength between the metallic plates 218, 220, the bonding strength between the metallic plates 220, 222 is superior. This is because, as noted above, the nugget 236 is grown to a sufficient size between the metallic plates 220, 222 accompanying flow of the branching current i2 through the thinnest workpiece 222.

In addition, as easily comprehended from the foregoing discussion, when the resistance welding device according to the fourth embodiment is constructed, the auxiliary electrode 214, a displacement mechanism for displacing the auxiliary electrode 214, and the ON/OFF switch 226 for generating and stopping generation of the branching current i2 toward the auxiliary electrode 214 may be provided. Accordingly, the structure of the resistance welding device together with the provision of the auxiliary electrode 214 is not increased in complexity.

Moreover, after having obtained the necessary information by performing the current conduction test one time, since based on such information, actual resistance welding can be carried out, it is unnecessary to create a large number of test pieces and to perform the current conduction test multiple times for determining the conduction time of the branching current i2 in order to maximize the diameter of the nugget 236. More specifically, according to the fourth embodiment, an advantage is obtained in that the conditions at the time of actual resistance welding can be set conveniently and easily.

In the above embodiment, although it has been described that the branching current i2 is stopped by placing the ON/OFF switch 226 in an OFF state, in place thereof, the auxiliary electrode 214 and the thinnest workpiece 222 may be separated from each other upon elapse of a predetermined time that is set in the welding timer, whereby the branching current i2 is terminated. In this case, a displacement mechanism may be provided which acts to displace the auxiliary electrode 214 independently from the first welding tip 210.

Figure 48:
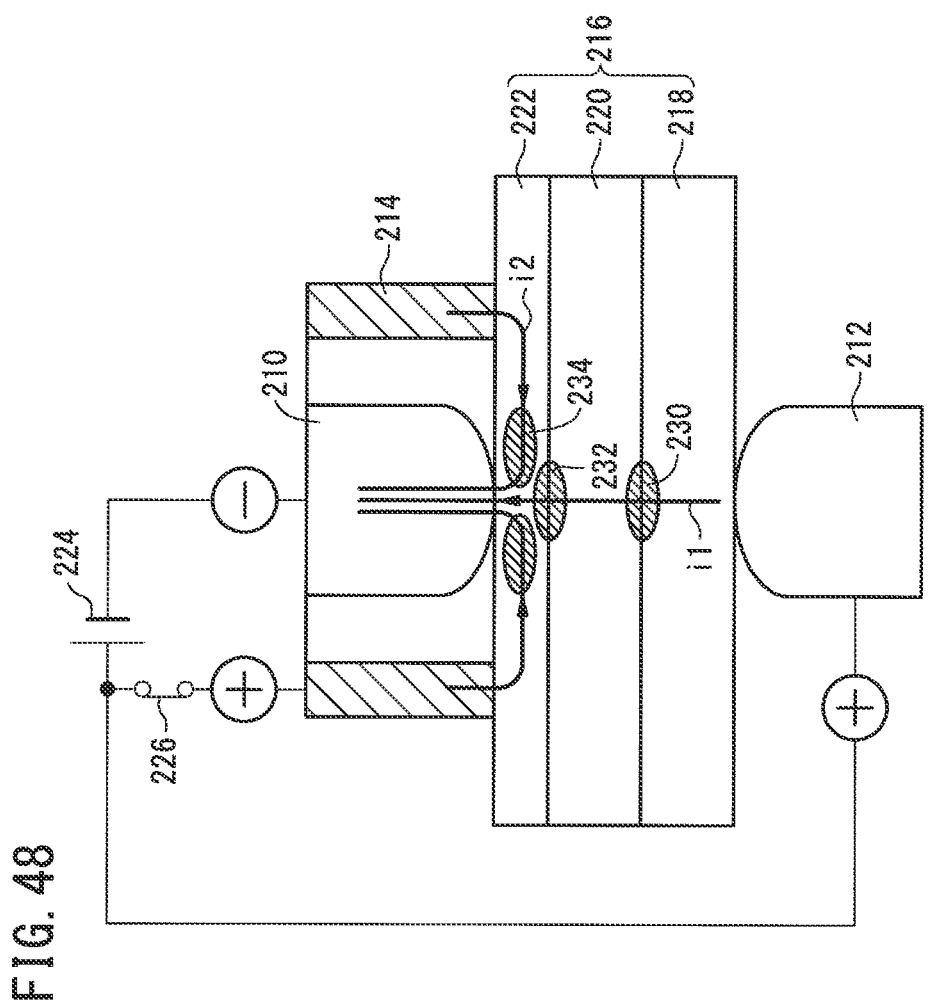
FIG. 48 is a schematic vertical cross sectional view showing a condition in which, opposite to the situation of FIG. 40, current is made to flow to the first welding tip from the second welding tip and the auxiliary electrode.

Further, as shown in FIG. 48, a current may be made to flow from the second welding tip 212, which is in abutment with the metallic plate 218, to the first welding tip 210, which is in abutment with the thinnest workpiece 222. In this case as well, the polarity of the auxiliary electrode 214 that is in abutment against the thinnest workpiece 222 is opposite to that of the first welding tip 210. More specifically, the second welding tip 212 and the auxiliary electrode 214 are connected electrically to the positive terminal of the power source 224, whereas the first welding tip 210 is connected electrically to the negative terminal of the power source 224. As a result, a current i1, which flows from the second welding tip 212 to the first welding tip 210, and a branching current i2, which flows from the auxiliary electrode 214 to the first welding tip 210, are created.

In any of these cases, the auxiliary electrode is not particularly limited to the annular shaped auxiliary electrode 214. For example, auxiliary electrodes may be provided in the form of elongate rods similar to the first welding tip 210 and the second welding tip 212. In this case, a single auxiliary electrode or a plurality of auxiliary electrodes may be provided, and in the case that plural auxiliary electrodes are used, such plural auxiliary electrodes may be configured to abut against and separate away from the thinnest workpiece 222 simultaneously.

Figure 49:
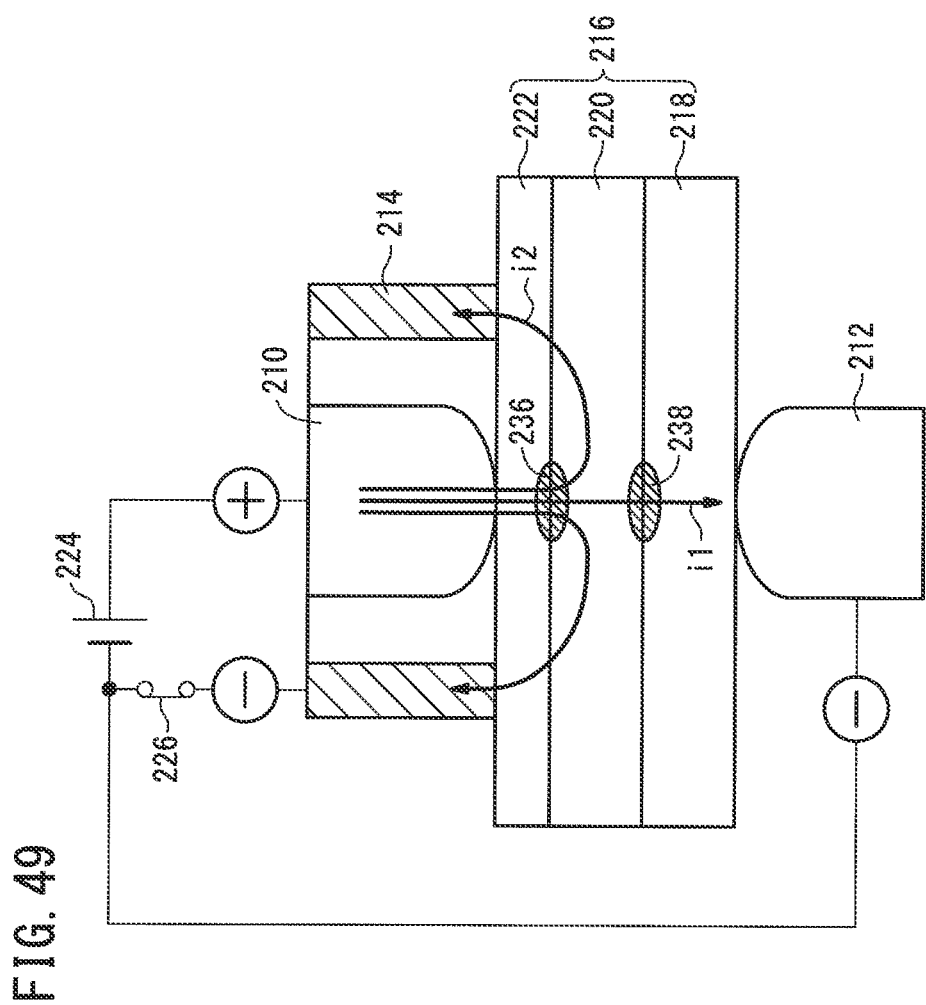
FIG. 49 is a schematic vertical cross sectional view showing a condition in which current is made to flow from the first welding tip to the auxiliary electrode, and through a thinnest workpiece positioned uppermost on the stacked workpiece and a workpiece directly beneath the same.

Furthermore, as shown in FIG. 49, the branching current i2 may be made to flow not only through the thinnest workpiece 222 against which the first welding tip 210 is in abutment, but also through the metallic plate 220 that is positioned directly beneath the thinnest workpiece 222.

In this case, resistance heating occurs between the thinnest workpiece 222 and the metallic plate 220, and as a result, the nugget 236 is formed. Conversely, the current from the first welding tip 210 to the auxiliary electrode 214 either does not flow between the metallic plates 218, 220, or even if some flow of the current takes place, the amount thereof is negligible. Accordingly, the created nugget 236 can easily be grown between the thinnest workpiece 222 and the metallic plate 220.

Figure 50:
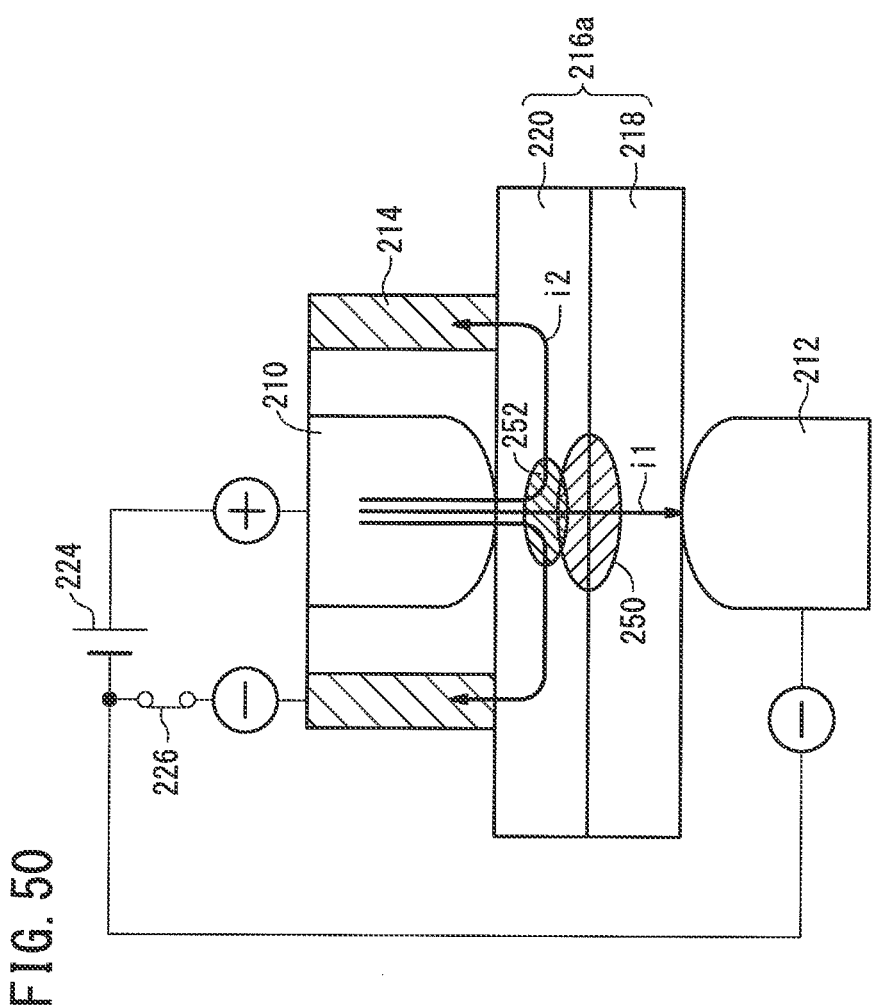
FIG. 50 is a schematic vertical cross sectional view showing a condition in which a stacked body, which differs from that shown in FIG. 39, is gripped by all of the first welding tip, the second welding tip, and the auxiliary electrode, and conduction of current is started.

Alternatively, the stacked body may be constituted from four or more metallic plates, and as shown in FIG. 50, a stacked body 216a may be constituted from only two metallic plates 218, 220. A description concerning such a case will be presented below.

When resistance welding is carried out on the stacked body 216a, similar to the case described above, under operation of the RB controller, the articulated robot moves the welding gun to sandwich the stacked body 216a between the first welding tip 210 and the second welding tip 212. Furthermore, the auxiliary electrode 214 is brought into abutment against the metallic plate 220. Consequently, the condition shown in FIG. 50 is brought about.

Subsequently, in the same manner as described before, under a control action of the RB controller, the current i1 flows from the first welding tip 210 to the second welding tip 212, whereupon conduction of current is started. At the same time, the current i2 flows radially from the first welding tip 210 to the auxiliary electrode 214.

As understood from FIG. 50, based on the current i1, the region between the metallic plates 218, 220 is heated and softened by Joule heating, whereby a softened portion 250 is formed. On the other hand, the metallic plate 220 through which the current i1 as well as the branching current i2 flow becomes heated due to Joule heating based on the current i1 and the branching current i2, and melting occurs therein, whereby a melted portion 252 is formed.

Figure 51:
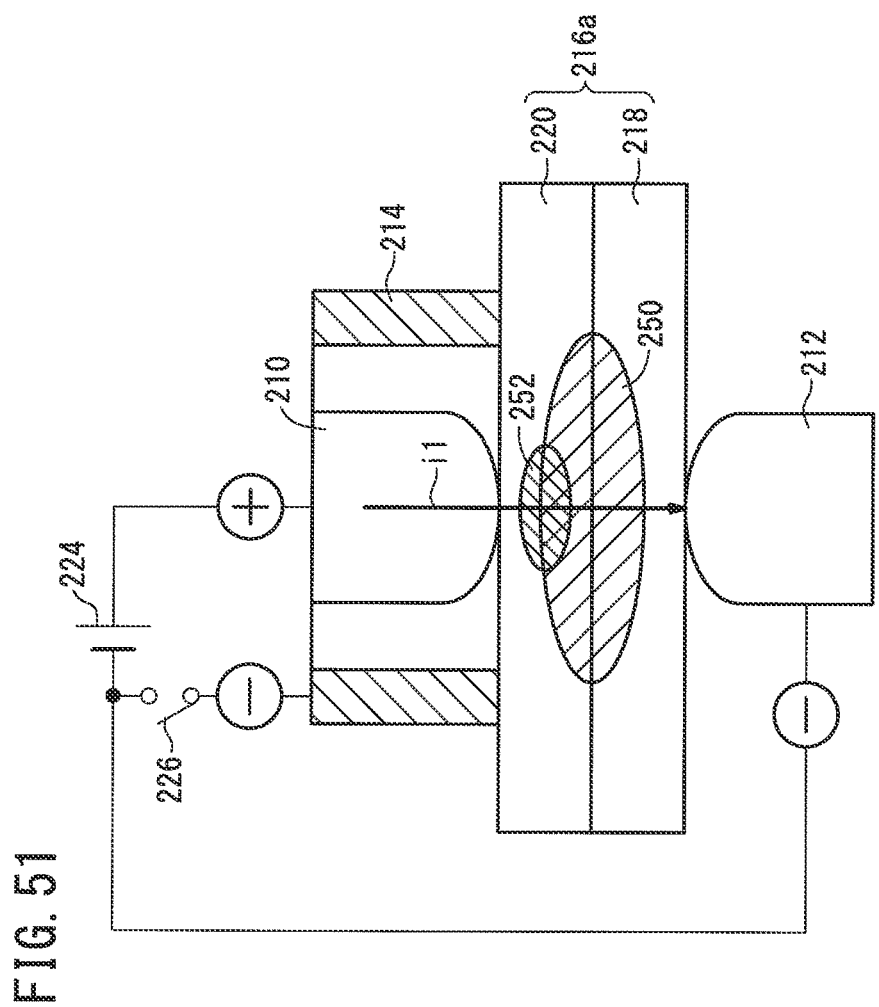
FIG. 51 is a schematic vertical cross sectional view showing a condition in which, continuing from the situation in FIG. 50, the ON/OFF switch is switch to an OFF state, yet conduction of current continues to take place from the first welding tip to the second welding tip.

In the welding timer that is included in the RB controller, a predetermined time, which was determined as described above, is set beforehand, by which the softened portion 250 can be softened sufficiently. Accordingly, when the preset time is reached, as shown in FIG. 51, under an action of the RB controller (welding timer), the ON/OFF switch 226 is placed in an OFF state, whereby flow of the branching current i2 is stopped.

In the foregoing manner, when the branching current i2 is stopped, only the current i1 from the first welding tip 210 to the second welding tip 212 flows in the metallic plates 218, 220. At this time, the current i1 is greater in comparison with the current i1 that has flowed up to the time that the branching current i2 was stopped.

Figure 52:
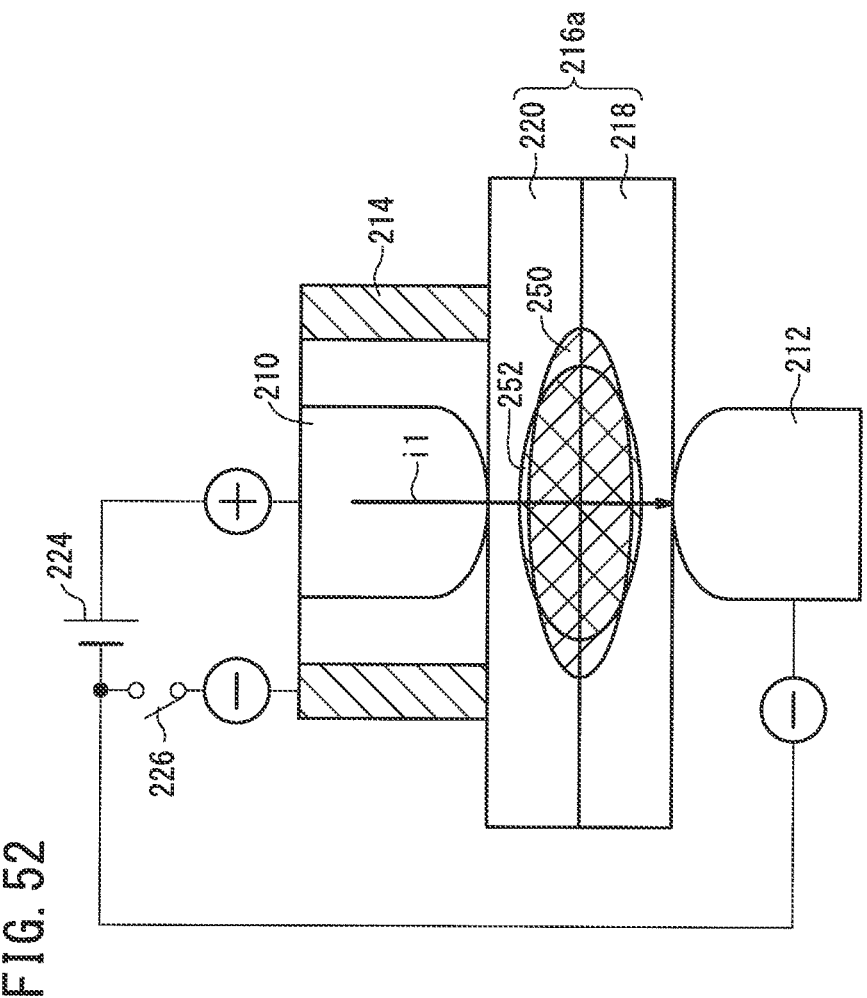
FIG. 52 is a schematic vertical cross sectional view showing a condition in which, continuing from the situation in FIG. 51, conduction of current is continued further from the first welding tip to the second welding tip.

Joule heating, which takes place at the contact surface between the metallic plates 218, 220 for which the resistance thereof is large, is greater in comparison to the condition before the branching current i2 was stopped. As a result, as shown in FIG. 52, the melted portion 252 grows large on the side of the softened portion 250, and ultimately, a nugget is formed from the melted portion 252.

As described above, the softened portion 250 is formed beforehand at the contact surface between the metallic plates 218, 220. Therefore, the interval between the metallic plates 218, 220 is advantageously sealed. Accordingly, even during times that the branching current i2 is stopped and the current value of the current i1 is increased, scattering of spatter from between the metallic plates 218, 220 is avoided.

In the foregoing manner, in the case that resistance welding is carried out with respect to the two metallic plates 218, 220, while generation of spatter is avoided, a large nugget can be grown at the contact surface between the metallic plates 218, 220.

The invention claimed is:

1. A resistance welding method for carrying out resistance welding with respect to a stacked body formed by stacking at least three workpieces, an outermost workpiece being the thinnest of the at least three workpieces, the method comprising:
   a first step of sandwiching the stacked body between a first welding tip and a second welding tip, while bringing a pressing member into abutment against the outermost workpiece, which is positioned on an outermost portion of the stacked body and against which the first welding tip is in abutment, the stacked body being pressed from a side of the outermost workpiece by the pressing member; and
   a second step of conducting an electric current between the first welding tip and the second welding tip while maintaining a pressure by the pressing member,
   wherein the pressing member comprises an auxiliary electrode having a polarity opposite to that of the first welding tip, such that in the second step, a branching current is made to flow either from the first welding tip to the auxiliary electrode, or from the auxiliary electrode to the first welding tip at the same time as the electric current is being conducted between the first welding tip and the second welding tip, and
   wherein in the second step, after both the electric current and the branching current have simultaneously flowed for a certain period of time, the electric current conduction between the first welding tip and the second welding tip is maintained from the first step, whereas the branching current is stopped.

2. The resistance welding method according to claim 1, wherein another auxiliary electrode, which has a polarity opposite to that of the second welding tip, is provided on a side of the second welding tip, such that after either one of the branching current that flows from the first welding tip to the auxiliary electrode or the branching current that flows from the auxiliary electrode to the first welding tip has stopped in the second step, a branching current flows either from the other auxiliary electrode to the second welding tip, or from the second welding tip to the other auxiliary electrode.

3. The resistance welding method according to claim 1, wherein a time from start of conduction of an electric current between the first welding tip and the second welding tip until stopping conduction of the electric current is controlled by a welding timer, and the welding timer sends an electrical conduction start signal to a branching current timer, and
   wherein the branching current timer carries out a control to initiate measurement of time from receipt of the electrical conduction start signal, and to stop the branching current when a predetermined set time is reached.

4. The resistance welding method according to claim 3, wherein the branching current is stopped by causing only the auxiliary electrode to separate away from the outermost workpiece, or by cutting off only an electrical path between the auxiliary electrode and a power source.

5. The resistance welding method according to claim 1, wherein the first welding tip and the auxiliary electrode are electrically insulated from each other to stop the flow of the branching current while the flow of electric current is maintained between the first welding tip and the second welding tip, when a time from a current conduction start reaches an elapsed time at which a gradient of a slope of a conduction time vs. temperature graph of the outermost workpiece changes from high to low in the slope obtained by a preliminary current conduction test.

6. The resistance welding method according to claim 5, wherein the branching current is stopped by causing only the auxiliary electrode to separate away from the outermost workpiece, or by cutting off only an electrical path between the auxiliary electrode and a power source.

* * * * *